(12) United States Patent
Naito et al.

(10) Patent No.: US 12,522,535 B2
(45) Date of Patent: Jan. 13, 2026

(54) CONCRETE COMPOSITIONS AND APPARATUSES EMPLOYING THE SAME

(71) Applicant: Lehigh University, Bethlehem, PA (US)

(72) Inventors: Clay Naito, Coopersburg, PA (US); Spencer Quiel, Coopersburg, PA (US); Muhannad Suleiman, Orefield, PA (US); Carlos Romero, Bethlehem, PA (US); Sudhakar Neti, St. Augustine, FL (US); Shuoyu Wang, Allentown, PA (US)

(73) Assignee: Lehigh University, Bethlehem, PA (US)

( * ) Notice: Subject to any disclaimer, the term of this patent is extended or adjusted under 35 U.S.C. 154(b) by 298 days.

(21) Appl. No.: 18/219,474

(22) Filed: Jul. 7, 2023

(65) Prior Publication Data

US 2024/0010554 A1    Jan. 11, 2024

Related U.S. Application Data

(63) Continuation-in-part of application No. 18/138,469, filed on Apr. 24, 2023.
(Continued)

(51) Int. Cl.
*C04B 7/02*         (2006.01)
*C04B 7/28*         (2006.01)
(Continued)

(52) U.S. Cl.
CPC .................. *C04B 7/02* (2013.01); *C04B 7/28* (2013.01); *C04B 14/06* (2013.01); *C04B 14/26* (2013.01);
(Continued)

(58) Field of Classification Search
CPC ............. C04B 7/02; C04B 7/28; C04B 14/06; C04B 14/26; C04B 14/48; C04B 20/0052;
(Continued)

(56) References Cited

U.S. PATENT DOCUMENTS 7,173,179 B2 *   2/2007  Nicoletti ................. H02S 40/44
                                                               136/246
2011/0162829 A1   7/2011  Xiang
(Continued)

FOREIGN PATENT DOCUMENTS

WO         2016119916 A1    8/2016

OTHER PUBLICATIONS

Concrete as a thermal energy storage medium for thermocline solar energy storage systems by Emerson John Jicah Hale and Paneer Selvam E John et al.Solar Energy 96 (2013) 194-204 (Year: 2013).*
(Continued)

*Primary Examiner* — Pamela H Weiss
(74) *Attorney, Agent, or Firm* — The Belles Group, P.C.

(57) ABSTRACT

Concrete materials and thermal energy storage devices employing such concrete materials are disclosed herein. The concrete material may include fibers in an amount ranging from about 1 to about 2 vol. %; an aggregate in an amount ranging from about 50 to about 80 vol. %, wherein the aggregates comprises siliceous aggregate and optionally carbonate aggregate; and a cementitious material in an amount from about 12 to about 20 vol. %, wherein the cementitious material comprises a combination of about 70 to about 85 vol. % of Portland cement and about 15 to about vol. % of silica fume, wherein all volume percentages unless otherwise indicated are based on the total volume of the concrete material.

2 Claims, 22 Drawing Sheets

Related U.S. Application Data

(60) Provisional application No. 63/359,296, filed on Jul. 8, 2022.

(51) Int. Cl.
　　　*C04B 14/06*　　　(2006.01)
　　　*C04B 14/26*　　　(2006.01)
　　　*C04B 14/48*　　　(2006.01)
　　　*C04B 20/00*　　　(2006.01)
　　　*C04B 28/04*　　　(2006.01)

(52) U.S. Cl.
　　　CPC .......... *C04B 14/48* (2013.01); *C04B 20/0052* (2013.01); *C04B 28/04* (2013.01); *C04B 2201/32* (2013.01)

(58) Field of Classification Search
　　　CPC ................ C04B 28/04; C04B 2201/32; C04B 18/146; C04B 14/068; C04B 14/28; C04B 20/0076; Y02W 30/91
　　　See application file for complete search history.

(56) References Cited

U.S. PATENT DOCUMENTS

| | | | | |
|---|---|---|---|---|
| 2013/0122267 | A1* | 5/2013 | Riman | C04B 28/188 428/448 |
| 2015/0143806 | A1* | 5/2015 | Friesth | F03G 7/04 220/592.2 |
| 2023/0341192 | A1 | 10/2023 | Romero et al. | |

OTHER PUBLICATIONS

Aci 216.1, Code requirements for determing fire resistance of concrete and masonry construction assemblies. Place of publication not identified: American Concrete Inst, Year: 2014.

ACI Committee 211.1-91, Standard Practice for Selecting Proportions for Normal Heavyweight, and Mass Concrete, American Concrete Institute, Year: 1991.

Adl-Zarrabi et al., "Using the TPS method for determining the thermal properties of concrete and wood at elevated temperature," Fire Mater., vol. 30, No. 5, pp. 359-369, Sep. 2006, doi: 10.1002/fam.915.

Ahmad et al., "Investigate the influence of expanded clay aggregate and silica fume on the properties of lightweight concrete," Constr. Build. Mater., vol. 220, pp. 253-266, Sep. 2019, doi: 10.1016/j.conbuildmat.2019.05.171, Abstract.

Alqsair et al., "The Effect of Mixing Promotors on Sweeping Gas Membrane Distillation System Performance," in vol. 7: Fluids Engineering, Salt Lake City, Utah, USA, Nov. 2019, p. V007T08A039. doi: 10.1115/IMECE2019-10727, Abstract.

Ammari et al., "Contribution of hybrid fibers on the improvement of sand concrete properties: Barley straws treated with hot water and steel fibers," Constr. Build. Mater., vol. 233, p. 117374, Feb. 2020, doi: 10.1016/j.conbuildmat.2019.117374, Abstract.

Arioz, "Effects of elevated temperatures on properties of concrete," Fire Saf. J., vol. 42, No. 8, pp. 925 516-522, Nov. 2007, doi: 10.1016/j.firesaf.2007.01.003.

Asadi et al., "Thermal conductivity of concrete—A review," J. Build. Eng., vol. 20, pp. 81-93, Nov. 2018, doi: 10.1016/j.jobe.2018.07.002.

ASTM Committee A820-16, "Specification for Steel Fibers for Fiber-Reinforced Concrete," ASTM International, West Conshohocken, PA, (Year: 2016). doi: 10.1520/A0820_A0820M-16, Abstract.

ASTM Committee C31-12, "Standard Practice for Making and Curing Concrete Test Specimens in the Field," ASTM International, West Conshohocken, PA, (Year: 2012) doi: 10.1520/C0031_C0031M-12, Abstract.

ASTM Committee C33-18, Standard Specification for Concrete Aggregates, ASTM International, West Conshohocken, PA, Year: 2018. https://doi.org/10.1520/C0033_C0033M-18, pp. 1-6.

ASTM Committee C39-21, Test Method for Compressive Strength of Cylindrical Concrete Specimens, ASTM International, West Conshohocken, PA, Year: 2021. https://doi.org/10.1520/C0039_C0039M-21, pp. 1-7.

ASTM Committee C469-10, "Test Method for Static Modulus of Elasticity and Poisson's Ratio of 1018 Concrete in Compression," ASTM International, West Conshohocken, PA, Year: 2010. doi: 10.1520/C0469_C0469M-10, pp. 1-2.

ASTM Committee C496-11, "Test Method for Splitting Tensile Strength of Cylindrical Concrete Specimens," ASTM International, West Conshohocken, PA, Year: 2011. doi: 10.1520/C0496_C0496M-11, pp. 1-3.

ASTM Standard C33/C33M-18, Specification for Concrete Aggregates, ASTM International, West Conshohocken, PA, (Year: 2013). https://doi.org/10.1520/C0033_C0033M-18, pp. 1-6.

ASTM Standard C469-14, Standard Test Method for Static Modulus of Elasticity and Poisson's Ratio of Concrete in Compression, ASTM International, West Conshohocken, PA, Year: 2014. https://doi.org/10.1520/C0469_C0469M-14, pp. 1-2.

ASTM Standard C496-17, Test Method for Splitting Tensile Strength of Cylindrical Concrete Specimens, ASTM International, West Conshohocken, PA, Year: 2017. https://doi.org/10.1520/C0496_C0496M-17, pp. 1-3.

ASTM Standard C805-18, Test Method for Rebound No. of Hardened Concrete, ASTM International, West Conshohocken, PA, Year: 2018. https://doi.org/10.1520/C0805_C0805M-18, pp. 1-2.

ASTM Standard E119-12a, "Test Methods for Fire Tests of Building 851 Construction and Materials," ASTM International, West Conshohocken, PA, (Year: 2012). doi: 10.1520/E0119-12A, pp. 1-12.

Barbhuiya et al., "Properties of fly ash concrete modified with hydrated lime and silica fume," Constr. Build. Mater. 23 (Year: 2009) 3233-3239. https://doi.org/10.1016/j.conbuildmat.2009.06.001, Abstract.

Bentz et al., "Influence of aggregate characteristics on concrete performance," National Institute of Standards and Technology, Gaithersburg, MD, NIST TN 1963, May 2017. doi: 10.6028/NIST.TN.1963.

Bentz et al., "Thermal properties of high-vol. fly ash mortars and concretes," J. Build. Phys., vol. 34, No. 3, pp. 263-275, Jan. 2011, doi:10.1177/1744259110376613.

Bergan et al., "A New Type of Large Scale Thermal Energy Storage," Energy Procedia, vol. 58, No. 1876, pp. 152-159, doi: 10.1016/j.egypro.2014.10.422, Year: 2014.

Bergan et al., "New Concentrating Solar Power Facility for Testing High Temperature Concrete Thermal Energy Storage," Energy Procedia. 75 (Year: 2015) 2144-2149. https://doi.org/10.1016/j.egypro.2015.07.350.

Boquera et al., "Thermo-mechanical stability of supplementary cementitious materials in cement paste to be incorporated in concrete as thermal energy storage material at high temperatures," J. Energy Storage. 54 (Year: 2022) 105370. https://doi.org/10.1016/j.est.2022.105370, Abstract.

C09 Committee, "Test Method for Compressive Strength of Cylindrical Concrete Specimens," ASTM International. doi: 10.1520/C0039_C0039M-12A, pp. 1-3, Year: 2012.

Cao et al., "A novel approach to improving load flexibility of coal-fired power plant by integrating high temperature thermal energy storage through additional thermodynamic cycle," Appl. Therm. Eng., vol. 173, No. Aug. 2019, p. 115225, 2020, doi: 10.1016/j.applthermaleng.2020.115225, Abstract.

Castellote et al., "Composition and microstructural changes of cement pastes upon heating, as studied by neutron diffraction," Cem. Concr. Res., vol. 34, No. 9, pp. 1633-1644, Sep. 2004, doi: 10.1016/S0008-8846(03)00229-1, Abstract.

CEMEX USA, Proper Use of the Rebound Hammer Updated to Reflect the Changes to ASTM C805, CEMEX USA, (Year: 2013). https://www.cemexusa.com/documents/27329108/45560536/proper-use-of-the-rebound-hammer.pdf/1417ecb8-2a04-1b8a-48aa-853149c76936 (accessed Jul. 6, 2021).

(56) References Cited

OTHER PUBLICATIONS

Cen, "EN 1991-1-2:2002 Eurocode 1: Actions on structures—Part 1-2: General actions—Actions on structures exposed to fire," European Committee for Standardization, Brussels, Belgium, Year: 2009.
Cen, "EN 1994-1-2:2005 Eurocode 4: Design of composite steel and concrete structures—Part 1-2: General rules—Structural fire design," European Committee for Standardization, Brussels, Belgium, Year: 2005.
Cen, EN 1992-1-2:2004 Eurocode 2: Design of concrete structures—Part 1-2: General rules—Structural fire design, European Committee for Standardization, Brussels, Belgium, Year: 2008.
Chen et al., "Influence of water-to-cement ratio and curing period on pore structure of cement mortar," Constr. Build. Mater., vol. 38, pp. 804-812, Jan. 2013, doi: 10.1016/j.conbuildmat.2012.09.058, Abstract.
Demirboğa, "Thermal conductivity and compressive strength of concrete incorporation with mineral admixtures," Build. Environ. 42 (Year: 2007) 2467-2471. https://doi.org/10.1016/j.buildenv.2006.06.010, Abstract.
Doretti et al., "A simplified analytical approach for concrete sensible thermal energy storages simulation," J. Energy Storage, vol. 22, pp. 68-79, Apr. 2019, doi: 10.1016/j.est.2019.01.029, Abstract.
DOW, "DowTherm A Technical Data Sheet," DOW, Year: 2017.
Du et al., "Detection of thermophysical properties for high strength concrete after exposure to high temperature," J. Wuhan Univ. Technol.-Mater Sci Ed, vol. 32, No. 1, pp. 113-120, Feb. 2017, doi: 10.1007/s11595-017-1568-z, Abstract.
Duan et al., "Effects of metakaolin, silica fume and slag on pore structure, interfacial transition zone and compressive strength of concrete," Constr. Build. Mater. 44 (Year: 2013) 1-6. https://doi.org/10.1016/j.conbuildmat.Year: 2013.02.075, Abstract.
Fu et al., "Effects of silica fume, latex, methylcellulose, and carbon fibers on the thermal conductivity and specific heat of cement paste," Cem. Concr. Res., vol. 27, No. 12, pp. 1799-1804, Dec. 1997, doi: 10.1016/S0008-8846(97)00174-9, Abstract.
Fu et al., "Study of cement-based thermal storage materials with fly ash," Thermochim. Acta, vol. 614, pp. 171-176, Aug. 2015, doi: 10.1016/j.tca.2015.06.010, Abstract.
Gandage et al., "Thermal Conductivity Studies for Self-Compacting Concrete with Sand and Fly Ash Variation," ACI Mater. J., vol. 112, No. 6, Dec. 2015, doi: 10.14359/51687976.
Ghadban et al., "Effect of Fiber Type and Dosage on Flexural Performance of Fiber-Reinforced Concrete for Highway Bridges," ACI Mater. J. 115 (Year: 2018). https://doi.org/10.14359/51702036.
Giannuzzi et al., "Experimental campaign and numerical analyses of thermal storage concrete modules," Sol. Energy, vol. 157, pp. 596-602, Year: 2017, doi: 10.1016/j.solener.2017.08.041, Abstract.
Girardi et al., "Recycled additions for improving the thermal conductivity of concrete in preparing energy storage systems," Constr. Build. Mater., vol. 135, pp. 565-579, Mar. 2017, doi: 10.1016/j.conbuildmat.2016.12.179, Abstract.
Goldman et al., "Properties of cementitious systems containing silica fume or nonreactive microfillers," Adv. Cem. Based Mater. 1 (Year: 1994) 209-215. https://doi.org/10.1016/1065-7355(94)90026-4, Abstract.
Hajmohammadian et al., "Analytical and experimental study on thermal conductivity of hardened cement pastes," Mater. Struct., vol. 46, No. 9, pp. 1537-1546, Sep. 2013, doi: 10.1617/s11527-012-9995-y.
Hoivik et al., "Long-term performance results of concrete-based modular thermal energy storage system," J. Energy Storage, vol. 24, p. 100735, Aug. 2019, doi: 10.1016/j.est.2019.04.009.
Hotdisk, TPS 2500 S, https://www.hotdiskinstruments.com/products-services/instruments/tps-2500-s/ (accessed Oct. 13, 2022).
Huang et al., "A novel energy pile: The thermo-syphon helical pile, Applied Thermal Engineering." 159 (Year: 2019) 113882. https://doi.org/10.1016/j.applthermaleng.2019.113882, Abstract.
Hwang et al., "Porosity generation arising from steel fibre in concrete," Constr. Build. Mater., vol. 94, pp. 433-436, Sep. 2015, doi: 10.1016/j.conbuildmat.2015.07.044, Abstract.

International Organization for Standardization, "ISO 834 Fire-resistance tests—Elements of building construction," 2019. Accessed: Jun. 18, 2019. [Online]. Available: http://www.iso.org/cms/render/live/en/sites/isoorg/contents/data/standard/06/64/66439.html, Abstract.
Jian et al. "Thermal analysis and design of solid energy storage systems using a modified lumped capacitance method," Appl. Therm. Eng., vol. 75, pp. 213-223, Jan. 2015, doi: 10.1016/j.applthermaleng.2014.10.010, Abstract.
Jiang et al. "Experimental study on the mechanical properties and microstructure of chopped basalt fibre reinforced concrete," Mater. Des., vol. 58, pp. 187-193, Jun. 2014, doi: 10.1016/j.matdes.2014.01.056.
Kakae et al., "Physical and Thermal Properties of Concrete Subjected to High Temperature," J. Adv. Concr. Technol., vol. 15, No. 6, pp. 190-212, 2017, doi: 10.3151/jact.15.190.
Khaliq et al., "Thermal and mechanical properties of fiber reinforced high performance self-consolidating concrete at elevated temperatures," Cem. Concr. Res., vol. 41, No. 11, pp. 1112-1122, Nov. 2011, doi: 10.1016/j.cemconres.2011.06.012, Abstract.
Khare et al., "Selection of materials for high temperature sensible energy storage," Sol. Energy Mater. Sol. Cells. 115 (Year: 2013) 114-122. https://doi.org/10.1016/j.solmat.Year: Mar. 9, 2013, Abstract.
Kim et al., "An experimental study on thermal conductivity of concrete," Cem. Concr. Res., vol. 33, No. 3, pp. 363-371, Mar. 2003, doi: 10.1016/S0008-8846(02)00965-1, Abstract.
Kizilkanat, N. Yüzer, N. Kabay, "Thermo-physical properties of concrete exposed to high temperature," Constr. Build. Mater. 45 (Year: 2013) 157-161. https://doi.org/10.1016/j.conbuildmat.Year: Mar. 8, 2013.
Kodur et al., "Effect of Temperature on Thermal Properties of Different Types of High-Strength Concrete," J. Mater. Civ. Eng., vol. 23, No. 6, pp. 793-801, Jun. 2011, doi:10.1061/(ASCE)MT.1943-5533.0000225.
Kodur et al., "Effect of Temperature on Thermal Properties of High-Strength Concrete," J. Mater. Civ. Eng., vol. 15, No. 2, pp. 101-107, Apr. 2003, doi: 10.1061/(ASCE)0899-1561(2003)15:2(101).
Kodur et al., "Effect of Temperature on Thermal Properties of Ultrahigh-Performance Concrete," J. Mater. Civ. Eng., vol. 32, No. 8, p. 04020210, Aug. 2020, doi:10.1061/(ASCE)MT.1943-5533.0003286, Abstract.
Kodur, "Properties of Concrete at Elevated Temperatures," ISRN Civ. Eng. 2014 (Year: 2014) 1-15. https://doi.org/10.1155/2014/468510.
Kosmatka et al., "Design and Control of Concrete Mixtures, 14th Edition," Portland Cement Association, Skokie, IL, USA, Year: 2003.
Krishnaiah et al., "Determination of thermal properties of some supplementary cementing materials used in cement and concrete," Constr. Build. Mater., vol. 20, No. 3, pp. 193-198, Apr. 2006, doi:10.1016/j.conbuildmat.2004.10.001, Abstract.
Kuravi et al., "Thermal energy storage technologies and systems for concentrating solar power plants," Prog. Energy Combust. Sci., vol. 39, No. 4, pp. 285-801 319, Aug. 2013, doi:10.1016/j.pecs.2013.02.001, Abstract.
Kurt et al., "The effect of blast furnace slag on the self compactability of pumice aggregate lightweight concrete," Sadhana, vol. 41, No. 2, pp. 253-264, Feb. 2016, doi: 10.1007/s12046-016-0462-2, Abstract.
Laing et al., "High-Temperature Solid-Media Thermal Energy Storage for Solar Thermal Power Plants," Proc. IEEE, vol. 100, No. 2, pp. 516-524, Feb. 2012, doi: 10.1109/JPROC.2011.2154290, Abstract.
Laing et al., "Solid media thermal storage development and analysis of modular storage operation concepts for parabolic trough power plants," J. Sol. Energy Eng. Trans. ASME, vol. 130, No. 1, pp. 0110061-0110065, Year: 2008, doi: 10.1115/1.2804625, Abstract.
Laing et al., "Solid media thermal storage for parabolic trough power plants," Sol. Energy, vol. 80, No. 10, pp. 1283-1289, Oct. 2006, doi: 10.1016/j.solener.2006.06.003, Abstract.
Laing et al., "Test Results of Concrete Thermal Energy Storage for Parabolic Trough Power Plants," J. Sol. Energy Eng. 131 (Year: 2009) 041007-041007-6. https://doi.org/10.1115/1.3197844, Abstract.

(56) References Cited

OTHER PUBLICATIONS

Laing et al., "Thermal energy storage for direct steam generation," Sol. Energy, vol. 85, No. 4, pp. 627-633, Year: 2011, doi: 10.1016/j.solener.2010.08.015, Abstract.

Lee et al., "Experimental Study on Thermal Conductivity of Concrete Using Ferronickel Slag Powder," KSCE Journal of Civil Engineering, Published Dec. 2, 2019, pp. 1-9.

Li et al., "A review on the recovery of fire-damaged concrete with post-fire-curing," Constr. Build. Mater. 237 (Year: 2020) 117564. https://doi.org/10.1016/j.conbuildmat.2019.117564, Abstract.

Li et al., "Flexible Operation of Supercritical Power Plant via Integration of Thermal Energy Storage," in In (Ed.), Power Plants in the Industry. IntechOpen, Year: 2018.

Li et al., "Study of supercritical power plant integration with high temperature thermal energy storage for flexible operation," J. Energy Storage, vol. 20, No. September, pp. 140-152, Year: 2018, doi: 10.1016/j.est.2018.09.008.

Li et al., "Thermal and mechanical properties of high-performance fiber-reinforced cementitious composites after exposure to high temperatures," Constr. Build. Mater., vol. 157, pp. 829-838, Dec. 2017, doi: 10.1016/j.conbuildmat.2017.09.125, Abstract.

Li et al., "Thermal Properties of Hybrid Fiber-Reinforced Reactive Powder Concrete at High Temperature," J. Mater. Civ. Eng., vol. 32, No. 3, p. 04020022, Mar. 2020, doi:10.1061/(ASCE)MT.1943-5533.0003053. Mar. 2020, doi: 10.1061/(ASCE)MT.1943-5533.0003053, Abstract.

Lie et al. "Thermal properties of fibre-reinforced concrete at elevated temperatures," National Research Council of Canada, Apr. 1995. doi: 10.4224/20375086.

Log et al., "Transient plane source (TPS) technique for measuring thermal transport properties of building materials," Fire Mater., 1026 vol. 19, No. 1, pp. 43-49, Jan. 1995, doi: 10.1002/fam.810190107, Abstract.

Loveridge et al., "2D Thermal Resistance of Pile Heat Exchangers," Geothermics. 50 (2014) 122-135. https://doi.org/10.1016/j.geothermics.2013.09.015.

Ma et al., "Mechanical properties of concrete at high temperature—A review," Constr. Build. Mater. 93 (Year: 2015) 371-383. https://doi.org/10.1016/j.conbuildmat.2015.05.131, Abstract.

Mankel et al., "Thermal energy storage characterization of cement-based systems containing microencapsulated-PCMs," Constr. Build. Mater., vol. 199, pp. 307-320, Feb. 2019, doi: 10.1016/j.conbuildmat.2018.11.195.

Mantelli, "Thermosyphon Heat Exchangers," Thermosyphons Heat Pipes Theory Appl., No. Vasiliev Year: 2005, pp. 343-362, 2021, doi: 10.1007/978-3-030-62773-7_9.

Manville, John, MINWOOL-1200® Field-formed Water-repellent, High-temperature Mineral Wool Pipe Insulation Data Sheet, https://www.jm.com/en/industrial-insulation/industrial-mineral-wool/minwool-1200-field-formed-pipe-insulation/ (accessed Nov. 25, 2022).

Master Builders Solutions, MasterGlenium 7500 Full-range water-reducing admixture, https://www.master-builders-solutions.com/en-us/products/concrete-admixtures/water-reducers/water-reducers-high-range/masterglenium-7500 (accessed Oct. 13, 2022).

Miloud, "Permeability and Porosity Characteristics of Steel Fiber Reinforced Concrete," Asian J. Civ. Eng. Build. Hous., vol. 6, No. 4, pp. 317-330, Year: 2005.

Morsy et al., "Effect of silica fume and metakaoline pozzolana on the performance of blended cement pastes against fire," Ceram.—Silik. 51 (Year: 2007) 40-44.

Nandi et al., "Analysis of high temperature thermal energy storage for solar power plant," in 2012 IEEE Third International Conference on Sustainable Energy Technologies (ICSET), Kathmandu, Nepal, Sep. 2012, pp. 438-444. doi: 10.1109/ICSET.2012.6357438, Abstract.

Naus, "The Effect of Elevated Temperature on Concrete Materials and Structures—a Literature Review.," Year: 2006. https://doi.org/10.2172/974590.

Ndiaye et al., Université de Toulouse, INSAT, UPS, France, "Thermal energy storage based on cementitious materials: A review," AIMS Energy. 6 (Year: C1332018) 97-120. https://doi.org/10.3934/energy.2018.1.97.

Oren et al., "Physical and mechanical properties of foam concretes containing granulated blast furnace slag as fine aggregate," Constr. Build. Mater., vol. 238, p. 117774, Mar. 2020, doi: 10.1016/j.conbuildmat.2019.117774, Abstract.

Ouedraogo et al., "Refractory concretes uniaxial compression behaviour under high temperature testing conditions," J. Eur. Ceram. Soc. 31 (Year: 2011) 2763-2774. https://doi.org/10.1016/j.jeurceramsoc.2011.07.017, Abstract.

Ozger et al., "Effect of nylon fibres on mechanical and thermal properties of hardened concrete for energy storage systems," Mater. Des., vol. 51, pp. 989-997, Oct. 2013, doi: 10.1016/j.matdes.2013.04.085, Abstract.

Özrahat et al., "Thermal performance of a concrete column as a sensible thermal energy storage medium and a heater," Renew. Energy. 111 (Year: 2017) 561-579. https://doi.org/10.1016/j.renene.2017.04.046, Abstract.

Pan et al., "Experimental Study on Specific Heat of Concrete at High Temperatures and Its Influence on Thermal Energy Storage," Energies, vol. 10, No. 1, p. 33, Dec. 2016, doi:10.3390/en10010033.

Pandey et al., "The influence of mineral additives on the strength and porosity of OPC mortar," Cem. Concr. Res. 30 (Year: 2000) 19-23. https://doi.org/10.1016/S0008-8846(99)00180-5, Abstract.

Poulad et al., "Potential Benefits from Thermosyphon-PCM (TP) Integrated Design for Buildings Applications in Toronto," in: Proceedings of ESim (Year: 2012), Halifax Nova Scotia, (Year: 2012): pp. 601-614.

Prieto et al., "Thermal and mechanical degradation assessment in refractory concrete as thermal energy storage container material in concentrated solar plants," J. Energy Storage. 40 (Year: 2021) 102790. https://doi.org/10.1016/j.est.2021.102790, Abstract.

Rao et al., "Performance tests on lab-scale sensible heat storage prototypes," Appl. Therm. Eng., vol. 129, pp. 953-967, Jan. 2018, doi: 10.1016/j.applthermaleng.2017.10.085, Abstract.

Richter et al., "Flexibilization of Coal-fired Power Plants by Dynamic Simulation," Proc. 11th Int. Model. Conf. Versailles, Fr. Sep. 21-23, 2015, vol. 118, No. September, pp. 715-723, 2015, doi:10.3384/ecp15118715.

Richter et al., "Improving the load flexibility of coal-fired power plants by the integration of a thermal energy storage," Appl. Energy, vol. 236, No. Sep. 2018, pp. 607-621, Year: 2019, doi: 10.1016/j.apenergy.2018.11.099, Abstract.

Robertson, "Thermal Properties of Rocks," USGS, Reston, Virginia, Open-File Report 88-441, 1988.

Salmon, "Thermal conductivity of insulations using guarded hot plates, including recent developments and sources of reference materials," Meas. Sci. Technol., vol. 12, No. 12, pp. R89-R98, Dec. 2001, doi: 10.1088/0957-0233/12/12/201, Abstract.

Salomoni et al., "Thermal storage of sensible heat using concrete modules in solar power plants," Sol. Energy, vol. 103, pp. 303-315, May 2014, doi: 10.1016/j.solener.2014.02.022, Abstract.

Sarbu et al., "A Comprehensive Review of Thermal Energy Storage," Sustainability, vol. 10, No. 2, p. 191, Jan. 2018, doi: 10.3390/su10010191.

Schneider, "Concrete at high temperatures—A general review," Fire Saf. J. 13 (1988) 55-68. https://doi.org/10.1016/0379-7112(88)90033-1, Abstract.

Selvam et al., "Development and Performance Evaluation of High Temperature Concrete for Thermal Energy Storage for Solar Power Generation," University of Arkansas, 2013.

Skinner et al., "Testing of High-Performance Concrete as a Thermal Energy Storage Medium at High Temperatures," J. Sol. Energy Eng., vol. 136, No. 2, p. 021004, Aug. 2013, doi: 10.1115/1.4024925, Abstract.

Srivastava et al., "Effect of Silica Fume on Workability and Compressive Strength of OPC Concrete," J. Environ. Nanotechnol. 3 (Year: 2014) 32-35. https://doi.org/10.13074/jent.2014.09.143086.

Stolarska et al., "The Thermal Parameters of Mortars Based on Different Cement Type and W/C Ratios," Materials, vol. 13, No. 19, p. 4258, Sep. 2020, doi: 10.3390/ma13194258.

(56) References Cited

OTHER PUBLICATIONS

Sun et al., "Variation of wave velocity 901 and thermal conductivity of concrete after high-temperature treatment," Environ. Earth Sci., vol. 76, No. 2, p. 88, Jan. 2017, doi: 10.1007/s 1266,5-017-6397-z.C64, Abstract.

Tamme et al., "Advanced Thermal Energy Storage Technology for Parabolic Trough," in International Solar Energy Conference, Kohala Coast, Hawaii, USA, Year: 2003, pp. 563-571. doi:10.1115/ISEC2003-44033.

Tamme et al., "Advanced thermal energy storage technology for parabolic trough," J. Sol. Energy Eng. Trans. ASME, vol. 126, No. 2, pp. 794-800, Year: 2004, doi: 10.1115/1.1687404, Abstract.

Terms and Conditions | ANSYS Academic, https://www.ansys.com/academic/terms-and-conditions (accessed Nov. 29, 2019).

The Dow Chemical Company, DOWTHERM A Heat Transfer Fluid Product Technical Data, Year: 1997.

Thomas et al., "Effect of high temperature and accelerated aging in high density micro-concrete," Constr. Build. Mater. 272 (Year: 2021) 121920. https://doi.org/10.1016/j.conbuildmat.2020.121920, Abstract.

Tinker et al., "Thermal conductivity of concrete: Effect of moisture," Build. Serv. Eng. Res. Technol., vol. 13, No. 1, pp. 31-36, Feb. 1992, doi:10.1177/014362449201300105, Abstract.

Topçu et al. "Effect of aggregate type on properties 1001 of hardened self-consolidating lightweight concrete (SCLC)," Constr. Build. Mater., vol. 24, No. 7, pp. 1286-1295, Jul. 2010, doi:10.1016/j.conbuildmat.2009.12.007.

Trojan et al., "The use of pressure hot water storage tanks to improve the energy flexibility of the steam power unit," Energy, vol. 173, pp. 926-936, 2019, doi: 10.1016/j.energy.2019.02.059, Abstract.

Tufail et al., "Effect of Elevated Temperature on Mechanical Properties of Limestone, Quartzite and Granite Concrete," Int. J. Concr. Struct. Mater., vol. 11, No. 1, pp. 17-28, Mar. 2017, doi:10.1007/s40069-016-0175-2.

Türkmen et al., "Properties of pumice aggregate concretes at elevated temperatures and comparison with ANN models: Properties of Pumice Aggregate Concretes," Fire Mater., vol. 41, No. 2, pp. 142-153, Mar. 2017, doi: 10.1002/fam.2374, Abstract.

US Department of Energy, Thermal Energy Storage Technologies Subprogram Area, https://www.energy.gov/eere/buildings/thermal-energy-storage (accessed Dec. 17, 2022).

Vozár, "A computer-controlled apparatus for thermal conductivity measurement by the transient hot wire method," J. Therm. Anal., vol. 46, No. 2, pp. 495-505, Feb. 1996, doi: 10.1007/BF02135027, Abstract.

Wagner, Review of Thermosyphon Applications, US Army Corps of Engineers ERDC, Year: 2014.

Wang et al., "An investigation on thermal conductivity of fly ash concrete after elevated temperature exposure," Constr. Build. Mater., vol. 148, pp. 148-154, Sep. 2017, doi:10.1016/j.conbuildmat.2017.05.068, Abstract.

Wang et al., "Effect of high temperature on the strength and thermal conductivity of glass fiber concrete," Constr. Build. Mater., vol. 245, p. 118387, Jun. 2020, doi:10.1016/j.conbuildmat.2020.118387, Abstract.

Wang, "Compressive strength and thermal conductivity of concrete with nanoclay under Various High-Temperatures," Constr. Build. Mater., vol. 147, pp. 305-311, Aug. 2017, doi:10.1016/j.conbuildmat.2017.04.141, Abstract.

Waples et al., "A Review and Evaluation of Specific Heat Capacities of Rocks, Minerals, and Subsurface Fluids. Part 1: Minerals and Nonporous Rocks," Nat. Resour. Res. 13 (Year: 2004) 97-122. https://doi.org/10.1023/B:NARR.0000032647.41046.e7, Abstract.

Wei et al., "Research on influence of steam extraction parameters and operation load on operational flexibility of coal-fired power plant," Appl. Therm. Eng., vol. 195, No. May, p. 117226, Year: 2021, doi: 10.1016/j.applthermaleng.2021.117226, Abstract.

Xing et al., "Aggregate's influence on thermophysical concrete properties at elevated temperature," Constr. Build. Mater., vol. 95, pp. 18-28, Oct. 2015, doi: 10.1016/j.conbuildmat.2015.07.060, Abstract.

Xing et al., "Influence of the nature of aggregates on the behaviour of concrete subjected to elevated temperature," Cem. Concr. Res. 41 (Year: 2011) 392-402. https://doi.org/10.1016/j.cemconres.2011.01.005, Abstract.

Xu et al., "Cement of high specific heat and high thermal conductivity, obtained by using silane and silica fume as admixtures," Cem. Concr. Res., p. 1175-1178, Year: 2000, Abstract.

Xu et al., "Improving silica fume cement by using silane," Cem. Concr. Res., vol. 30, No. 8, pp. 1305-1311, Aug. 2000, doi: 10.1016/S0008-8846(00)00337-9, Abstract.

Yang et al. "Mechanical and Thermal Properties of UHPC Exposed to High-Temperature Thermal Cycling," Adv. Mater. Sci. Eng., vol. 2019, pp. 1-12, Nov. 2019, doi: 975.

Yüksel, "The Review of Some Commonly Used Methods and Techniques to Measure the Thermal Conductivity of Insulation Materials," in Insulation Materials in Context of Sustainability, A. Almusaed and A. Almssad, Eds. InTech, Year: 2016. doi: 10.5772/64157.

Yun et al., "Effect of Surrogate Aggregates on the Thermal Conductivity of Concrete at Ambient and Elevated Temperatures," Sci. World J., vol. 2014, pp. 1-9, Year: 2014, doi:10.1155/2014/939632.

Zhang et al. "A numerical study on the theoretical accuracy of film thermal conductivity using transient plane source method," Appl. Therm.Eng., vol. 72, No. 1, pp. 62-69, Nov. 2014, doi:10.1016/j.applthermaleng.2014.01.058.C19, Abstract.

Zhang et al., "Mesoscale model for thermal conductivity of concrete," Constr. Build. Mater., vol. 98, pp. 8-16, Nov. 2015, doi: 10.1016/j.conbuildmat.2015.08.106, Abstract.

Zhao et al., "Thermal properties of coarse RCA concrete at elevated temperatures," Appl. Therm. Eng., vol. 140, pp. 180-189, Jul. 2018, doi: 10.1016/j.applthermaleng.2018.05.032, Abstract.

* cited by examiner

CONCRETE COMPOSITIONS AND APPARATUSES EMPLOYING THE SAME

CROSS-REFERENCE TO RELATED APPLICATIONS

This application claims the benefit of priority from U.S. Provisional Application No. 63/359,296, filed Jul. 8, 2022 and titled "Optimization of Thermal Properties of Concrete for Energy Storage Applications," and U.S. Non-provisional patent application Ser. No. 18/138,469, filed Apr. 24, 2023 and titled "THERMAL ENERGY STORAGE DEVICE AND SYSTEM," the contents of which are hereby incorporated herein in their entireties for all purposes.

GOVERNMENT SUPPORT CLAUSE

This invention was made with government support under DE-FE0031755 awarded by the Department of Energy. The government has certain rights in the invention.

FIELD

The present disclosure relates to concrete material compositions, cementitious materials, and the storage of thermal energy using such concrete compositions and cementitious materials for isothermal heat transfer devices.

BACKGROUND

Due to the volatile character of the weather-dependent power generation from renewable energies (solar and wind), the stability and reliability of the electrical grid is compromised. Large, heavy traffic Independent System Operators (ISOs) are challenged to maintain the balance between supply and demand on the grid in what is known as the "duck curve." The duck curve characteristics include a sharp midday drop in energy demand resulting from peak renewable energy production followed by a short, steep ramp-up in the early evening hours, as demand for energy increases and renewable energy production falls (see https://www.powermag.com/developments-in-energy-storage-could-spell-the-end-of-the-duck-curve/for a typical power duck curve). Additionally, peak midday renewable production exceeding demand results in the risk of oversupply, which must be managed to avoid the costly consequences associated with overgeneration, including increased costs from curtailing energy production, decreased frequency response capabilities and impact on reduced environmental benefits as a result of such curtailment. This leads to the grid becoming less reliable and is increasingly subject to disruptions.

To avoid these reliability risks, the grid needs access to automated frequency response systems that can quickly and automatically ramp up or down in the event of sudden interruptions. Renewable resources typically do not have automated frequency response capabilities. As a result, dispatchable power plants based on coal and natural gas are being used to compensate for the fluctuating power provided by renewables. Conventional generation resources can typically provide automated frequency responses and these fossil plants have been favored over energy storage resources (particularly electrochemical batteries) due to a lack of framework for the deployment of energy storage resources as well as higher storage costs. However, this way of operation is at the expense of safety and increased maintenance and operating costs of the fossil units. Best estimates of cycling costs on coal-fired power plants indicate more than a threefold increase in capital and operating and maintenance (O&M) costs due to cycling.

Thus, there is a demand for conventional power plants to become flexible. ISOs believe that a flexible energy resource is necessary to quickly react to adjusting energy production to meet sharp changes in demand. Flexible power plant operation consists of operating at extreme minimum loads, provide rapid load ramping rates, and facilitate short and efficient start-ups and shut-downs. There is a push for utilizing energy storage solutions which can integrate with conventional fossil plants in a cost-effective way. An option that is gaining a lot of attention of lately to meet the fossil power plant flexibility challenges is thermal energy storage. Available types of energy storage technologies provide electrical, chemical or mechanical stored energy. However, a need exists for thermal energy storage for integration with conventional power plants, such as for integration with the steam or the flue gas side of a fossil plant.

SUMMARY

Energy is an essential component of our culture, society and industry. As we migrate to using more and more renewable energies, energy storage will become more important since the energy availability from renewable sources does not always match our needs. Currently, it is very difficult to store electrical energy, particularly in very large or grid-scale quantities. Thermal energy storage is an alternative since conversion of thermal energy to electrical energy is the basis of thermoelectric generation. Energy stored as heat or by thermal means can be converted to electrical energy as needed, with the waste heat used for low temperature purposes. Among the many energy storage technologies, thermal energy storage is more economical and less expensive, and thus is an essential component of our technological necessities. Thermal energy storage is also useful for many other purposes such as deployment of large solar concentrated power, waste heat recovery, energy conservation and other industrial applications.

Existing solutions, such as two-tank nitrate storage systems, are not only expensive but also plagued with design and fabrication difficulties. Additionally, existing energy storage solutions have been aimed at large grid scale solutions only. Added heat transfer surfaces used in storage media can also pose some problems, particularly if the storage medium changes phase (liquid/solid) during the energy storage process.

Another challenge related to thermal energy storage has been that electrical and thermal energy storage systems have been independent of each other with electrical storage being limited to small quantities in electro-chemical media and being more expensive ($/kWh). Thermal energy storage systems of the past have not been equipped to readily store electrical energy as heat for later use.

The present disclosure provides concrete material compositions and cementitious materials that can be employed as a heat storage medium for an isothermal heat transfer devices. For instance, in accordance with some aspects of the invention, provided is a concrete material including fibers in an amount ranging from about 1 to about 2 vol. %; an aggregate in an amount ranging from about 50 to about 80 vol. %, wherein the aggregates comprises siliceous aggregate and optionally carbonate aggregate; and a cementitious material in an amount from about 12 to about 20 vol. %, wherein the cementitious material comprises a combination of about 70 to about 85 vol. % of Portland cement and about 15 to about 30 vol. % of silica fume, wherein all volume percentages unless otherwise indicated are based on the total volume of the concrete material.

According to certain embodiments, provided is a concrete material including fibers in an amount ranging from about 1 to about 2 vol. %; an aggregate in an amount ranging from about 50 to about 80 vol. %, wherein the aggregates comprises siliceous aggregate; and a cementitious material in an amount from about 12 to 20 vol. %, wherein the cementitious material comprises a combination of Portland cement and silica fume, wherein the concrete medium is adapted to have a heat capacity of about 2.0 MJ/m$^3$·K or more at a temperature of 20° C. and about 3.0 MJ/m$^3$·K or more at a temperature of 300° C., and the concrete material is adapted to have a thermal conductivity of about 2 W/m·K to about 6 W/m·K, wherein all volume percentages are based on the total volume of the concrete material.

In accordance with another aspect of the disclosure, provided is a thermal energy storage device (or a heat storage battery) having a heat storage medium comprising a concrete material composition disclosed herein and one or more heat transfer device (e.g., a thermosyphon) extending through the heat storage medium and configured to contain an operating medium, such a heat transfer fluid. The thermal energy storage device described herein utilizing direct-media thermal energy storage concept provides for a cost-effective alternative to conventional molten-salt-based energy storage systems.

Additionally, certain embodiments of the thermal energy storage device described herein are modular in design, which advantageously enables scalability in the amount of energy that can be stored (e.g., from 1 kWh to 50 MWh). The thermal energy storage device may also be configured to provide the operational flexibility, including being operated at broad range of temperatures. By achieving operational flexibility at broad range of temperatures, certain embodiments advantageously can receive an energy and/or heat source from a range of power systems and heat utilizations settings.

In one aspect, the invention may include a thermal energy storage device (or a heat storage battery) having a heat storage medium comprising a concrete material composition disclosed herein and one or more heat transfer device (e.g., a thermosyphon) extending through the heat storage medium and containing an operating medium, such a heat transfer fluid. The one or more heat transfer device may include an evaporative section configured to charge the thermal energy storage device, a condensing section configured to discharge the thermal energy storage device, and a heat transfer section extending between the evaporative section and the condensing section and fluidly coupled to the evaporative section and the condensing section. At least a portion of the heat transfer section may be disposed in the heat storage medium, and at least a portion of the evaporative section and the condensing section may be disposed outside the heat storage medium. In some embodiments, the thermal energy storage device may further include a charging plenum chamber coupled to the evaporation section of the one or more heat transfer device and a discharging plenum chamber coupled to the condensing section of the one or more heat transfer device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the exemplary embodiments of the present invention will be described with reference to the following drawings, where like elements are labeled similarly, and in which.

Figure 1:
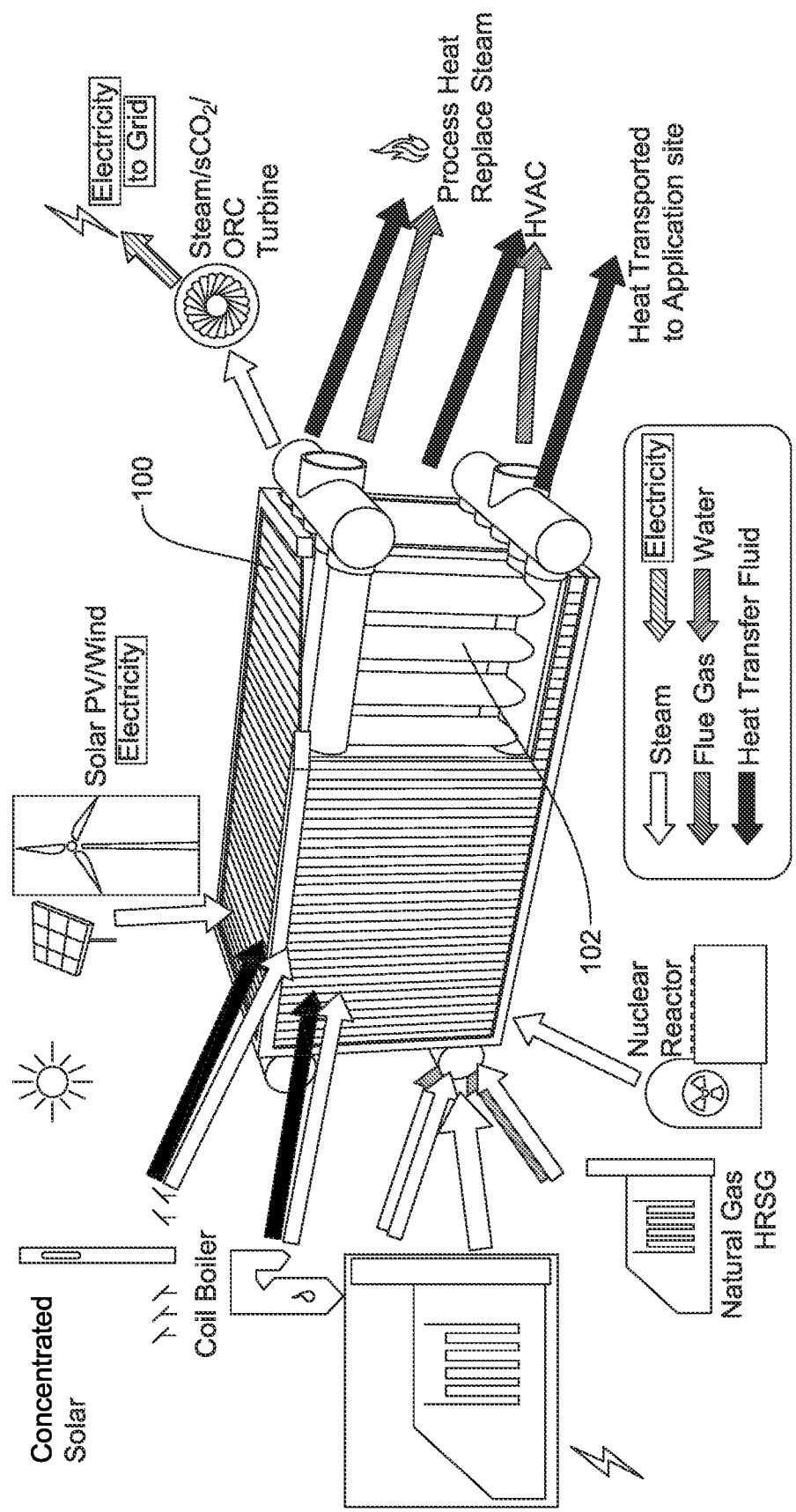
FIG. 1 illustrates a thermal energy storage system according to some embodiments.

All drawings are schematic and not necessarily to scale. However, relative positioning and sizing of components and elements within a drawing are considered accurate. Parts given a reference numerical designation in one figure may be considered to be the same parts where they appear in other figures without a numerical designation for brevity unless specifically labeled with a different part number and described herein.

DETAILED DESCRIPTION

The features and benefits of the invention are illustrated and described herein by reference to exemplary ("example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. According to the present application, the term "about" means +/−5% of the reference value. According to the present application, the term "substantially free" less than about 0.1 wt. % based on the total of the referenced value.

The present disclosure provides concrete material compositions and cementitious materials that can be employed as a heat storage medium for an isothermal heat transfer devices. For instance, in accordance with some aspects of the invention, provided is a concrete material including fibers in an amount ranging from about 1 to about 2 vol. %; an aggregate in an amount ranging from about 50 to about 80 vol. %, wherein the aggregates comprises siliceous aggregate and optionally carbonate aggregate; and a cementitious material in an amount from about 12 to about 20 vol. %, wherein the cementitious material comprises a combination of about 70 to about 85 vol. % of Portland cement and about 15 to about 30 vol. % of silica fume, wherein all volume percentages unless otherwise indicated are based on the total volume of the concrete material.

According to certain embodiments, provided is a concrete material including fibers in an amount ranging from about 1 to about 2 vol. %; an aggregate in an amount ranging from about 50 to about 80 vol. %, wherein the aggregates comprises siliceous aggregate; and a cementitious material in an amount from about 12 to 20 vol. %, wherein the cementitious material comprises a combination of Portland cement and silica fume, wherein the concrete medium is adapted to have a heat capacity of about 2.0 MJ/m$^3$·K or more at a temperature of 20° C. and about 3.0 MJ/m$^3$·K or more at a temperature of 300° C., and the concrete material is adapted to have a thermal conductivity of about 2 W/m·K to about 6 W/m·K, wherein all volume percentages are based on the total volume of the concrete material.

In further aspects of the invention, provided is a thermal energy storage device (or a heat storage battery) having a heat storage medium and one or more heat transfer device (e.g., a thermosyphon) extending through the heat storage medium (e.g., the concrete material compositions disclosed herein) and containing an operating medium, such a heat transfer fluid. The one or more heat transfer device (e.g., a thermosyphon) may include an evaporative section configured to charge the thermal energy storage device, a condensing section configured to discharge the thermal energy storage device, and a heat transfer section extending between the evaporative section and the condensing section and fluidly coupled to the evaporative section and the condensing section. At least a portion of the heat transfer section may be disposed in the heat storage medium, and at least a portion of the evaporative section and the condensing section may be disposed outside the heat storage medium. In some embodiments, the thermal energy storage device may further include a charging plenum chamber coupled to the evaporation section of the one or more thermosyphons and a discharging plenum chamber coupled to the condensing section of the one or more thermosyphons.

The thermal energy storage device described herein may include phase change media that allow for large quantities of latent heat transfer and axial isothermality due to the phase change process inside the thermosyphon. Additionally, radial distributions of the thermosyphons in some implementations further allow for near uniform radial distributions of temperature in the storage medium.

The thermal energy storage device described herein may isolate the charging and discharging heat transfer processes, allowing different hot and cold heat transfer fluids to be used for energy input and energy output. Thus, different heat transfer fluids, fluid flow rates, and/or rates of heat transfer can be implemented for the energy input and output processes.

The thermal energy device may be configured for rapid charging and/or discharging of energy (e.g., heat). For example, certain embodiments of the thermal energy device have components, such as a charging plenum, thermosiphon, and heat storage medium, that are specifically configured such that the heat storage medium has a charging rate of about 1 kW to about 20 kW. For instance, certain embodiment of the thermal energy device are configured to have a charging rate from about 5 to about 20 kW, about 10 to about 20 kW, about 13 to about 20 kW, about 16 to about 20 kW; from about 1 to about 17 kW, about 5 to about 17 kW, about 10 to about 17 kW, about 13 to about 17 kW, about 16 to about 17 kW; from about 1 to about 14 kW, about 5 to about 14 kW, about 10 to about 14 kW; from about 1 to about 11 kW, about 5 to about 11 kW; from about 1 to about 9 kW, about 5 to about 9 kW; from about 1 to about 7 kW, about 5 to about 7 kW, about 1 to about 5 kW, or any range or subrange thereof.

The thermal energy device may also be preferably configured to discharge energy at higher powers and/or the rates of energy. For example, the thermal energy storage device may be configured to release heat at 1 kWh to about 20 MWh during discharging. In some embodiments, the thermal energy device is preferably configured to release heat at from about 1 to about 20 MW, about 5 to about 20 MW, about 10 to about 20 MW, about 13 to about 20 MW, about 16 to about MW; from about 1 to about 17 MW, about 5 to about 17 MW, about 10 to about 17 MW, about 13 to about 17 MW, about 16 to about 17 MW; from about 1 to about 14 MW, about 5 to about 14 MW, about 10 to about 14 MW; from about 1 to about 11 MW, about 5 to about 11 MW; from about 1 to about 9 MW, about 5 to about 9 MW; from about 1 to about 7 MW, about 5 to about 7 MW, about 1 to about 5 MW, or any range or subrange thereof. In further embodiments, the thermal energy device is configured to release heat at from about 1 kW to about 5 MW, about 1 kW to about 4 MW, about 1 kW to about 3 MW, about 1 kW to about 2 MW, about 1 kW to about 1 MW, about 1 kW to about 800 kW, about 1 kW to about 500 kW, about 1 kW to about 300 kW, about 1 kW to about 100 kW; from about 300 kW to about 5 MW, about 300 kW to about 4 MW, about 300 kW to about 3 MW, about 300 kW to about 2 MW, about 300 kW to about 1 MW, about 300 kW to about 800 kW; from about 600 kW to about 5 MW, about 600 kW to about 4 MW, about 600 kW to about 3 MW, about 600 kW to about 2 MW, about 600 kW to about 1 MW, about 600 kW to about 800 kW; from about 1 MW to about 5 MW, about 1 MW to about 4 MW, about 1 MW to about 3 MW, about 1 MW to about 2 MW, or any range or subrange thereof.

The thermal energy storage device described herein can be used to enhance flexibility of thermal power plants, to produce electricity, to be used as process heat in industrial applications, and so on. In certain embodiments, the thermal energy storage may be configured for short-term or long-term storage of thermal and/or electrical energy for subsequent delivery of heat transfer media, such as hot gases, hot heat transfer fluids, hot water or steam, supercritical carbon dioxide ($sCO_2$), etc., for further utilization. For example, the thermal energy storage of the present disclosure may be configured to retain at least 90% of the heat stored in the heat storage medium for about 24 hours or more. In some instance, the thermal energy storage may retain at least 90%, preferably about 92% or more, preferably about 94% or more, preferably about 96% or more, preferably about 98% or more, preferably about 99% or more, or about 100% of the heat stored in the heat storage medium for about 24 hours, preferably about 28 hours or more, preferably about 32 hours or more, preferably about 36 hours or more, preferably about 40 hours or more, preferably about 44 hours or more, preferably about 48 hours or more, preferably about 60 hours or more, preferably about 72 hours or more, or preferably about 84 hours or more.

Certain embodiments may be configured to employ inexpensive media for an integrated sensible and/or latent heat thermal energy storage. In some embodiments, the proposed solution/system uses a solid-state thermal energy storage medium, including but not limited to cementitious materials (e.g., concretes), ceramics, aluminum oxide, alumina silicates, etc., for energy storage. The alumina silicates may be selected from andalusite, kyanite, sillimanite, kaolinite, and a combination of two or more thereof. Examples of alumina silicates that may be employed include, but are not limited to, $Al_2SiO_5$, $Al_2Si_2O_7$, $Al_6Si_2O_{13}$, Si—Al—O or a combination of two or more thereof. In some embodiments, the proposed solution/system can lead to scalable thermal energy storage systems from kWh to MWh scales, for a broad range of temperatures from 100° C. to 800° C.

The thermal energy storage device and/or system described herein solves many issues involved with the transfer of energy into/out of thermal energy storage media, as well as the rate at which it can be accomplished. Thermosyphons implemented in the thermal energy storage device and/system described herein are dynamic devices for energy transfer but are very reliable since they have no moving parts. Energy transfer is accomplished with the boiling and condensing of a transfer medium inside the thermosyphons. In some embodiments, the same thermosyphons are used to transfer energy into, as well as, out of the storage medium, thereby decreasing overall costs of implementing the thermal energy storage device and/or system.

Referring to FIG. 1, a thermal energy storage system 100 (also referred to as a thermal battery system) according to some embodiments is illustrated. The thermal energy storage system 100 may include multiple thermal energy storage devices 102, which can be coupled in parallel as described in more detail below. The thermal energy storage system 100 may be charged with various sources. In some embodiments, the thermal energy storage system 100 may be charged with electricity from renewable sources (wind turbine or photovoltaic (PV) panels) through heating coils. In some embodiments, the thermal energy storage system 100 may be charged with steam, hot water and/or a hot gas (e.g., a flue gas from coal, natural gas combined cycle, concentrated solar, and nuclear power plants). In some embodiments, the thermal energy storage system 100 may be charged with a heat transfer fluid used in a heat exchanger (e.g., a direct or indirect heat exchanger). In some embodiments, the thermal energy stored in the thermal energy storage system 100 may be discharged to steam, water, flue gas, and/or heat transfer fluid to increase the enthalpy value thereof for further utilization as process heat. In some embodiments, the thermal energy stored in the thermal energy storage system 100 may be discharged to generate electricity by way of a steam turbine, $sCO_2$-driven turbine cycle, and/or organic Rankine cycle (ORC) turbines. In some embodiments, the thermal energy stored in the thermal energy storage system 100 may be discharged for heating and/or cooling and air conditioning (HVAC) applications.

Figure 2:
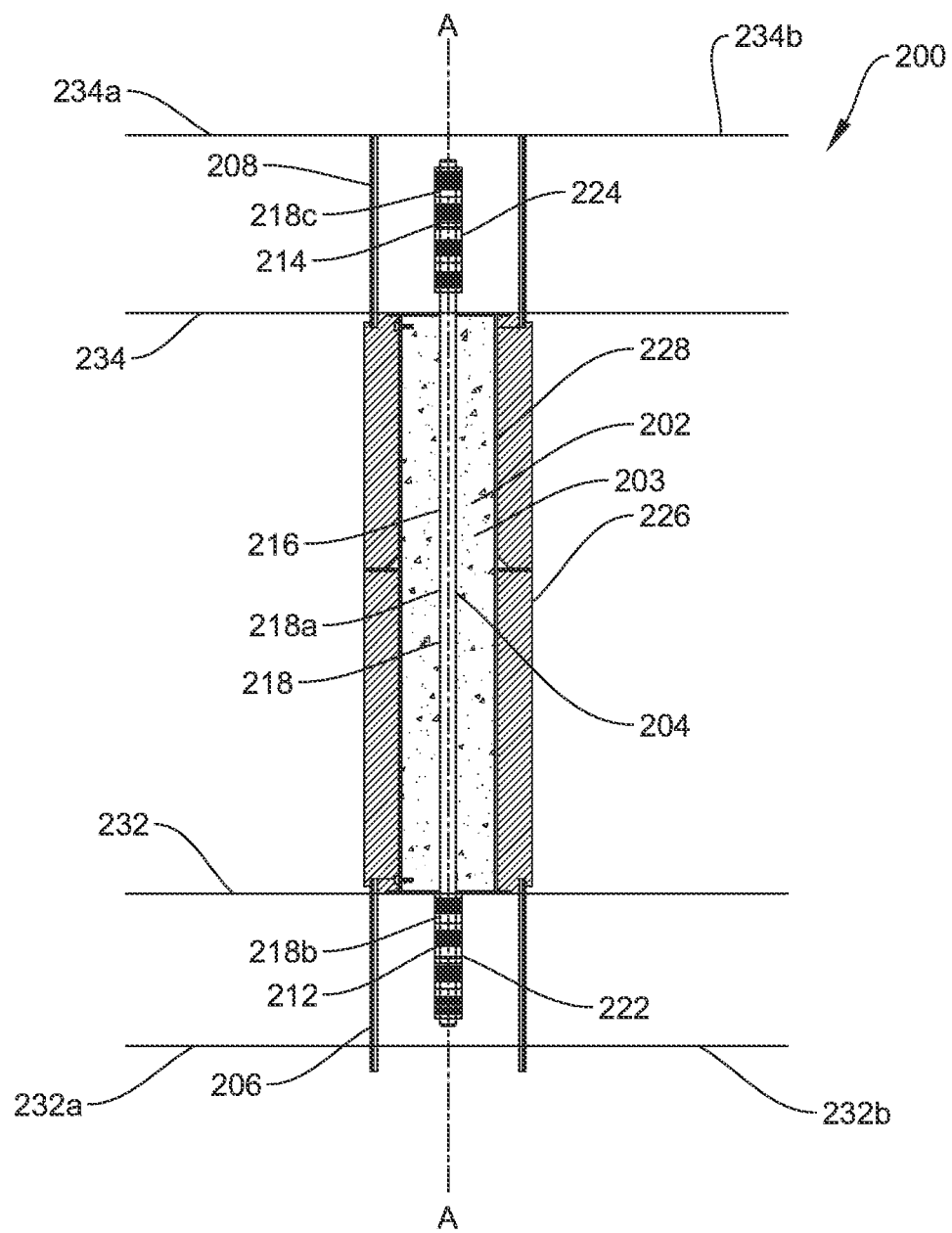
FIG. 2 illustrates a thermal energy storage device according to some embodiments.

With reference to FIG. 2, provided is a non-limiting, exemplary thermal energy storage device 200 (sometimes referred to herein as a thermal battery) according to some aspects of the invention. In some embodiments, the thermal energy storage device 200 may include a heat storage medium 202; one or more heat transfer device, which is in the form of a thermosyphons 204; a charging plenum or charging plenum chamber 206; and a discharging plenum or discharging plenum chamber 208. The thermal energy storage device 200 may be configured for storage of electrical and/or thermal energy in the heat storage medium 202. Although only one thermosyphon 204 is shown in FIG. 2, embodiments of the invention may comprise more than one thermosiphon 204, such as a plurality of thermosyphons. Further, although exemplary the heat transfer device is in the form of a thermosyphon 204 in FIG. 2, the heat transfer device may be in the form of a heat pipe, two-phase enclosed device, and/or a heat exchanger.

In some embodiments, thermosyphon 204 may include an evaporative section 212 configured to charge the thermal energy storage device 200, a condensing section 214 configured to discharge thermal energy storage device 200, and a heat transfer section 216 extending between evaporative section 212 and condensing section 214 and fluidly coupled to the evaporative section 212 and the condensing section 214. In some embodiments, at least a portion of heat transfer section 216 may be disposed in heat storage medium 202, while at least a portion of evaporative section 212 and/or condensing section 214 may be disposed outside heat storage medium 202. In at least one embodiment, the entirety of heat transfer section 216 is disposed within heat storage medium 202. Additionally and/or alternatively, thermal energy storage device 200 may be configured such that the entirety of evaporative section 212 and/or the entirety of condensing section 214 are positioned outside of heat storage medium 202. As also shown in FIG. 2, in some embodiments, evaporative section 212 and/or condensing section 214 may include heat transfer enhancers 222, 224. Heat transfer enhancers 222, 224 may be fins and/or coils extending from a surface of evaporative section 212 and/or condensing section 214. In some embodiments, transfer enhancers 222, 224 may be in the form of a roughened surface that is adapted to promote heat transfer to and/or from evaporative section 212 and/or condensing section 214.

The heat transfer device (e.g., thermosyphon 204) be formed of a single integral component, which contains an operating medium. The heat transfer device have an inner surface that defines an internal chamber. The internal chamber may be completely encapsulated by the inner surface of the heat transfer device, such that the operating medium in the internal chamber is completely encapsulated and contained in the heat transfer device (e.g., thermosyphon 204).

Thermosyphon 204 may be configured such that heat transfer section 216 and evaporative section 212 form a single integral component. Additionally or alternatively, heat transfer section 216 and condensing section 214 may form a single integral component. In some embodiments, as illustrated in FIG. 2, thermosyphon 204 may be configured such that evaporative section 212, heat transfer section 216, and condensing section 214 may form a single integral component.

The thermosyphon 204 may be configured as a continuous hollow body 218. The hollow body 218 may include a middle section 218a disposed in the heat storage medium 202 forming the heat transfer section 216. The hollow body 218 may further include a first end section 218b and a second end section 218c opposed the first end section 218b. The first second end section 218b may form at least a portion of evaporative section 212 while the second end section 218c may form at least a portion of condensing section 214. The hollow body 218 may form a pressure controlled envelope. An operating medium (not shown in FIG. 2) may be disposed inside the continuous hollow body 218 for heat transfer via, e.g., sensible and/or latent heat transfer, to charge and/or discharge the thermal energy storage device 200 as described in further detail below. The thermosyphon 204 described herein allows dual operation to charge and discharge the thermal energy storage device 200. In some embodiments, thermosyphon 204 may be referred to as dual action thermosyphon 204.

With further reference to FIG. 2, in some embodiments, charging plenum chamber 206 is fluidically coupled to a charging channel 232. A first heat transfer medium (or a heating medium) having a temperature greater than the heat storage medium 202 may be flowed through charging channel 232 to charge thermal energy storage device 200. Charging channel 232 may include an input channel portion 232a fluidically coupled to an inlet of charging plenum chamber 206, such that the first heat transfer medium can flow from charging channel 232 into charging plenum chamber 206. Charging channel 232 may further include an output channel portion 232b fluidly coupled to an outlet of the charging plenum chamber 206, such that the first heat transfer medium may to flow out of the charging plenum chamber 206.

The first heat transfer medium may comprise water, steam, supercritical carbon dioxide ($sCO_2$), thermal oil, or any other suitable heat transfer fluid. For example, in some embodiments, the first heat transfer media may be selected from hot flue gas and/or hot water received from a power plant and/or industrial plant in liquid and/or vapor phase. Electrical energy from a power plant, e.g., a solar plant, can also be used to heat evaporative section 212 of thermosyphon 204 via radiant electrical heaters.

During the charging process, the first heat transfer medium for charging thermal energy storage device 200 may be flowed through charging channel 232 into the charging plenum chamber 206. The first heat transfer medium may contact evaporative section 212 and heat transfer enhancers 222, if present, to transfer heat from the first heat transfer medium to thermosyphon 204 and the operating medium contained in the thermosyphon 204 and then to heat storage medium 202.

Discharging plenum chamber 208 may be fluidically coupled to a discharging channel 234 through which a second heat transfer medium (or a cooling medium) having a temperature less than heat storage medium 202 may be flow though during discharge of thermal energy storage device 200. Discharging channel 234 may include an input channel portion 234a fluidically coupled to an inlet of discharging plenum chamber 208 for receiving the second heat transfer medium, such that the second heat transfer medium flows from discharging channel 234 into discharging plenum chamber 208. Discharging channel 234 may further include an output channel portion 234b fluidly coupled to an outlet of the discharging plenum chamber 208 for the second heat transfer medium after contacting thermosyphon 204 to flow out of the discharging plenum chamber 208. The second heat transfer medium may comprise water, steam, supercritical carbon dioxide ($sCO_2$), thermal oil, or any other suitable heat transfer fluid.

During the discharging process, the second heat transfer medium may be flowed through the discharging channel 234 into the discharging plenum chamber 208. The second heat transfer medium may contact condensing section 214 and heat transfer enhancers 224, if present, to allow heat to be transferred from heat storage medium 202 to the second heat transfer medium via heat transfer section 216 of thermosyphon 204 and the operating medium contained in thermosyphon 204 as will be discussed in more detail below.

In some embodiments, during the charging process, the inlet and/or the outlet of the discharging plenum chamber 208 and the flow of the second heat transfer medium through the discharging plenum chamber 208 may be prevented. Additionally or alternatively, during the discharging process, the inlet and/or the outlet of the charging plenum chamber 206 and the flow of the first heat transfer medium through the charging plenum chamber 206 may be prevented.

Referring back to FIG. 2, thermal energy storage device 200 may include a central axis A-A. In some embodiments, the heat storage medium 202 may have an elongate body 203 extending along the central axis A-A. Elongate body 203 of the heat storage medium 202 may in some instance be cylindrical, cubic, rectangular, octagonal, hexagonal, or triangular. For example, in some embodiments, thermal energy storage device 200 is configured to be modular and has a elongate body 203 that is in the form of cubic shape, rectangular shape, octagonal shape, or hexagonal shape, e.g., to improve the packing arrangement and/or a efficiency of a system comprising a plurality of the thermal energy storage devices.

The cross-sectional profile that is traverse to the central axis A-A of elongate body 203 of heat storage medium 202 may be circular and may be consistent along the central axis A-A of the thermal energy storage device 200. In some embodiments, where elongate body 203 is configured to be cubic, rectangular, octagonal, hexagonal, or triangular, the cross-sectional profile that is traverse to the central axis A-A corresponds to the shape of elongate body 203.

The central axis of thermosyphon 204 and/or the central axis of heat storage medium 202 may align with the central axis A-A of thermal energy storage device 200. For example, hollow body 218 of thermosyphon 204 may extend along an axis that is parallel to central axis A-A of thermal energy storage device 200. In some embodiments, thermosyphon 204 is configured to be coaxial with central axis A-A of thermal energy storage device 200. Additionally or alternatively, elongate body 203 of heat storage medium 202 may have a longitudinal axis that aligns with central axis A-A of thermal energy storage device 200. Thermal energy storage device 200 may be configured such that the longitudinal axis of elongate body 203 of heat storage medium 202 is coaxial with central axis A-A of thermal energy storage device 200. In at least one embodiment, thermosyphon 204 and elongate body 203 of heat storage medium 202 are coaxial with central axis A-A of thermal energy storage device 200. Heat transfer between thermosyphon 204 and heat storage medium 202 may occur in a radial direction or substantially radial direction from central axis A-A during charging of the thermal energy storage device 200 or towards central axis A-A during discharging of thermal energy storage device 200.

Elongate body 203 of heat storage medium 202 may have an inner diameter ranging from about 1 to about 5 meters. In some embodiments, the diameter of elongate body 203 is from about 1 to about 4.5 meters, about 1 to about 4 meters, about 1 to about 3 meters, about 1 to about 2 meters, about 1 to about 1.5 meters; from about 1.25 to about 5 meters, about 1.25 to about 4 meters, about 1.25 to about 3 meters, about 1.25 to about 2 meters, about 1.25 to about 1.5 meters; from about 1.5 to about 5 meters, about 1.5 to about 4 meters, about 1.5 to about 3 meters, about 1.5 to about 2 meters; from about 2 to about 5 meters, about 2 to about 4 meters, about 2 to about 3 meters; from about 3 to about 5 meters, about 3 to about 4 meters, about 4 to about 5 meters, or any range or subrange thereof.

The hollow body 218 of thermosyphon 204 may have an outer diameter ranging from about to about 100 millimeters. For example, the out diameter of thermosyphon 204 may be from about 10 to about 90 millimeters, about 10 to about 80 millimeters, about 10 to about 70 millimeters, about 10 to about 60 millimeters, about 10 to about 50 millimeters, about 10 to about millimeters, about 10 to about 30 millimeters, about 10 to about 25 millimeters, about 10 to about 20 millimeters; from about 20 to about 100 millimeters, about 20 to about 90 millimeters, about 20 to about 80 millimeters, about 20 to about 70 millimeters, about 20 to about 60 millimeters, about 20 to about 50 millimeters, about 20 to about 40 millimeters, about 20 to about millimeters, about 20 to about 25 millimeters; about 25 to about 100 millimeters, about 25 to about 90 millimeters, about 25 to about 80 millimeters, about 25 to about 70 millimeters, about 25 to about 60 millimeters, about 25 to about 50 millimeters, about 25 to about 40 millimeters, about to about 30 millimeters; about 35 to about 100 millimeters, about 35 to about 90 millimeters, about 35 to about 80 millimeters, about 35 to about 70 millimeters, about 35 to about 60 millimeters, about 35 to about 50 millimeters, about 35 to about 40 millimeters; from about 45 to about 100 millimeters, about 45 to about 90 millimeters, about 45 to about 80 millimeters, about to about 70 millimeters, about 45 to about 60 millimeters, about 45 to about 50 millimeters; from about 55 to about 100 millimeters, about 55 to about 90 millimeters, about 55 to about 80 millimeters, about 55 to about 70 millimeters, about 55 to about 60 millimeters; from about 70 to about 100 millimeters, about 70 to about 90 millimeters, about 70 to about 80 millimeters; about to about 100 millimeters, about 85 to about 90 millimeters, or any range or subrange thereof.

Thermal energy storage 200 may be configured such that isothermal heat transfer or substantially isothermal heat transfer along the radial direction within the heat storage medium 202 may be achieved. Without being limited to any particular theory, the inventors discovered that certain ratios of the outer diameter of thermosyphon 204 to the outer diameter of elongate body 203 of the heat storage medium 202 promotes isothermal heat transfer along the radial direction within the heat storage medium. In some embodiment, thermal energy storage 200 is configured to have a ratio of the outer diameter of thermosyphon 204 to the outer diameter of elongate body 203 of the heat storage medium 202 that is from about 1:20 to about 1:60. For example, the ratio of the outer diameter of thermosyphon 204 to the outer diameter of elongate body 203 of the heat storage medium 202 may be from about 1:20 to about 1:60, about 1:25 to about 1:60, about 1:30 to about 1:60, about 1:35 to about 1:60, about 1:40 to about 1:60, about 1:50 to about 1:60; from about 1:20 to about 1:50, about 1:25 to about 1:50, about 1:30 to about 1:50, about 1:35 to about 1:50, about 1:40 to about 1:50; from about 1:20 to about 1:45, about 1:25 to about 1:45, about 1:30 to about 1:45, about 1:35 to about 1:45, about 1:40 to about 1:45; from about 1:20 to about 1:40, about 1:25 to about 1:40, about 1:30 to about 1:40, about 1:35 to about 1:40; from about 1:20 to about 1:35, about 1:25 to about 1:35, about 1:30 to about 1:35; from about 1:20 to about 1:25, or any range or subrange thereof.

In some embodiments, the thermal energy storage device 200 may further include insulation 226 provided on the exterior of the heat storage medium 202. In some embodiments, the insulation 226 may include mineral wool, aluminum foil, vacuum, or any other suitable insulation material.

In some embodiments, the thermal energy storage device 200 may further include a confinement layer 228 disposed between the heat storage medium 202 and the insulation 226. In some embodiments, the confinement layer 228 may be configured for casting and/or housing the heat storage medium 202. In some embodiments, the confinement layer 228 may be constructed of steel, Inconel, or any other suitable materials. The confinement layer 228 may have a thickness ranging from about 1 to about 25 mm. For example, confinement layer 228 may have a thickness from about 1 to about 25 mm, about 5 to about 25 mm, about 10 to about 25 mm, about 15 to about 25 mm, about 18 to about 25 mm, about 21 to about 25 mm, about 23 to about 25 mm; from about 1 to about 22 mm, about 5 to about 22 mm, about 10 to about 22 mm, about 15 to about 22 mm, about 18 to about 22 mm; from about 1 to about 19 mm, about 5 to about 19 mm, about 10 to about 19 mm, about 15 to about 19 mm;

from about 1 to about 16 mm, about 5 to about 16 mm, about 10 to about 16 mm, about 13 to about 16 mm; from about 1 to about 11 mm, about 5 to about 11 mm; from about 1 to about 6 mm, about 3 to about 6 mm, about 1 to about 4 mm, about 1 to about 3 mm, or any range or subrange thereof.

Heat storage medium 202 is generally configured to retain heat energy therein. Heat storage medium 202 may be a solid, a liquid, or a pseudo solid liquid. In some embodiments, the heat storage medium 202 may include a heat storage medium having two or more mixed phases.

Heat storage medium 202 may undergo a phase change and/or a change in temperature during charging and/or discharging. For example, as the heat storage medium 202 is charged (i.e., absorbing heat) or discharged (i.e., releasing heat), the temperature of heat storage medium 202 may increase or decrease, but the phase of the heat storage medium 202 does not change (i.e., remaining solid, liquid, or gas). In these embodiments, the heat storage medium 202 may absorb (or release) sensible heat, and the thermal energy storage device 200 may be referred to as a sensible heat storage device.

In some embodiments, as heat storage medium 202 is charged (i.e., absorbing heat) or discharged (i.e., releasing heat), the heat storage medium 202 may undergo a phase change (e.g., from solid to liquid or vice versa, from solid to gas or vice versa, from liquid to gas or vice versa). The heat storage medium 202 may undergo a phase change with or without further temperature increase or decrease. For instance, thermal energy storage device 200 may be configured such that heat storage medium 202=absorbs or releases latent heat only.

In some embodiments, in addition to undergoing a phase change, the temperature of the heat storage medium 202 may further increase prior to or after phase change during charging (or decrease prior to or after phase change during discharge). For example, thermal energy storage device 200 may be configured such that heat storage medium 202 may absorb (or release) both sensible heat and latent heat. The thermal energy storage device 200 may be referred to as a latent-sensible heat storage device.

The heat storage medium 202 may include a mixture of phase-changing material and a non-phase-changing material. For example, the heat storage medium 202 may include one or more phase-changing materials in non-phase changing matrices having high conductivity. In some embodiments, thermochemical heat transfer using metals oxides and alkaline earth metals in packed and fluidized bed arrangements may be implemented.

In some embodiments, the heat storage medium 202 may include an concrete medium, which is sometimes referred to herein as a concrete material. The concrete medium may be formed from a formulation that mitigates degradation of strength and/or thermal properties of the heat storage medium at high operational temperatures, e.g., 400° C. or higher, and/or under cycling conditions.

The concrete medium typically comprises an aggregate, a cementitious material, and preferably fibers. The concrete medium may be formed from mixing water and a dry blend comprising the aggregate, the cementitious material, and preferably the fibers, and then curing the mixture. The composition of the concrete medium, including the amount of the aggregate, the cementitious material, and/or the fibers, may be measured using volumetric percentages based on a total volume of the dry blend, free water volume, and any entrapped air voids in the concrete medium (e.g., measured before or, in some embodiments, after curing). The total volume of the dry blend may be defined as the summation of the dry volume of each ingredient forming the dry blend prior to mixing. The free water volume may be defined as the total water volume added minus the amount of water volume absorbed into the pores of the aggregate.

The concrete medium typically comprises an aggregate, e.g., in an amount from about 40% to about 80% or from about 53% to about 72% by volume, based on a total volume, e.g., of the dry blend, or in some embodiments including water. In some embodiments, the aggregate may be present in an amount ranging from about 40% to about 80%, from about 45% to about 80%, from about 50% to about 80%, from about 55% to about 80%, from about 60% to about 80%, from about 65% to about 80%, from 70% to about 80%, from about 75% to about 80%, from about 40% to about 75%, from about 45% to about 75%, from about 50% to about 75%, from about 55% to about 75%, from about 60% to about 75%, from about 65% to about 75%, from 70% to about 75%, from about 40% to about 70%, from about 45% to about 70%, from about 50% to about 70%, from about 55% to about 70%, from about 60% to about 70%, from about 65% to about 70%, from about 40% to about 65%, from about 45% to about 65%, from about 50% to about 65%, from about 55% to about 65%, from about 60% to about 65%, from about 40% to about 60%, from about 45% to about 60%, from about 50% to about 60%, from about 55% to about 60%, from about 40% to about 55%, from about 45% to about 55%, from about 50% to about 55%, from about 40% to about 50%, from about 45% to about 50%, or from about 40% to about 45%, including all ranges and subranges thereof, by volume based on the total volume of the dry blend, or in some embodiments including water.

The aggregate may comprise a combination of a coarse aggregate and a fine aggregate. The coarse aggregate may have an average grain size ranging from about 0.5 mm to about 20 mm or from about 1 mm to about 19 mm, including any ranges or subranges thereof. For example, in some embodiments, the coarse aggregate may have an average grain size ranging from about 0.5 mm to about 20 mm, about 1 mm to about 20 mm, about 5 mm to about 20 mm, about 10 mm to about 20 mm, about 15 mm to about 20 mm; from about 0.5 mm to about 15 mm, about 1 mm to about 15 mm, about 5 mm to about 15 mm, about 10 mm to about 15 mm; from about 0.5 mm to about 10 mm, about 1 mm to about 10 mm, about 5 mm to about 10 mm; from about 0.5 mm to about 5 mm, from about 1 mm to about 5 mm, or any range or subrange thereof.

The coarse aggregate may be present in an amount ranging from 20% to 40% by volume based on the total volume of the dry blend. For example, the coarse aggregate may be present in the dry blend in an amount ranging from 20% to about 40%, about 25% to about 40%, about 30% to about 40%, about 35% to about 40%; from about 20% to about 35%, about 25% to about 35%, about 30% to about 35%; from about 20% to about 30%, about 25% to about 30%, or about 20% to about 25%, including any range or subrange thereof, by volume based on the total volume of the dry blend, or in some embodiments including water.

The fine aggregate may have an average grain size ranging from about 50 μm to about 12 mm or from about 75 μm to about 9.5 mm. In some embodiments, the fine aggregate has an average grain size ranging from about 50 μm to about 12 mm, about 75 μm to about 12 mm, about 100 μm to about 12 mm, about 500 μm to about 12 mm, about 1 mm to about 12 mm, about 5 mm to about 12 mm; from about 50 μm to about 5 mm, about 75 μm to about 5 mm, about 100 μm to about 5 mm, about 500 μm to about 5 mm, about 1 mm to about 5 mm; from about 50 µm to about 1 mm, about 75 µm to about 1 mm, about 100 µm to about 1 mm, about 500 µm to about 1 mm; from about 50 µm to about 500 µm, about 75 µm to about 500 µm, about 100 µm to about 500 µm, about µm to about 100 µm, or any range or subrange thereof.

In some embodiments, the fine aggregate may be present in an amount ranging from 20% to 40%, by volume based on the total volume of the dry blend. For example, in some embodiments, the fine aggregate may be present in the dry blend in an amount ranging from 20% to about 40%, about 25% to about 40%, about 30% to about 40%, about 35% to about 40%; from about 20% to about 35%, about 25% to about 35%, about 30% to about 35%; from about 20% to about 30%, 25% to about 30%, about 20% to about 25%, or any range or subrange thereof, by volume based on the total volume of the dry blend, or in some embodiments including water.

The concrete medium may be formulated to have certain volumetric ratios of coarse aggregate to fine aggregate. For instance, the volumetric ratio of the coarse aggregate to the fine aggregate may range from about 0.5:1 to about 2:1, from about 1:1 to about 2:1, from about 1.5:1 to about 2:1, from about 0.5:1 to about 1.5:1, from about 1:1 to about 1.5:1, or from about 0.5:1 to about 1:1, or any range or subrange thereof. In some embodiments, the volumetric ratio of the coarse aggregate to the fine aggregate may be about 1:1.

The aggregate may comprise siliceous aggregate, carbonate aggregate, or a combination of two or more thereof. The siliceous aggregate may be selected from siliceous materials, such as granite, quartzite, silica, etc. When siliceous aggregate is present, the siliceous aggregate may be coarse aggregate and/or fine aggregate. In some embodiments, both the coarse aggregate and the fine aggregate comprise siliceous aggregate. In at least one embodiment, the fine aggregate may include silica sand.

The carbonate aggregate may be selected from basalt, diabase, limestone, and a combination of two or more thereof. In some embodiments, the aggregate is free of carbonate aggregate.

In some embodiments, the coarse aggregate may have a specific gravity ranging from about 2 to about 3. The coarse aggregate may, in some cases, have a specific gravity from about 2 to about 3, about 2.2 to about 3, about 2.4 to about 3, about 2.6 to about 3, about 2.8 to about 3; from about 2 to about 2.8, about 2.2 to about 2.8, about 2.4 to about 2.8, about 2.6 to about 2.8; from about 2 to about 2.6, about 2.2 to about 2.6, about 2.4 to about 2.6; from about 2 to about 2.4, about 2.2 to about 2.4; from about 2 to about 2.2, or any range or subrange thereof. In some embodiments, the fine aggregate may have a specific gravity ranging from about 2 to about 3. The fine aggregate may, in some cases, have a specific gravity from about 2 to about 3, about 2.2 to about 3, about 2.4 to about 3, about 2.6 to about 3, about 2.8 to about 3; from about 2 to about 2.8, about 2.2 to about 2.8, about 2.4 to about 2.8, about 2.6 to about 2.8; from about 2 to about 2.6, about 2.2 to about 2.6, about 2.4 to about 2.6; from about 2 to about 2.4, about 2.2 to about 2.4; from about 2 to about 2.2, or any range or subrange thereof.

The aggregate may have a thermal conductivity ranging from about 2 W/m·K to about 6 W/m·K or from about 2.9 W/m·K to about 5.2 W/m·K. For example, the aggregate may have a thermal conductivity ranging from about 2 W/m·K to about 6 W/m·K, about 2.5 W/m·K to about 6 W/m·K, about 3 W/m·K to about 6 W/m·K, about 3.5 W/m·K to about 6 W/m·K, about 4 W/m·K to about 6 W/m·K, about 4.5 W/m·K to about 6 W/m·K, about 5 W/m·K to about 6 W/m·K, about 5.5 W/m·K to about 6 W/m·K; from about 2 W/m·K to about 5.5 W/m·K, about 2.5 W/m·K to about 5.5 W/m·K, about 3 W/m·K to about 5.5 W/m·K, about 3.5 W/m·K to about 5.5 W/m·K, about 4 W/m·K to about 5.5 W/m·K, about 4.5 W/m·K to about 5.5 W/m·K, about 5 W/m·K to about 5.5 W/m·K; from about 2 W/m·K to about 5 W/m·K, about 2.5 W/m·K to about 5 W/m·K, about 3 W/m·K to about 5 W/m·K, about 3.5 W/m·K to about 5 W/m·K, about 4 W/m·K to about W/m·K, about 4.5 W/m·K to about 5 W/m·K; from about 2 W/m·K to about 4.5 W/m·K, about 2.5 W/m·K to about 4.5 W/m·K, about 3 W/m·K to about 4.5 W/m·K, about 3.5 W/m·K to about 4.5 W/m·K, about 4 W/m·K to about 4.5 W/m·K, about 2 W/m·K to about 4 W/m·K, about 2.5 W/m·K to about 4 W/m·K, about 3 W/m·K to about 4 W/m·K, about 3.5 W/m·K to about 4 W/m·K; from about 2 W/m·K to about 3.5 W/m·K, about 2.5 W/m·K to about 3.5 W/m·K, about 3 W/m·K to about 3.5 W/m·K; from about 2 W/m·K to about 3 W/m·K, about 2.5 W/m·K to about 3 W/m·K, about 2 W/m·K to about 2.5 W/m·K, or any range or subrange thereof.

The concrete medium typically comprises a cementitious material, e.g., in an amount from about 5% to about 30% or from about 12% to 20%, by volume based on the total volume of the dry blend. For instance, the cementitious material may be present in the dry blend in an amount ranging from about 5% to about 30%, from about 10% to about 30%, from about 15% to about 30%, from about 20% to about 30%, from about 25% to about 30%, 5% to about 25%, from about 10% to about 25%, from about 15% to about 25%, from about 20% to about 25%, 5% to about 20%, from about 10% to about 20%, from about 15% to about 20%, 5% to about 15%, from about 10% to about 15%, from about 5% to about 10%, or any range or subrange thereof, by volume based on the total volume of the dry blend, or in some embodiments including water.

The cementitious material may comprise a first or primary cementitious material and optionally a secondary or supplemental cementitious material. In at least one preferable embodiment, the cementitious material comprises primary cementitious material and a secondary cementitious material. The primary cementitious material may be selected from a Portland cement, such as a Type I Portland cement. The supplemental cementitious material may comprise silica fume, slag, fly ash, metakaolin, or a combination of two or more thereof.

The primary cement may be present in an amount ranging from about 70% to about 100%, from about 80% to about 95%, or about 85%, by weight based on a total weight of the cementitious material. For example, in some embodiments, the primary cementitious material may include from about 70% to about 100%, about 75% to about 100%, about 80% to about 100%, about 85% to about 100%, about 90% to about 100%, about 95% to about 100%; from about 70% to about 95%, about 75% to about 95%, about 80% to about 95%, about 85% to about 95%, about 90% to about 95%; from about 70% to about 90%, about 75% to about 90%, about 80% to about 90%, about 85% to about 90%; from about 70% to about 85%, about 75% to about 85%, about 80% to about 85%, about 70% to about 80%, about 75% to about 80%, about 70% to about 75%, or any range or subrange thereof, by weight based on a total weight of the cementitious material.

In some embodiments, the supplemental cementitious material may be present in an amount ranging from about 0% to about 30%, from about 5% to about 20%, or about 15%, by weight based on the total weight of the cementitious material. For example, the supplemental cementitious material may be present in an amount from about 0% to about 30%, about 5% to about 30%, about 10% to about 30%, about 15% to about 30%, about 20% to about 30%, about 25% to about 30%; from about 0% to about 25%, about 5% to about 25%, about 10% to about 25%, about 15% to about 25%, 20% to about 25%; from about 0% to about 20%, about 5% to about 20%, about 10% to about 20%, about 15% to about 20%; from about 0% to about 15%, about 5% to about 15%, about 10% to about 15%; from about 0% to about 10%, from about 5% to about 10%, from about 0.01% to about 5%, or any range or subrange thereof, based on the total weight of the cementitious material. In some embodiments, the cementitious material is free or substantially free of supplemental cementitious material.

In certain preferred embodiments, the concrete medium/material may comprise or consist of a combination of about 70 to about 85 vol. % of Portland cement and about 15 to about 30 vol. % of silica fume. For instance, the concrete medium/material may, in certain preferred embodiments, comprise a combination of Portland cement in an amount from about 75 to about 85 vol. %, about to about 85 vol. %, about 70 to about 80 vol. %, or about 70 to about 75 vol. % and silica fume in an amount of about 15 to about 30 vol. %, about 15 to about 25 vol. %, about 15 to about 20 vol. %, about 20 to about 30 vol. %, about 25 to about 30 vol. %, or about 20 to about 25 vol. %, based on the dry blend, or in some embodiments including water. By way of further examples, the concrete material may have a volume ratio of the volume of Portland cement to the volume of silica fume of about 2:1 to about 9:1, e.g., about 2:1 to about 8:1, about 2:1 to about 7:1, about 2:1 to about 6:1, about 2:1 to about 5:1, about 2:1 to about 4:1, about 2:1 to about 3:1; from about 3:1 to about 9:1, about 3:1 to about 8:1, about 3:1 to about 7:1, about 3:1 to about 6:1, about 3:1 to about 5:1, about 3:1 to about 4:1; from about 4:1 to about 8:1, about 4:1 to about 7:1, about 4:1 to about 6:1, about 4:1 to about 5:1; from about 5:1 to about 8:1, about 5:1 to about 7:1, about 5:1 to about 6:1; from about 6:1 to about 8:1, about 6:1 to about 7:1, or any range or subrange thereof, based on the volume of the concrete material, e.g., on a dry basis, or in some embodiments including water.

The concrete medium may, in some instances, comprise fibers, e.g., in an amount ranging from about 0.5% to about 3% or from about 1% to about 2%, by volume based on the total volume of the dry blend. In some embodiments, the fibers may be present in the dry blend in an amount ranging from about 0.5% to about 3%, about 1% to about 3%, about 1.5% to about 3%, about 2% to about 3%, about 2.5% to about 3%; from about 0.5% to about 2.5%, about 1% to about 2.5%, about 1.5% to about 2.5%, about 2% to about 2.5%; from about 0.5% to about 2%, about 1% to about 2%, about 1.5% to about 2%, about 0.5% to about 1.5%, about 1% to about 1.5%; from about 0.5% to about 1%, or any range or subrange thereof, by volume based on the total volume of the dry blend, or in some embodiments including water.

The fibers may have a continuously deformed and/or corrugated shape. In some embodiments, the fibers may have a straight needle shape. The fibers may be formed of steel, iron, copper, nickel, aluminum, tin, and combinations of two or more thereof. Preferably, the fibers have a thermal conductivity of about 30 W/mk or more. For example, the fibers may have a thermal conductivity of about 40 W/mk or more, about 45 W/mk or more, about 50 W/mk or more, about W/mk or more, about 120 W/mk or more, about 155 W/mk or more, about 200 W/mk or more, about 250 W/mk or more, about 350 W/mk or more, about 398 W/mk or more. In some embodiments, the fibers are iron based (e.g., steel fibers) and have a thermal conductivity of about W/mk or more, about 45 W/mk or more, about 50 W/mk or more, about 55 W/mk or more, about 65 W/mk or more, about 85 W/mk or more, or about 95 W/mk or more.

Additionally or alternatively, the concrete medium may be specifically adapted to have fibers may have an elastic modulus ranging from about 150 GPa to about 250 GPa and/or a tensile strength ranging from about 300 MPa to about 1000 MPa. In some cases, the fibers have an elastic modulus ranging from about 150 to about 250 GP, about 170 to about 250 GP, about 190 to about 250 GP, about 210 to about 250 GP, about 230 to about 250 GP; from about 150 to about 230 GP, about 170 to about 230 GP, about 190 to about 230 GP, about 210 to about 230 GP; from about 150 to about 210 GP, about 170 to about 210 GP, about 190 to about 210 GP; from about 150 to about 190 GP, about 170 to about 190 GP, about 150 to about 170 GP, or any range or subrange thereof. The fibers may have a tensile strength from about 300 to about 1000 MPa, about 500 to about 1000 MPa, about 600 to about 1000 MPa, about 700 to about 1000 MPa, about 800 to about 1000 MPa, about 900 to about 1000 MPa; from about 300 to about 800 MPa, about 500 to about 800 MPa, about 600 to about 800 MPa, about 700 to about 800 MPa; from about 300 to about 600 MPa, about 500 to about 600 MPa; from about 300 to about 500 MPa, about 400 to about 500 MPa, about 300 to about 400 MPa, or any range or subrange thereof.

The fibers may have an average length ranging from about 5 mm to about 40 mm. For example, the fibers may have an average length from about 5 to about 40 mm, about 10 to about mm, about 15 to about 40 mm, about 20 to about 40 mm, about 25 to about 40 mm, about 30 to about 40 mm, about 35 to about 40 mm; from about 5 to about 35 mm, about 10 to about 35 mm, about 15 to about 35 mm, about 20 to about 35 mm, about 25 to about 35 mm, about 30 to about 35 mm; from about 5 to about 30 mm, about 10 to about 30 mm, about 15 to about 30 mm, about 20 to about 30 mm, about 25 to about 30 mm; from about 5 to about 25 mm, about 10 to about 25 mm, about 15 to about 25 mm, about 20 to about 25 mm; from about 5 to about 20 mm, about 10 to about 20 mm, about 15 to about 20 mm; from about 5 to about 15 mm, about 10 to about 15 mm, about 5 to about 10 mm, or any range or subrange thereof. In some embodiments, the concrete medium has a first plurality of fibers having a first length and a second plurality of fibers having a second length. For example, the first plurality of fibers may have a first length or first average length of about 20 to about 40 mm, about 25 to about 40 mm, about 30 to about 40 mm, about 35 to about 40 mm; from about 20 to about 35 mm, about 25 to about 35 mm, about 30 to about 35 mm; from about 20 to about 30 mm, about 25 to about 30 mm, or any range or subrange thereof. The second plurality of fibers may have a second length or second average length of about to about 20 mm, about 10 to about 20 mm, about 15 to about 20 mm; from about 5 to about 15 mm, about 10 to about 15 mm, about 5 to about 10 mm, or any range or subrange thereof.

The fibers may have an average width ranging from about 0.1 mm to about 2 mm. In some embodiments, the fibers may have an average width of at least about 1 mm. In some embodiments, the fibers having a width of about 0.1 to about 2 mm, about 0.4 to about 2 mm, about 0.7 to about 2 mm, about 1 to about 2 mm, about 1.3 to about 2 mm, about 1.6 to about 2 mm; from about 0.1 to about 1.7 mm, about 0.4 to about 1.7 mm, about 0.7 to about 1.7 mm, about 1 to about 1.7 mm, about 1.3 to about 1.7 mm; from about 0.1 to about 1.4 mm, about 0.4 to about 1.4 mm, about 0.7 to about 1.4 mm, about 1 to about 1.4 mm; from about 0.1 to about 1.1 mm, about 0.4 to about 1.1 mm, about 0.7 to about 1.1 mm, about 0.9 to about 1.1 mm; about 0.1 to about 0.9 mm, about 0.4 to about 0.9 mm, or any range or subrange thereof.

As mentioned above, the concrete medium is typically formed from mixing water and a dry blend comprising the aggregate, the cementitious material, and preferably the fibers, and then drying the mixture. The inventors recognized that enhance concrete mediums formed from certain weight ratios of water and the dry blends described herein can enhance the thermal energy storage device. The concrete medium, in some instances, may be formed from a mixture comprising a weight ratio of the water to the cementitious material of about 0.25 to about 0.7 or from about 0.3 to about 0.65. In some embodiments, the weight ratio of the water to the dry blend may range from about 0.25 to about 0.7, about 0.3 to about 0.7, about 0.35 to about 0.7, about 0.4 to about 0.7, about 0.45 to about 0.7, about 0.5 to about 0.7, about 0.55 to about 0.7, about 0.6 to about 0.7, about 0.65 to about 0.7; from about 0.25 to about 0.65, about 0.3 to about 0.65, about 0.35 to about about 0.4 to about 0.65, about 0.45 to about 0.65, about 0.5 to about 0.65, about 0.55 to about 0.6 to about 0.65, about 0.25 to about 0.6, about 0.3 to about 0.6, about 0.35 to about about 0.4 to about 0.6, about 0.45 to about 0.6, about 0.5 to about 0.6, about 0.55 to about 0.6; from about 0.25 to about 0.55, about 0.3 to about 0.55, about 0.35 to about 0.55, about 0.4 to about about 0.45 to about 0.55, about 0.5 to about 0.55; from about 0.25 to about 0.5, about 0.3 to about 0.5, about 0.35 to about 0.5, about 0.4 to about 0.5, about 0.45 to about 0.5, about 0.25 to about 0.45, about 0.3 to about 0.45, about 0.35 to about 0.45, about 0.4 to about 0.45; from about to about 0.4, about 0.3 to about 0.4, about 0.35 to about 0.4, about 0.25 to about 0.35, about to about 0.35, about 0.25 to about 0.3, or any range or subrange thereof.

The inventors discovered that certain concrete medium unexpected overcome the difficulties of achieving a desirably high heat capacity and thermal conductivity while simultaneously being capable of operating at a temperatures of above 100° C. or more. For example, the concrete medium described herein may operate at both room and elevated temperatures ranging up to about 450° C. and/or under cycling conditions, e.g., for at least 1 month. For example, the concrete medium may be configured to operate at a temperature ranging from about 100 to about 450° C., about 150 to about 450° C., about 200 to about 450° C., about 250 to about 450° C., about 300 to about 450° C., about 350 to about 450° C., about 400 to about 450° C.; from about 100 to about 400° C., about 150 to about 400° C., about 200 to about 400° C., about 250 to about 400° C., about 300 to about 400° C., about 350 to about 400° C.; from about 100 to about 350° C., about 150 to about 350° C., about 200 to about 350° C., about 250 to about 350° C., about 300 to about 350° C.; about 100 to about 300° C., about 150 to about 300° C., about 200 to about 300° C., about 250 to about 300° C.; about 100 to about 250° C., about 150 to about 250° C., about 200 to about 250° C., or any range or subrange thereof.

The concrete medium may be adapted to have a heat capacity of about 2 $MJ/m^3 \cdot K$ or more at a temperature of 20° C. In some embodiments, the concrete medium has a heat capacity of about 2.2 $MJ/m^3 \cdot K$ or more, about 2.4 $MJ/m^3 \cdot K$ or more, about 2.6 $MJ/m^3 \cdot K$ or more, about 2.8 $MJ/m^3 \cdot K$ or more, about 3 $MJ/m^3 \cdot K$ or more, about 3.2 $MJ/m^3 \cdot K$ or more, or about 3.5 $MJ/m^3 \cdot K$ or more at a temperature of 20° C.

Preferably, the concrete medium is adapted to have a heat capacity of about 3 $MJ/m^3 \cdot K$ or more at a temperature of 300° C. For example, the concrete medium may have a heat capacity of about 3.2 $MJ/m^3 \cdot K$ or more, about 3.4 $MJ/m^3 \cdot K$ or more, about 3.6 $MJ/m^3 \cdot K$ or more, about 3.8 $MJ/m^3 \cdot K$ or more, about 4 $MJ/m^3 \cdot K$ or more, about 4.2 $MJ/m^3 \cdot K$ or more, about 4.5 $MJ/m^3 \cdot K$ or more, about 4.8 $MJ/m^3 \cdot K$ or more, about 5.1 $MJ/m^3 \cdot K$ or more, about 5.4 $MJ/m^3 \cdot K$ or more, about $MJ/m^3 \cdot K$ or more, or about 6 $MJ/m^3 \cdot K$ or more at a temperature of 300° C. In at least one embodiment, the concrete medium is adapted to have a heat capacity of about 2.0 $MJ/m^3 \cdot K$ or more at a temperature of 20° C. and about 3.0 $MJ/m^3 \cdot K$ or more at a temperature of 300° C.

Additionally or alternatively, the concrete medium is may be adapted to have a thermal conductivity ranging from about 2 W/m·K to about 6 W/m·K or from about 2.9 W/m·K to about W/m·K. In certain preferred embodiments, the concrete medium has a thermal conductivity ranging from about 2 W/m·K to about 6 W/m·K, about 2.5 W/m·K to about 6 W/m·K, about 3 W/m·K to about 6 W/m·K, about 3.5 W/m·K to about 6 W/m·K, about 4 W/m·K to about 6 W/m·K, about 4.5 W/m·K to about 6 W/m·K, about 5 W/m·K to about 6 W/m·K, about 5.5 W/m·K to about 6 W/m·K; from about 2 W/m·K to about 5.5 W/m·K, about 2.5 W/m·K to about 5.5 W/m·K, about 3 W/m·K to about 5.5 W/m·K, about 3.5 W/m·K to about 5.5 W/m·K, about 4 W/m·K to about 5.5 W/m·K, about 4.5 W/m·K to about 5.5 W/m·K, about 5 W/m·K to about 5.5 W/m·K; from about 2 W/m·K to about 5 W/m·K, about 2.5 W/m·K to about 5 W/m·K, about 3 W/m·K to about 5 W/m·K, about 3.5 W/m·K to about 5 W/m·K, about 4 W/m·K to about 5 W/m·K, about 4.5 W/m·K to about 5 W/m·K; from about 2 W/m·K to about 4.5 W/m·K, about 2.5 W/m·K to about 4.5 W/m·K, about 3 W/m·K to about 4.5 W/m·K, about 3.5 W/m·K to about 4.5 W/m·K, about 4 W/m·K to about 4.5 W/m·K, about 2 W/m·K to about 4 W/m·K, about 2.5 W/m·K to about 4 W/m·K, about 3 W/m·K to about 4 W/m·K, about 3.5 W/m·K to about 4 W/m·K; from about 2 W/m·K to about 3.5 W/m·K, about 2.5 W/m·K to about 3.5 W/m·K, about 3 W/m·K to about 3.5 W/m·K; from about 2 W/m·K to about 3 W/m·K, about 2.5 W/m·K to about 3 W/m·K, about 2 W/m·K to about 2.5 W/m·K, or any range or subrange thereof.

Although concrete heat storage media are described herein as non-limiting examples, other materials that may be utilized include stone, sand, ceramics, etc. Exemplary ceramic materials may include boron nitride, aluminum nitride composites, beryllium oxide, aluminum nitride, and combinations of two or more thereof.

Figure 3:
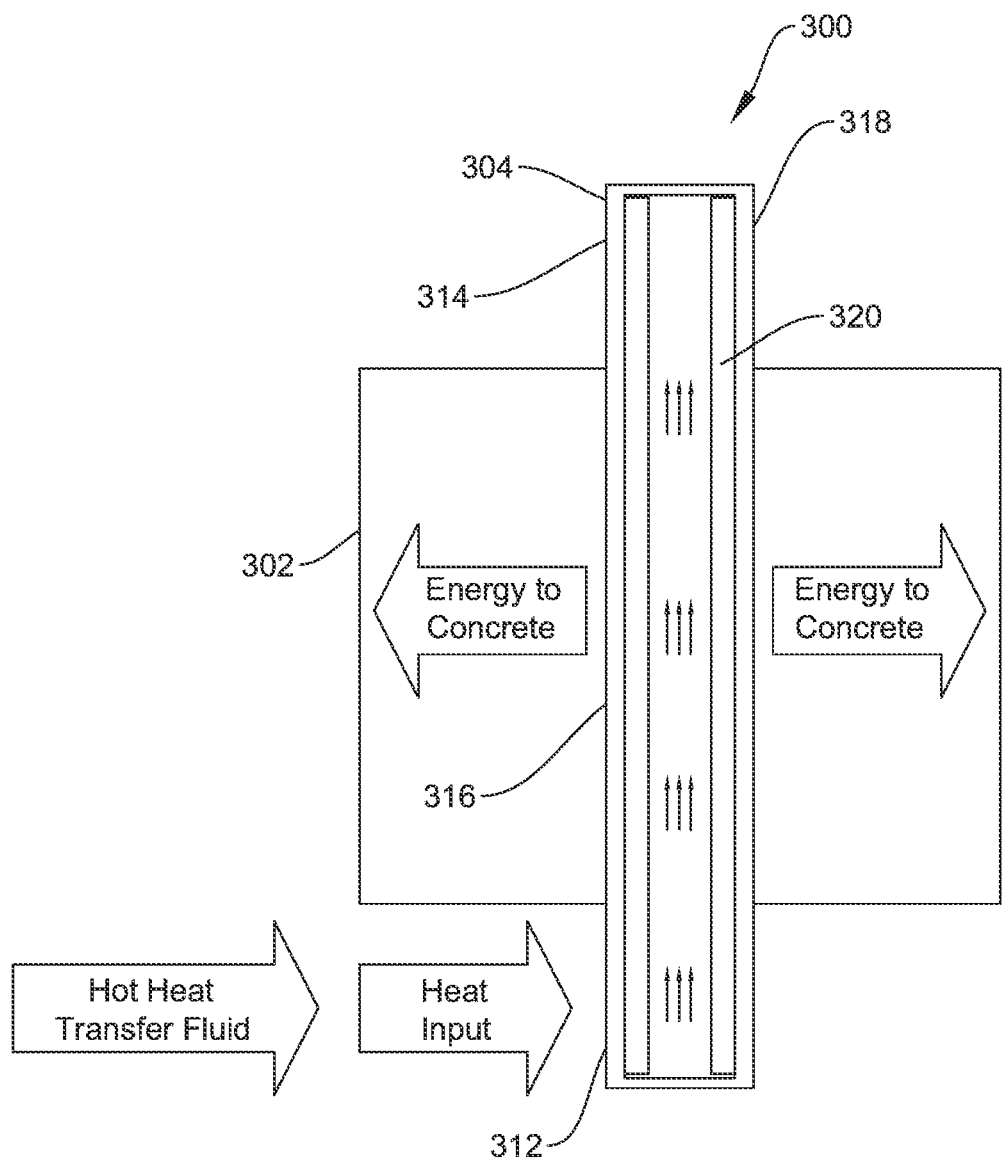
FIG. 3 shows aspects of the charging process of a thermal energy storage device according to some embodiments.
Figure 4:
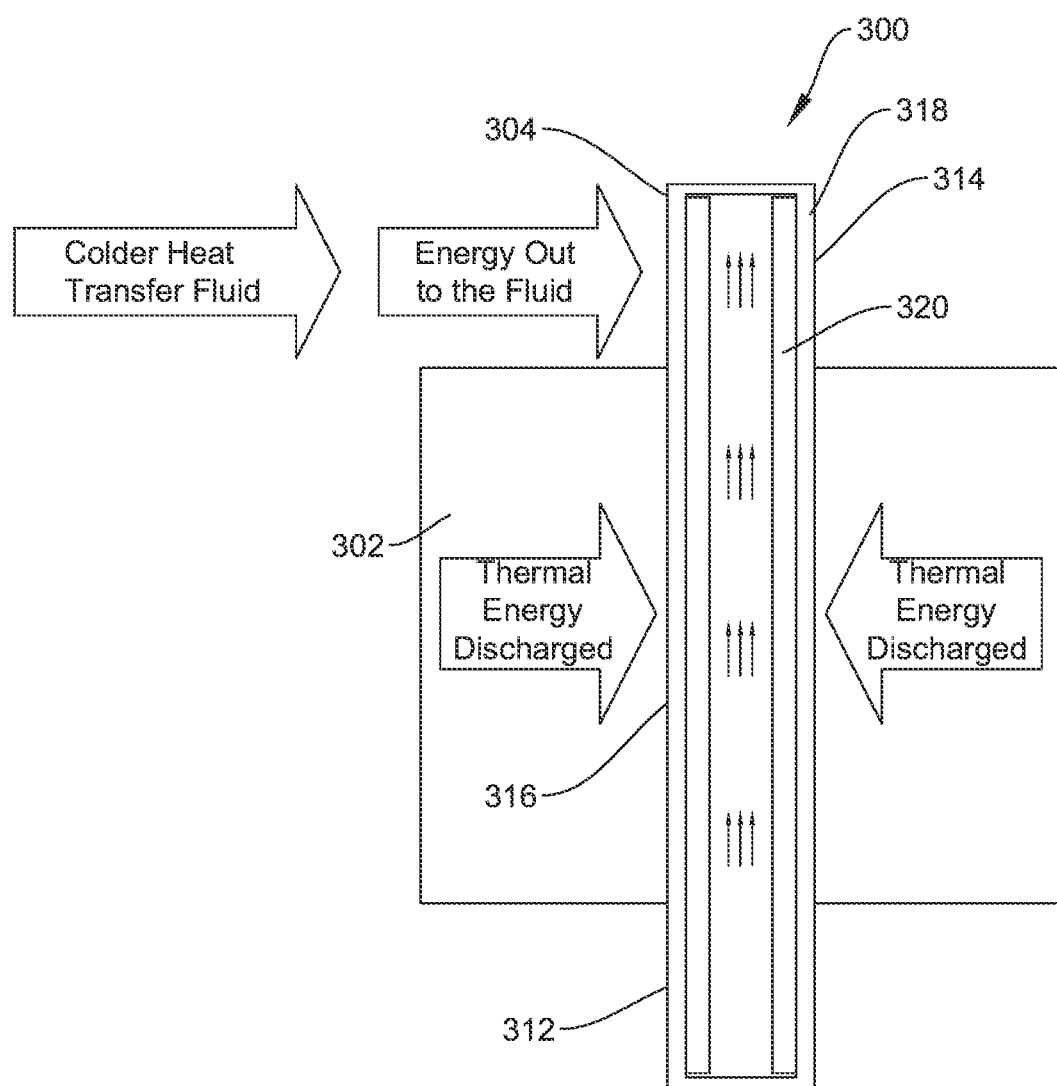
FIG. 4 shows aspects of the discharging process of the thermal energy storage device according to some embodiments.

With reference to FIGS. 3 and 4, provided are schematics depicting aspects and operations of a thermal energy storage device 300 according to an aspect of the invention. FIG. 3 shows aspects of the charging process of the thermal energy storage device 300, while FIG. 4 shows aspects of the discharging process of the thermal energy storage device 300. The thermal energy storage device 300 may be similar to thermal energy storage device 200 described above. Thus, a similar numbering scheme will be used for thermal energy storage device 300 to reference to similar features and/or components of thermal energy storage device 200, except that the number scheme will employ a 300-series of numbers.

In some embodiments, thermal energy storage device 300 may include a heat storage medium 302, one or more thermosyphons 304, a charging plenum (not shown in FIGS. 3 and 4), and a discharging plenum (not shown in FIGS. 3 and 4). Although only one thermosyphon 304 is shown in FIGS. 3 and 4 for the purpose of clear illustration, more than one, such as an array of thermosyphons 304 may be implemented. Further, the charging plenum and the discharging plenum are removed from FIGS. 3 and 4 such that more details of thermosyphon 304 can be shown.

In some embodiments, thermosyphon 304 may include an evaporative section 312, a condensing section 314, and a heat transfer section 316 extending between evaporative section 312 and condensing section 314. In some embodiments, evaporative section 312 and/or condensing section 314 may further include heat transfer enhancers, such as fins, roughened surfaces, coils, and the like (not shown in FIGS. 3 and 4). In some embodiments, thermosyphon 304 may be configured as a continuous hollow body 318 that may form a pressure controlled envelope having an operating medium 320 contained therein. The operating medium 320 may be adapted for heat transfer to charge and/or discharge the thermal energy storage device 300.

With further reference to FIG. 3, the charging process of the thermal energy storage device 300 will be described. In some embodiments, a first heat transfer medium may be used to charge heat storage medium 302 in thermal energy storage device 300 via evaporative section 312 of thermosyphons 304 housed in the charging plenum. The first heat transfer medium may include water, steam, supercritical carbon dioxide ($sCO_2$), thermal oil, or any other suitable heat transfer fluid as discussed above.

To charge thermal energy storage device 300, in some embodiments, the first heat transfer medium may be flowed into the charging plenum and the heat from the first heat transfer medium may be transferred to evaporative section 312 of thermosyphon 304 via heat transfer enhancers of evaporative section 312, which in turn may transfer the heat to operating medium 320 inside thermosyphon 304. The heated operating medium 320 may transition from a liquid phase to a vapor phase that may rise from the evaporative section 312 and flow into the heat transfer section 316 and/or the condensing section 314. At heat transfer section 316, the heat from the heated operating medium 320 in the vapor phase may be transferred to heat storage medium 302 through heat transfer section 316. Specifically, as the vapor of operating medium 320 loses its heat and condenses on the inner surface of the middle section 218a of hollow body 318 forming heat transfer section 316, heat is released from operating medium 320 to heat storage medium 302 via heat transfer section 316. The condensed operating medium 320 may then flow along the inner surface of hollow body 318 back to evaporative section 312 by gravity.

In some embodiments, heat can be stored in the heat storage medium 302 for periods of time varying from a couple of hours to long-term storage on the order of 10 hours. During the charging process, a difference between the temperature at the evaporative section 312 and the temperature at the condensing section 314 may be less than 5° C., less than 4° C., less than 3° C., less than 2° C., less than 1° C., less than 0.5° C., or less than 0.1° C.

With further reference to FIG. 4, the heat stored in the heat storage medium 302 can be rapidly discharged via condensing section 314 of thermosyphon 304 and the discharging plenum on demand. For instance, a second heat transfer medium may be flowed into the discharging plenum and the second heat transfer medium may be heated by absorbing heat from condensing section 314 via heat transfer enhancers of condensing section 314. The second heat transfer medium may include water, steam, supercritical carbon dioxide ($sCO_2$), thermal oil, or any other suitable heat transfer fluid as discussed above. As condensing section 314 loses its heat causing the vapor of the operating medium 320 to transition to a liquid, the liquid phase of the operating medium 320 returns to heat transfer section 316 by gravity. At heat transfer section 316, heat may be transferred from heat storage medium 302 to the operating medium 320, causing the liquid phase of the operating medium 320 to transition to a vapor that may rise and transfer the heat to condensing section 314. During the discharging process, a difference between the temperature at evaporative section 312 and the temperature at condensing section 314 may be less than 5° C., less than 4° C., less than 3° C., less than 2° C., less than 1° C., less than 0.5° C., or less than 0.1° C.

As discussed above, in some embodiments, operating medium 320 may transition between a liquid phase and a vapor phase to absorb and/or release heat. When all the operating medium 320 is in liquid phase, in some embodiments, the operating medium 320 may occupy between about 10% to about 30% of the internal volume of the hollow body 318. For example, when all the operating medium 320 is in liquid phase, in some cases, the operating medium 320 may occupy from about 10 to about 30%, about 15 to about 30%, about 20 to about 30%, about 25 to about 30%; from about 10 to about 25%, about 15 to about 25%, about 20 to about 25%; from about 10 to about 20%, about 15 to about 20%, about 10 to about 15%, or any range or subrange thereof, of the internal volume of the hollow body 318.

Depending on the application environment, operating medium 320 may be selected from water, heat transfer oil, alkali metal such as sodium and potassium, aluminum bromide, refrigerants (e.g., chlorofluorocarbons, hydrochlorofluorocarbons, hydrofluorocarbons, fluorocarbons, hydrocarbons, ammonia, carbon dioxide, etc.), mixture of biphenyl and diphenyl oxide, mixture of diaryl and tryaryl, diaryl alkyl, mixture of diphenylethane and alkylated aromatics, alkylated aromatic isomers, alkyl benzenes, alkylated aromatics, or other phase change materials. Depending on the operating medium 320 utilized, in some embodiments, the hollow body 318 forming the various thermosyphon 304 described herein may be formed from steel, Inconel, titanium, an alloy thereof, or a combination thereof.

Figure 5A:
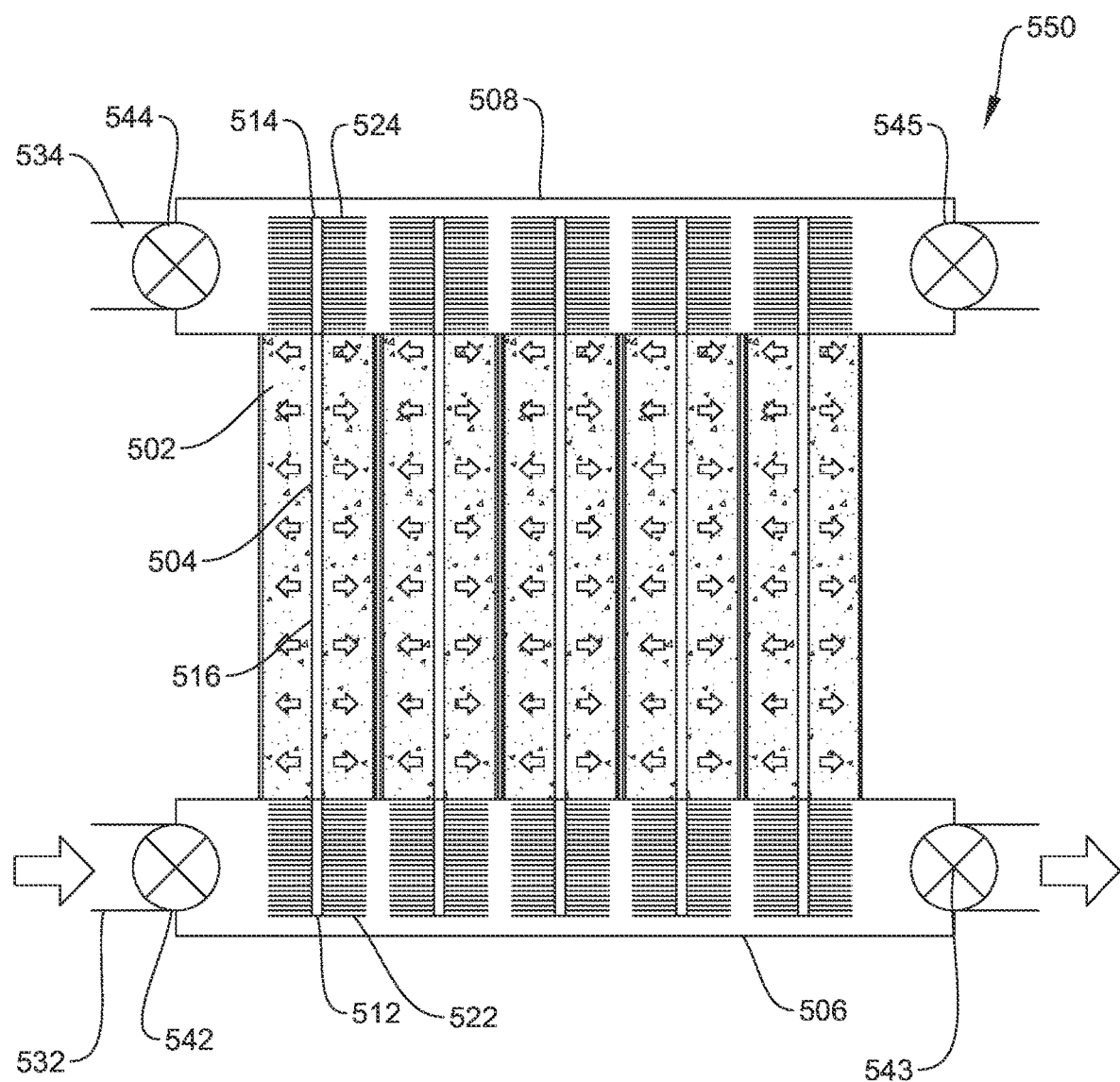
FIGS. 5A and 5B illustrate a thermal energy storage system or thermal energy storage system according to some embodiments, with FIG. 5A illustrates the thermal energy storage system operating in a charging process and FIG. 5B illustrating the thermal energy storage system operating in a discharging process.
Figure 5B:
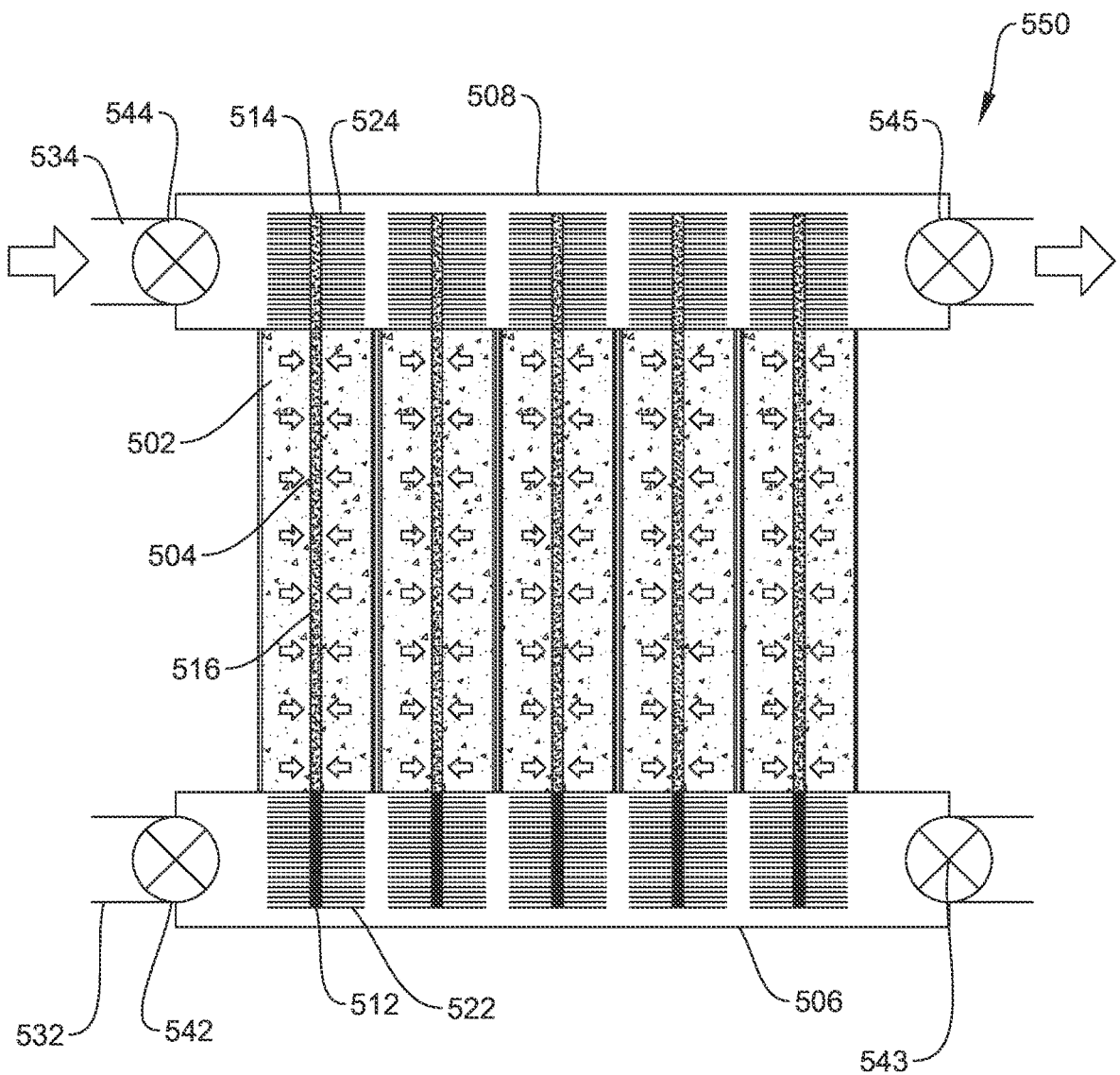

FIGS. 5A and 5B are drawings of an exemplary thermal energy storage system 550 according to some embodiments. Specifically, FIG. 5A shows aspects of the charging process of the thermal energy storage system 550, while FIG. 5B shows aspects of the discharging process of the thermal energy storage system 550.

As shown, thermal energy storage system 550 may include a plurality of thermal energy storage devices 500 arranged in parallel. Each thermal energy storage device 500 may be similar to thermal energy storage devices 200, 300, as described above. A similar numbering scheme will be used for thermal energy storage device 500 to reference to similar features and/or components of thermal energy storage device 200, 300 except that the number scheme will employ a 500-series of numbers. Implementing multiple thermal energy storage devices 500 in the thermal energy storage system 550 may allow the storage capacity to be scaled up and down easily.

Each thermal energy storage device 500 may include heat storage medium 502 and one or more thermosyphons 504. Thermosyphon 504 may include an evaporative section 512, a condensing section 514, and a heat transfer section 516 extending between the evaporative section 512 and the condensing section 514 and fluidically coupled to the evaporative section 512 and the condensing section 514. The evaporative section 512 and/or the condensing section 514 may include heat transfer enhancers 524, such as fins, roughened surfaces, coils, etc.

In some embodiments, evaporative sections 512 of thermosyphons 504 of the plurality of thermal energy storage devices 500 may be disposed in a charging plenum chamber 506, and condensing sections 514 of thermosyphons 504 of the plurality of thermal energy storage devices 500 may be disposed in a discharging plenum chamber 508. The individual charging plenum chamber of each thermal energy storage device 500 may collectively form a continuous charging plenum chamber, such as the charging plenum chamber 506 shown, and the individual discharging plenum chamber of each thermal energy storage device 500 may collectively form a continuous discharging plenum chamber, such as the discharging plenum chamber 508 shown.

Thermal energy storage system 550 may include a charging channel 532 fluidically coupled to charging plenum chamber 506 and a discharging channel 534 fluidically coupled to the discharging plenum chamber 508. The fluid communication between charging channel 532 and charging plenum chamber 506 may be opened or closed by operation of inlet and outlet valves 542, 543. The fluid communication between discharging channel 534 and discharging plenum chamber 508 may be opened or closed by operation of inlet and outlet valves 544, 545.

With reference to FIG. 5A, to charge thermal energy storage system 550 or thermal energy storage devices 500, inlet and outlet valves 542, 543 may be opened while inlet and outlet valves 544, 545 may be closed. A first heat transfer medium for charging thermal energy storage devices 500 may be flowed through charging channel 532 into charging plenum chamber 506 to make contact with heat transfer enhancers 522 of evaporative sections 512 to transfer heat from the first heat transfer medium to heat storage media 502 of thermal energy storage devices 500 via thermosyphons 504.

With reference to FIG. 5B, to discharge thermal energy storage devices 500, inlet and outlet valves 544, 545 may be opened while inlet and outlet valves 542, 543 may be closed. A second heat transfer medium for discharging thermal energy storage devices 500 may be flowed through discharging channel 534 into discharging plenum chamber 508 to make contact with heat transfer enhancers 524 of condensing sections 514 to allow heat to be transferred from heat storage media 502 of thermal energy storage devices 500 to the second heat transfer medium via thermosyphons 504.

Figure 6B:
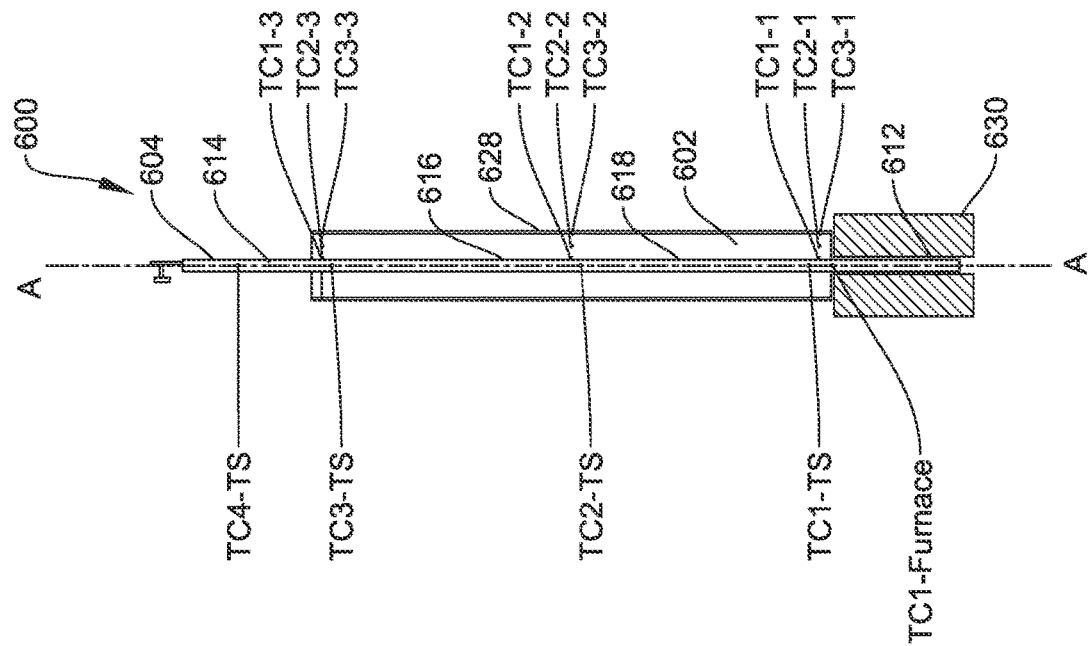
FIGS. 6A and 6B illustrate a thermal energy storage device according to some embodiments, with FIG. 6A illustrating a top perspective view of the thermal energy storage device and FIG. 6B illustrating a cross-sectional view of the thermal energy storage device, taken along line 6B-6B in FIG. 6A.
Figure 6A:
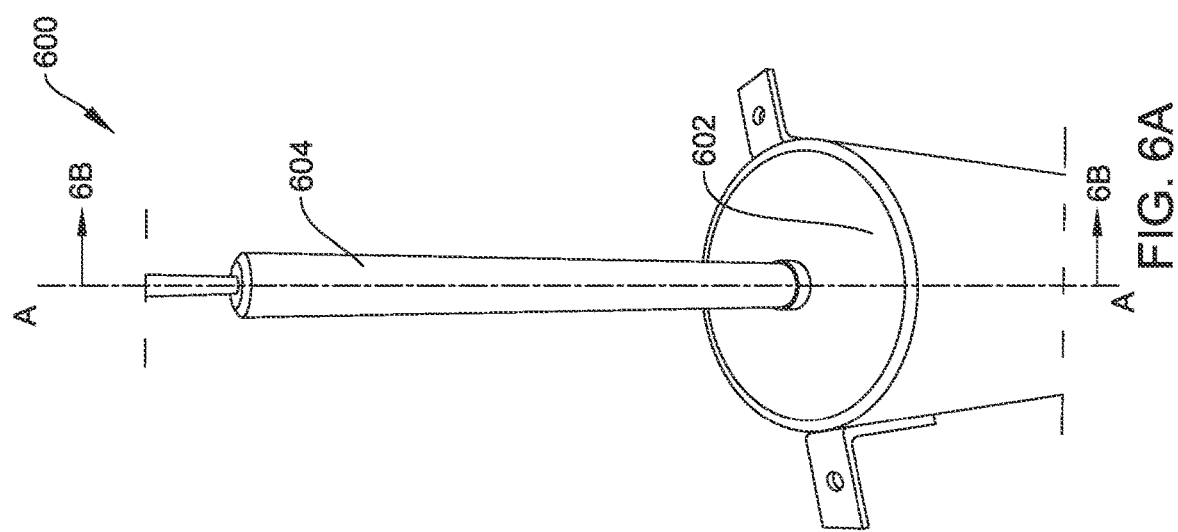

With reference to FIGS. 6A and 6B, provided are drawings of a non-limiting, exemplary thermal energy storage device 600 according to some embodiments. FIG. 6A illustrates a top perspective view of thermal energy storage device 600, and FIG. 6B illustrates a cross-sectional view of thermal energy storage device 600, taken along line 6B-6B in FIG. 6A. Thermal energy storage device 600 may be similar to thermal energy storage devices 200, 300, 500 described above. A similar numbering scheme will be used for thermal energy storage device 600 as employed for thermal energy storage devices 200, 300, 500 to reference to similar features and/or components, except that the 600-series of numbers will be used.

As seen in FIGS. 6A and 6B, the thermal energy storage device 600 may include a heat storage medium 602 housed in a confinement layer or jacket 628 and a thermosyphon 604. Although only one thermosyphon 604 is shown, thermal energy storage device 600 may include more than one thermosyphon 604, such as an array of thermosyphons 604. Thermosyphon 604 may be configured as a continuous hollow body 618 that may form a pressure controlled envelope having an operating medium disposed therein for heat transfer via at least in part phase change of the operating medium. Thermosyphon 604 may include an evaporative section 612, a condensing section 614, and a heat transfer section 616 extending between and fluidically coupled to evaporative section 612 and condensing section 614. At least a portion of heat transfer section 616 may be disposed in heat storage medium 602, and at least a portion of evaporative section 612 and/or condensing section 614 may be disposed outside heat storage medium 602.

With further reference to FIG. 6B, a heat source 630 may be utilized to supply heat for charging thermal energy storage device 600. In some embodiments, heat source 630 may include an electrical heat source and may convert electrical energy into thermal energy for charging thermal energy storage device 600. In some embodiments, heat source 630 may include a furnace, such as a clamshell furnace. In some embodiments, heat source 630 may be configured to operate at a temperature of up to 400° C.

Figure 9:
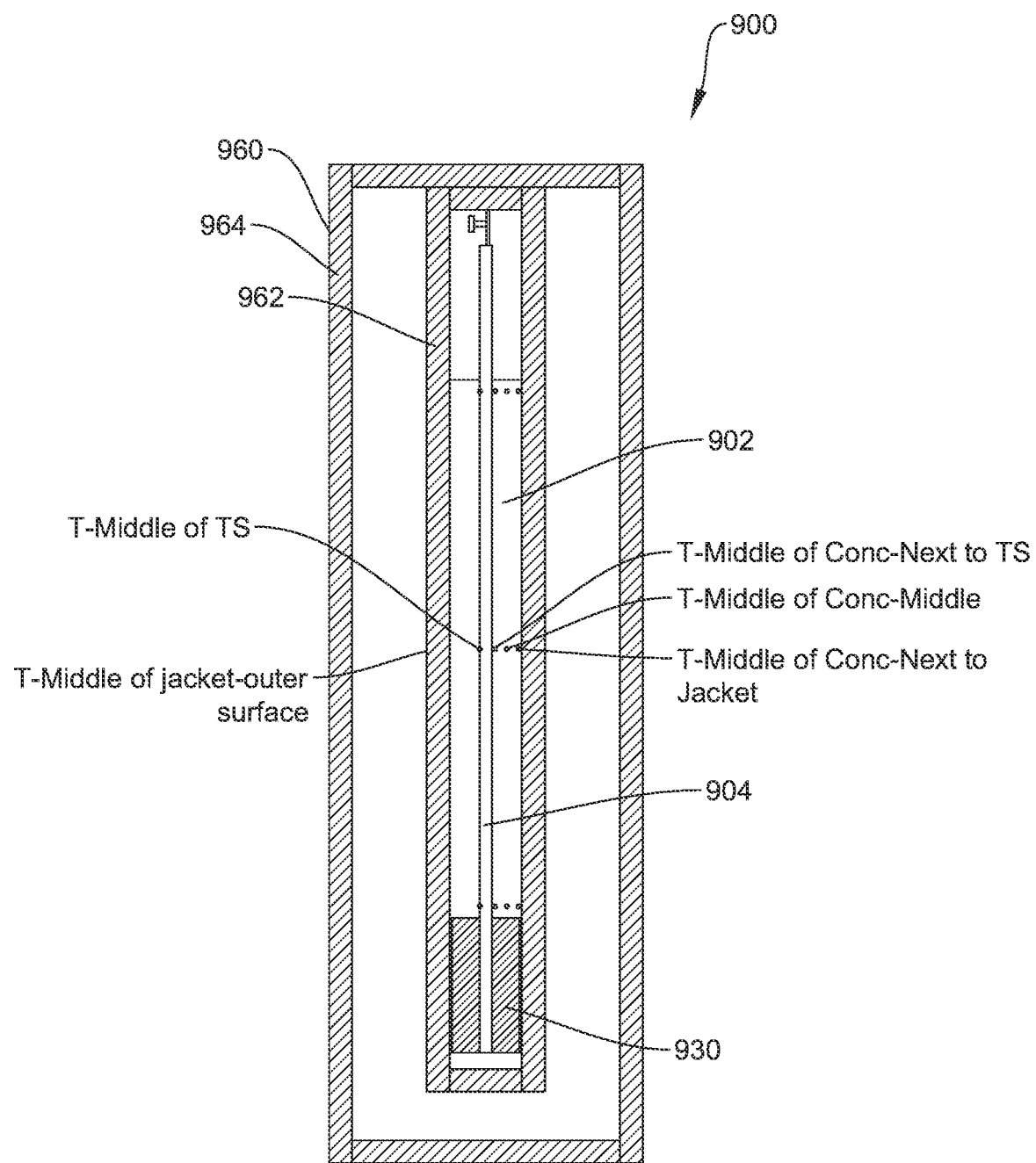
FIG. 9 illustrates a thermal energy storage device according to some embodiments.

With reference to FIG. 9, provided is a drawing of a non-limiting, exemplary thermal energy storage device 900 according to an aspect of the invention. Thermal energy storage device 900 is similar to thermal energy storage device 600 shown in FIGS. 6A and 6B. A similar numbering scheme will be used for the thermal energy storage device 900 as employed for thermal energy storage device 600 to reference to similar features and/or components, except that the 900-series of numbers will be used. Thermal energy storage device 900 may include a heat storage medium 902 and a thermosyphon 904. A heat source 930, such as a clamshell furnace, may be utilized to supply heat for charging thermal energy storage device 900.

As shown in FIG. 9, thermal energy storage device 900 may further include insulation, such as an insulation box 960, surrounding or encapsulating heat storage medium 902, thermosyphon 904, as well as heat source 930. Insulation box 960 may include an inner housing or jacket 962 surrounding heat storage medium 902, thermosyphon 904, and heat source 930. Insulation box 960 may further include an outer housing or jacket 964 surrounding inner housing or jacket 962. An air gap may exist between the inner housing or jacket 962 and outer housing or jacket 964. In some embodiments, the inner housing or jacket 962 and the outer housing or jacket 964 may include housing walls formed using mineral wool panels or batts or any other suitable thermal insulation materials.

Figure 11A:
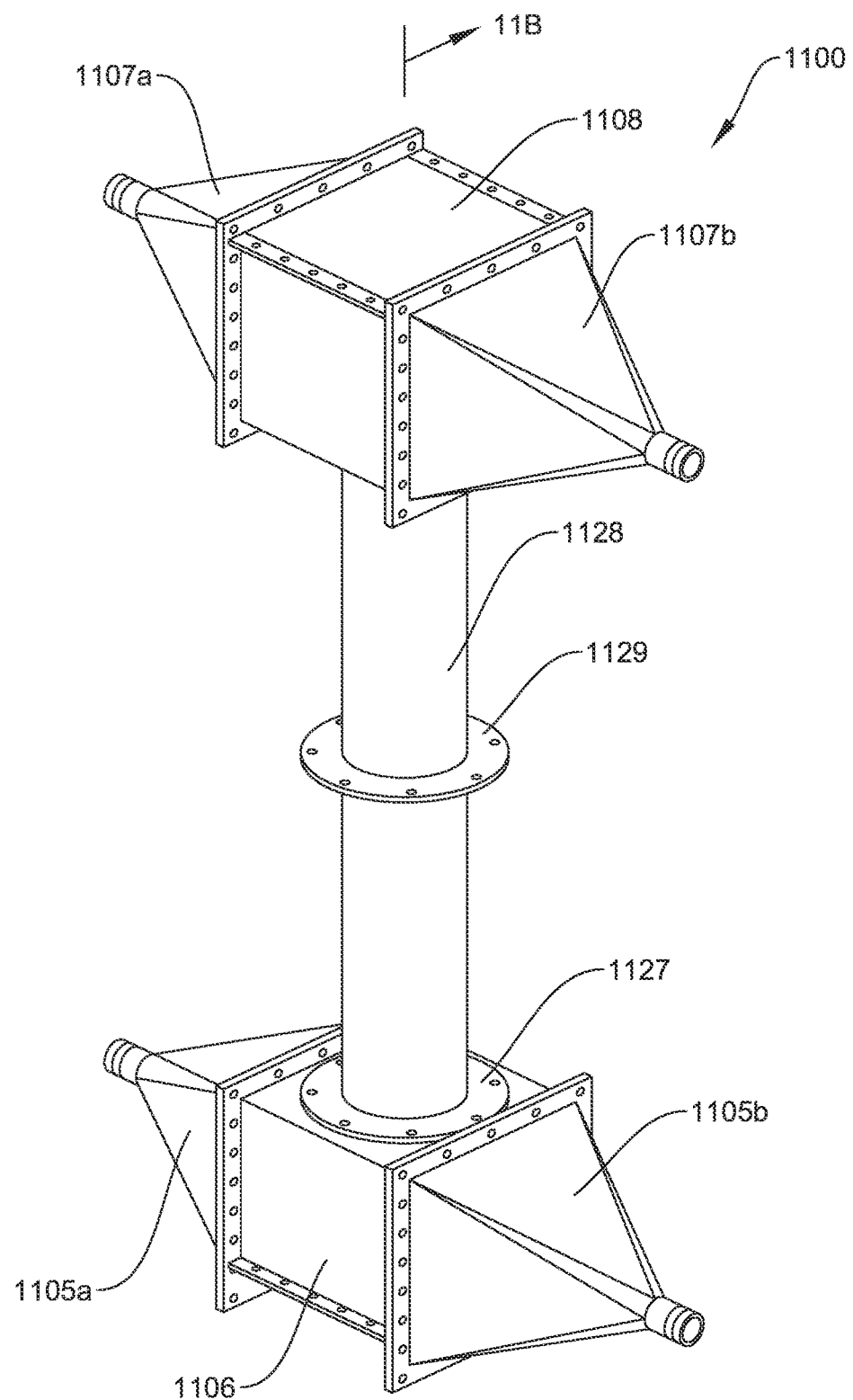
FIGS. 11A and 11B illustrate a thermal energy storage device according to some embodiments, with FIG. 11A illustrating a top perspective view of the thermal energy storage device, and FIG. 11B illustrating a cross-sectional view of the thermal energy storage device, taken along line 11B-11B in FIG. 11A.
Figure 11B:
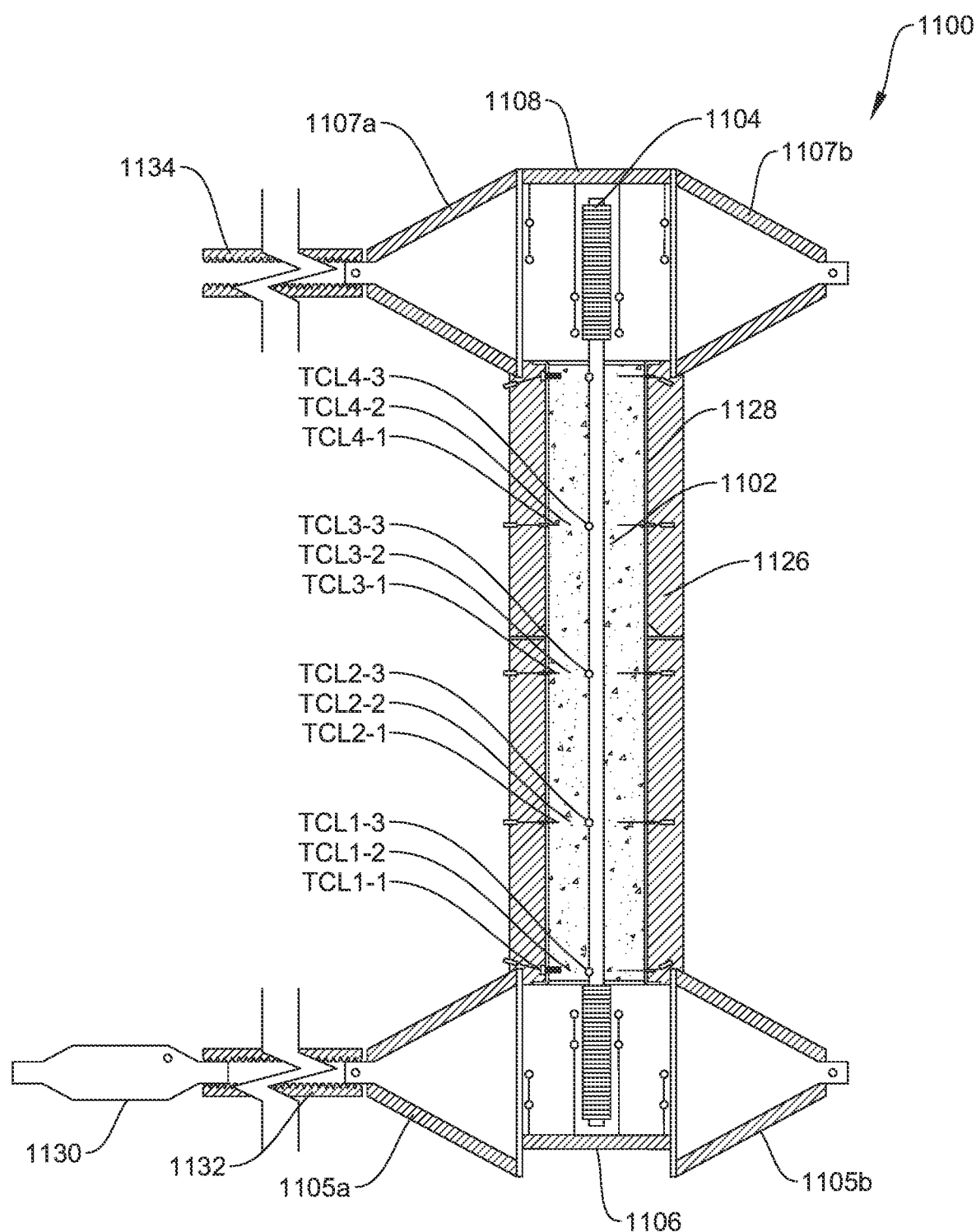

With reference to FIGS. 11A and 11B, provided are drawings of a non-limiting, exemplary thermal energy storage device 1100 according to some aspects of the invention. Specifically, FIG. 11A illustrates a top perspective view of thermal energy storage device 1100, and FIG. 11B illustrates a cross-sectional view of thermal energy storage device 1100, taken along line 11B-11B in FIG. 11A. Thermal energy storage device 1100 may be similar to thermal energy storage devices 200, 300, 500, 600, 900 described above. A similar numbering scheme will be used for the thermal energy storage device 1100 as employed for thermal energy storage device 200, 300, 500, 600, 900 to reference to similar features and/or components, except that the 1100-series of numbers will be used.

Thermal energy storage device 1100 may include a heat storage medium 1102 housed in a confinement layer or jacket 1128, one or more thermosyphon 1104, a charging plenum chamber 1106, and a discharging plenum chamber 1108. Although only one thermosyphon 1104 is illustrated in FIG. 11B, thermal energy storage device 1100 may include two or more thermosyphons 1104. In some embodiments, confinement layer or jacket 1128, charging plenum chamber 1106, and/or discharging plenum chamber 1108 may be constructed of steel or any other suitable materials.

In some embodiments, thermal energy storage device 1100 may include insulation 1126 (shown in FIG. 11B) on the exterior of the confinement layer or jacket 1128, the exterior of the charging plenum chamber 1106, and the exterior of the discharging plenum chamber 1108. In some embodiments, thermal energy storage device 1100 may further include flanges 1127 disposed at opposite ends of the confinement layer or jacket 1128 for coupling the charging plenum chamber 1106 and the discharging plenum chamber 1108 to the opposite ends of the confinement layer or jacket 1128. Thermal energy storage device 1100 may further include one or more flanges 1129 disposed along the confinement layer or jacket 1128 between the opposite ends thereof. The one or more flanges 1129 may be configured for mounting the thermal energy storage device 1100 to a support structure for supporting the thermal energy storage device 1100 in an upright position during operation.

In some embodiments, charging plenum chamber 1106 may include tapered portions 1105a, 1105b for fluidically coupling charging plenum chamber 1106 with a charging channel 1132 for flowing a first heat transfer medium from a heat source 1130 into and out of the charging plenum chamber 1106 for charging thermal energy storage device 1100. In some embodiments, heat source 1130 may include a heater that may be configured to output a first heat transfer medium to charging channel 1132 at any suitable temperature.

In some embodiments, discharging plenum chamber 1108 may include tapered portions 1107a, 1107b for fluidically coupling discharging plenum chamber 1108 with a discharging channel 1134 for flowing a second heat transfer medium into and out of discharging plenum chamber 1108 for discharging thermal energy storage device 1100 (or heating the second heat transfer medium).

Figure 13:
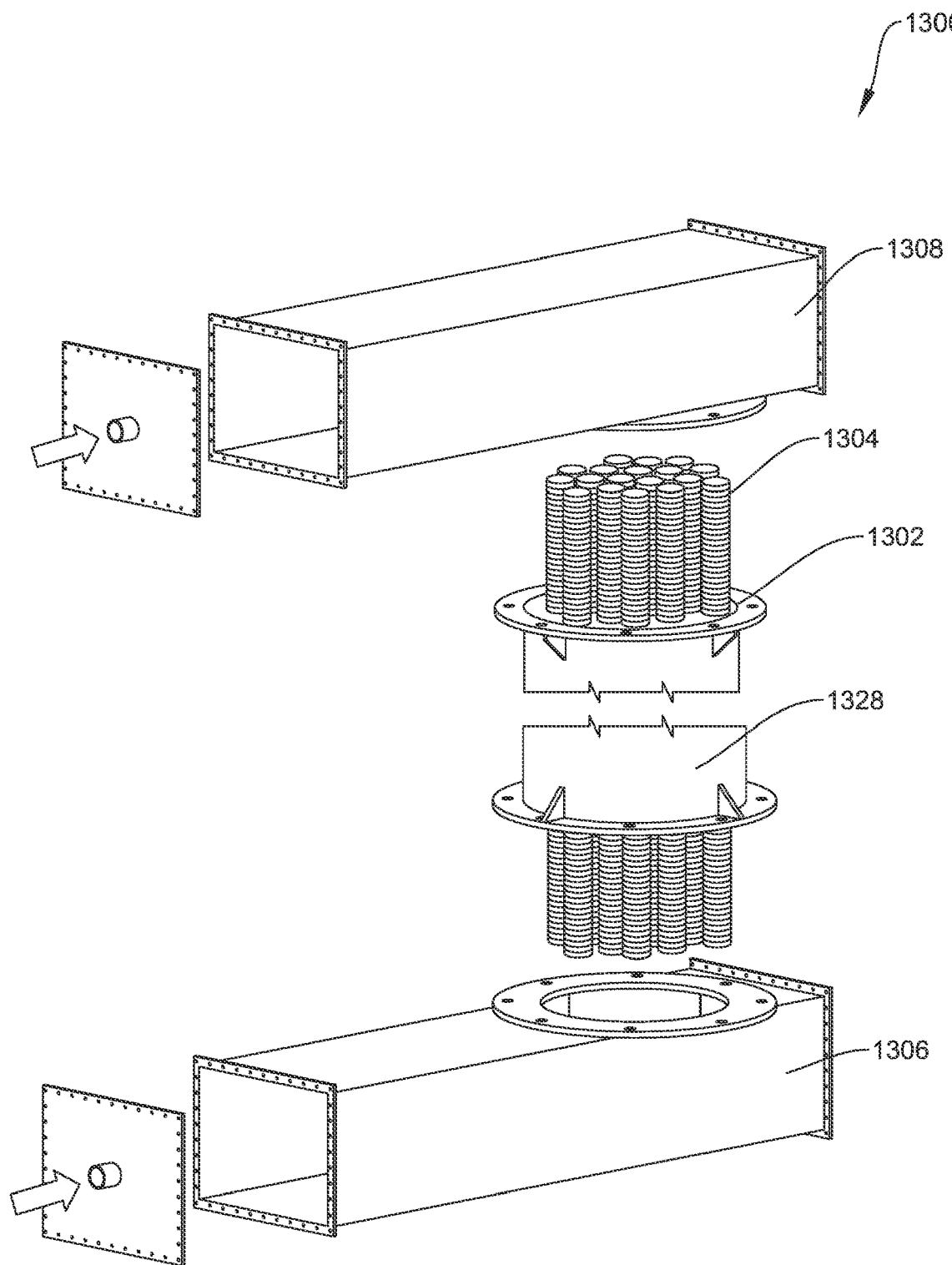
FIG. 13 illustrates a thermal energy storage device according to some embodiments.

With reference to FIG. 13, provided is a schematic of a non-limiting, exemplary thermal energy storage device 1300 according to some aspects of the invention. Thermal energy storage device 1300 may be similar to the thermal energy storage devices 200, 300, 500, 600, 900, 1100 described above. A similar numbering scheme will be used for the thermal energy storage device 1300 as employed for thermal energy storage devices 200, 300, 500, 600, 900, 1100 to indicate to similar features and/or components, except that the 1300-series of numbers will be used. As seen in FIG. 13, thermal energy storage device 1300 includes a heat storage medium 1302 housed in a confinement layer or jacket 1328, an array of thermosyphons 1304 with heat transfer enhancers, a charging plenum chamber 1306, and a discharging plenum chamber 1308.

Figure 14:
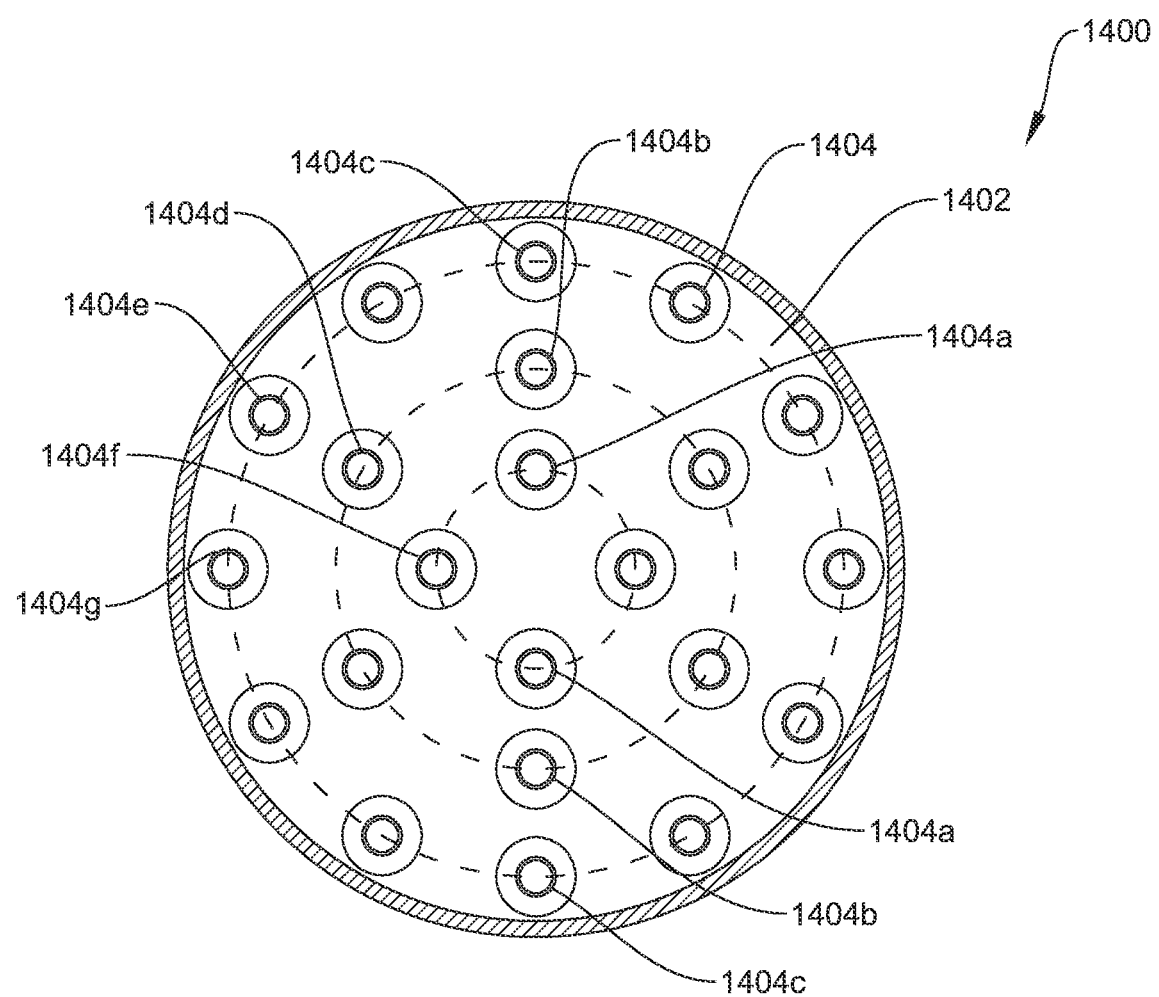
FIG. 14 illustrates a top view of a thermal energy storage device according to some embodiments, showing an exemplary configuration of an array of thermosyphons of the thermal energy storage device.

With reference to FIG. 14, provided is a top view of a thermal energy storage device 1400, showing an exemplary configuration of an array of thermosyphons 1404 of thermal energy storage device 1400. The array of thermosyphons 1404 may include one or more groups of thermosyphons 1404. Each group of thermosyphons 1404 may be arranged in a circular manner about the central axis of the thermal energy storage device 1400 and heat storage medium 1402. The thermosyphons 1404 within each group may be positioned away from the central axis of thermal energy storage device 1400 and heat storage medium 1402 at an equal distance. The multiple groups of thermosyphons 1404 may be arranged in a concentrical configuration about the central axis of thermal energy storage device 1400 and/or heat storage medium 1402.

In some embodiments, the multiple groups of the thermosyphons 1404 may be spaced radially apart at an equal distance. Depending on the particular implementation, a ratio of the outer diameter of the thermosyphons 1404 to the radial distance between adjacent groups of the thermosyphons 1404 may range from about 1:1 to about 1:10 such that a substantially isothermal heat transfer within the heat storage medium 1402 may be achieved. In some embodiments, the ratio of the outer diameter of the thermosyphons 1404 to the radial distance between adjacent groups of the thermosyphons 1404 is from about 1:1 to about 1:10, about 1:1 to about 1:8, about 1:1 to about 1:6, about 1:1 to about 1:4, about 1:1 to about 1:2; from about 1:2 to about 1:10, about 1:2 to about 1:8, about 1:2 to about 1:6, about 1:2 to about 1:4; from about 1:4 to about 1:10, about 1:4 to about 1:8, about 1:4 to about 1:6; from about 1:6 to about 1:10, about 1:6 to about 1:8, about 1:8 to about 1:10, or any range or subrange thereof.

Depending on the configuration, in some embodiments, one or more thermosyphons 1404 from one group of thermosyphons 1404 may be radially aligned with one or more thermosyphons 1404 from another one or more groups of thermosyphons 1404. For example, thermosyphons 1404a from the inner group of thermosyphons 1404, thermosyphons 1404b from the middle group of thermosyphons 1404, and thermosyphons 1404c from the outer group of thermosyphons 1404 may be radially aligned with each other; thermosyphons 1404d from the middle group of thermosyphons 1404 and thermosyphons 1404e from the outer group of thermosyphons 1404 may be radially aligned with each other; and thermosyphons 1404f from the inner group of thermosyphons 1404 and thermosyphons 1404g from the outer group of thermosyphons 1404 may be radially aligned with each other. Although three groups of thermosyphons 1504 are shown in FIG. 14, thermosyphons 1404 may be arranged in more or less groups.

Figure 15:
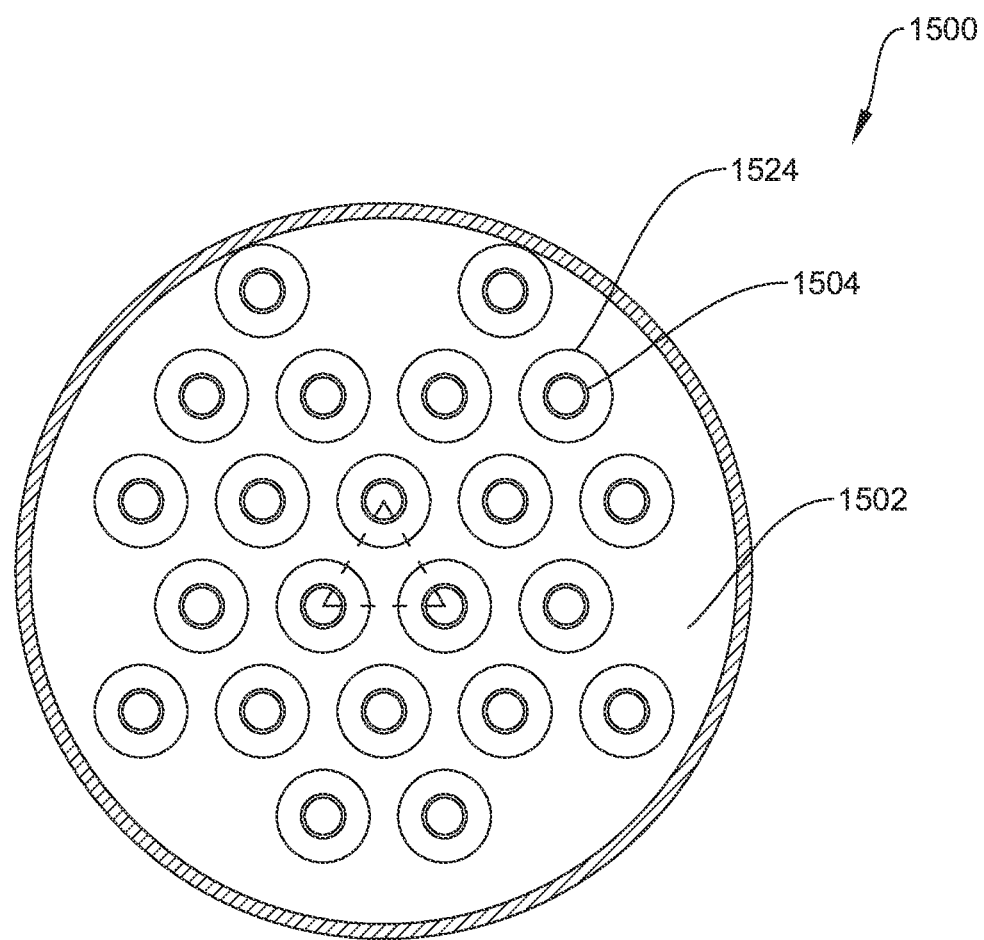
FIG. 15 illustrates a top view of a thermal energy storage device according to some embodiments, showing an exemplary configuration of an array of thermosyphons of the thermal energy storage device.

With reference to FIG. 15, provided is a top view of a non-limiting, exemplary thermal energy storage device 1500, showing another exemplary configuration of an array of thermosyphons 1504 of thermal energy storage device 1500. In some embodiments, thermosyphons 1504 may be arranged in staggered rows. In some embodiments, thermosyphons 1504 may be in a hexagonal packing arrangement, such that a thermosyphon 1504 may be surround by six other thermosyphons 1504 at equal distance. Depending on the particular implementation, a ratio between an outer diameter of the thermosyphons 1504 to the distance between the adjacent thermosyphons 1504 may range from about 1:1 to about 1:10 such that a substantially isothermal heat transfer within the heat storage medium 1502 may be achieved. In some embodiments, the ratio between an outer diameter of the thermosyphons 1504 to the distance between the adjacent thermosyphons 1504 is from about 1:1 to about 1:10, about 1:1 to about 1:8, about 1:1 to about 1:6, about 1:1 to about 1:4, about 1:1 to about 1:2; from about 1:2 to about 1:10, about 1:2 to about 1:8, about 1:2 to about 1:6, about 1:2 to about 1:4; from about 1:4 to about 1:10, about 1:4 to about 1:8, about 1:4 to about 1:6; from about 1:6 to about 1:10, about 1:6 to about 1:8, about 1:8 to about 1:10, or any range or subrange thereof.

The exemplary configuration of the array of thermosyphons 1404, 1504 discussed above are not intended to be limiting. The thermosyphons also may be arranged to facilitate heat transfer from the heat transfer media to the evaporative section during the charging process and/or to facilitate heat transfer to the heat transfer media from the condensing section during the discharging process.

According to a first embodiment, provided is a thermal energy storage device, comprising:
  a heat storage medium;
  one or more heat transfer device extending through the heat storage medium and containing an operating medium, wherein the one or more heat transfer device comprises:
    an evaporative section configured to charge the thermal energy storage device;
    a condensing section configured to discharge the thermal energy storage device;
    a heat transfer section extending between the evaporative section and the condensing section, wherein the heat transfer section is fluidically coupled to the evaporative section and the condensing section, wherein at least a portion of the heat transfer section is disposed in the solid heat storage medium;
    wherein at least a portion of the evaporative section and at least a portion of the condensing section are disposed outside the solid heat storage medium; and
  a charging plenum chamber coupled to the evaporation section of the one or more thermosyphons; and
  a discharging plenum chamber coupled to the condensing section of the one or more thermosyphons.

According to a second embodiment, provided is the thermal energy storage device according to the first embodiment, wherein the one or more heat transfer device comprise a hollow body, wherein the hollow body comprises:
  a middle section disposed in the solid heat storage medium and forming the heat transfer section;
  a first end section adjacent the middle section and forming in part the evaporative section; and
  a second end section opposite the first end section and forming in part the condensing section.

According to a third embodiment, provided is a thermal energy storage device according to the second embodiment, wherein the hollow body defines pressure controlled envelope, and wherein the operating medium is disposed inside the hollow body.

According to a fourth embodiment, provided is a thermal energy storage device according to a second embodiment, wherein:
  the evaporative section comprises a first heat transfer enhancer disposed on the first end section of the hollow body, the first heat transfer enhancer comprising at least one of fins, roughened surfaces, or coils; and
  the condensing section comprises a second heat transfer enhancer disposed on the second end section of the hollow body, the second heat transfer enhancer comprising at least one of fins, roughened surfaces, or coils.

According to a fifth embodiment, provided is the thermal energy storage device according to the first embodiment, wherein the one or more heat transfer device comprises one or more thermosiphon.

According to a sixth embodiment, provided is the thermal energy storage device according to the second embodiment, wherein a ratio of an outer diameter of hollow body to an inner diameter of the heat storage medium ranges from about 1:20 to about 1:60.

According to a seventh embodiment, provided is the thermal energy storage device according to the fifth embodiment, wherein the heat storage medium has a diameter ranging from about 1 m to about 1.5 m, and wherein the one or more of thermosyphon has a diameter ranging from about 25 mm to about 50 mm.

According to an eighth embodiment, provided is the thermal energy storage device according to the fifth embodiment, wherein the one or more thermosyphon comprises a plurality of thermosyphons, the plurality of thermosyphons being arranged concentrically about a central axis of the solid heat storage medium.

According to a ninth embodiment, provided is the thermal energy storage device according to the fifth embodiment, wherein one or more thermosyphon comprises a plurality of thermosyphons, the plurality of thermosyphons being in a packing arrangement.

According to a tenth embodiment, provided is the thermal energy storage device according to the tenth embodiment, further comprising:
  insulation surrounding the solid heat storage medium;
  wherein the insulation comprises at least one of mineral wool, aluminum foil, rock wool, fiber fax, vacuum, or a combination of two or more thereof.

According to an eleventh embodiment, provided is the thermal energy storage device according to the fifth embodiment, wherein the evaporative section of the one or more thermosyphons is disposed in the charging plenum chamber and the condensing sections of the one or more of thermosyphons is disposed in the discharging plenum chamber.

According to a twelfth embodiment, provided is the thermal energy storage device according to one of the first embodiment to the eleventh embodiment, wherein the solid heat storage medium comprises a concrete material.

According to a thirteenth embodiment, provided is the thermal energy storage device according to the twelfth embodiment, wherein the heat storage medium is configured to have a thermal conductivity of about 2.8 W/m·K or more at a temperature of 20° C., and about 2.0 W/m·K or more at a temperature of 300 to 400° C.

According to a fourteenth embodiment, provided is the thermal energy storage device according to the eleventh embodiment or twelfth, wherein the heat storage medium is configured to have a heat capacity of about 2.0 MJ/m$^3$·K or more at a temperature of 20° C., and about 3.0 MJ/m$^3$·K or more at a temperature of 300 to 400° C.

According to a fifteenth embodiment, provided is a thermal energy storage system, comprising:
  a plurality of the thermal energy storage devices according to any one of the first to the thirteenth embodiment;
  a charging channel fluidically coupled to the charging plenum chambers of the plurality of the thermal energy storage devices; and
  a discharging channel fluidically coupled to the discharging plenum chambers of the plurality of the thermal energy storage devices.

According to a sixteenth embodiment, provided is a method of employing a thermal energy storage device according to any one of the first to the fifteenth embodiment, the method comprising:
  charging the solid heat storage medium by flowing a first heat transfer medium at a first temperature through the charging plenum chamber and contacting the evaporative sections with the first heat transfer medium to transfer heat, via the operating medium undergoing a phase change, from the first heat transfer medium to the solid heat storage medium.

According to a seventeenth embodiment, provided is method of the fifteenth or sixteenth embodiment, further comprising:

discharging the solid head storage medium by flowing a second heat transfer medium at a second temperature through the discharging plenum chamber and contacting the condensing sections with the second heat transfer medium to transfer heat, via the operating medium undergoing a phase change, from the solid heat storage medium to the second heat transfer medium.

According to an eighteenth embodiment, provided is a concrete material for a thermal energy storage device, the concrete material comprising:
fibers in an amount ranging from about 1.0 to about 2.0% by volume of concrete material;
an aggregate in an amount ranging from about 53 to 72% by volume of concrete material, wherein the aggregates having a thermal conductivity ranging from about 2.9 to about 5.2 W/m·K; and
a cementitious material consisting of a combination of 85% Portland cement and 15% silica fume with the total volume ranging from about 12 to 20% by volume of concrete material.

According to a nineteenth embodiment, provided is the concrete material according to the eighteenth embodiment, wherein the fibers comprise steel fibers.

According to a twentieth embodiment, provided is a concrete material according to the eighteenth embodiment, wherein the steel fibers have an average length of about 3.8 cm, and wherein the steel fibers have an average width of about 1.0 mm or more.

According to a twenty-first embodiment, provided is a concrete material according to the eighteenth embodiment, wherein the aggregate comprises at least one of carbonate aggregate or siliceous aggregate.

According to a twenty-second embodiment, provided is a concrete material according to the eighteenth embodiment, wherein the aggregate comprises a combination of coarse aggregate and fine aggregate, wherein aggregate is configured to have a volumetric ratio of coarse aggregate to the fine aggregate from 1:2 to about 2:1.

According to a twenty-third embodiment, provided is a concrete material according to the twenty-second embodiment, wherein the coarse aggregate has an average grain size ranging from about 1 to about 19 mm, and wherein the fine aggregate has an average grain size ranging from about 75 μm to about 9.5 mm.

According to a twenty-fourth embodiment, provided is a heat storage medium for a thermal energy storage device, the heat storage medium formed from a mixture comprising:
water; and
a dry blend comprising:
an aggregate in an amount ranging from about 40% to about 80% or from about 53% to about 72% by volume based on a total volume of the dry blend, wherein the aggregate has a thermal conductivity ranging from about 2 W/m·K to about 6 W/m·K or from about 2.9 W/m·K to about 5.2 W/m·K; and
a cementitious material in an amount ranging from about 5% to about 30% or from about 12% to 20% by volume based on the total volume of the dry blend.

According to a twenty-fifth embodiment, provided is the heat storage medium of the twenty-fourth embodiment, wherein the aggregate comprises siliceous aggregate.

According to a twenty-sixth embodiment, provided is the heat storage medium of the twenty-fourth embodiment, wherein the aggregate comprises no carbonate aggregate.

According to a twenty-seventh embodiment, provided is the heat storage medium of the twenty-fourth embodiment, wherein the aggregate comprises:
coarse aggregate in an amount ranging from 20% to 40% by volume based on the total volume of the dry blend; and
fine aggregate in an amount ranging from 20% to 40% by volume based on the total volume of the dry blend.

According to a twenty-eighth embodiment, provided is the heat storage medium of the twenty-fourth embodiment, further comprising:
fibers in an amount ranging from about 0.5% to about 3% or from about 1% to about 2% by volume based on the total volume of the dry blend.

According to a twenty-ninth embodiment, provided is the heat storage medium of the twenty-fourth embodiment, wherein the cementitious material comprises:
a primary cementitious material in an amount ranging from about 70% to about 100%, from about 80% to about 95%, or about 85% by weight based on a total weight of the cementitious material, wherein the primary cementitious material comprises a Portland cement; and
a supplemental cementitious material in an amount ranging from about 0% to about 30%, from about 5% to about 20%, or about 15% by weight based on the total weight of the cementitious material, wherein the supplemental cementitious material comprises at least one of silica fume, slag, fly ash, or metakaolin.

According to a thirtieth embodiment, provided is the heat storage medium of the twenty-fourth embodiment, wherein the cementitious material comprises no supplemental cementitious material.

Examples

The following examples are provided to describe certain non-limiting embodiments of the invention and elucidate various benefits achieved therefrom.

Example 1—Thermal Energy Storage Device

To evaluate the effectiveness of the thermosyphon described herein for transferring heat converted from electrical energy, a thermal energy storage device having a construction similar to that shown in FIGS. 6A and 6B was tested. Specifically, the thermal energy storage device includes a thermosyphon having a diameter of 1 inch and a heat storage medium having a diameter of 6 inches and a height of 36 inches. An electrical heater source operating at 400° C. was utilized to supply heat for charging the thermal energy storage device. Temperature profiles of FIGS. 7 and 8 were obtained and will be discussed below.

Figure 7:
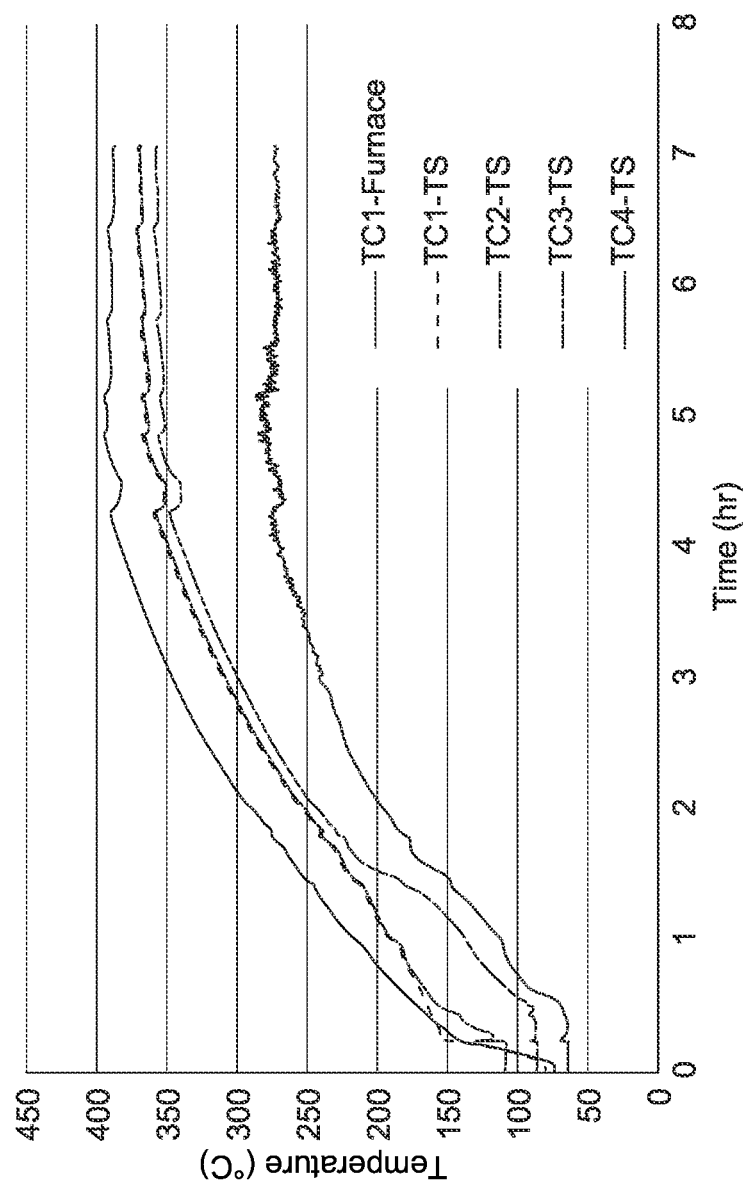
FIG. 7 shows temperature increase along a central axis of a thermosyphon during charging of a thermal energy storage device according to some embodiments.

FIG. 7 shows the temperature increase along the central axis of the thermosyphon during charging of the thermal energy storage device. Temperature readings were taken at various locations of the thermosyphon. Specifically, temperature readings were taken at three locations along the heat transfer section of the thermosyphon embedded in the heat storage medium, including one in the middle region (labeled as TC2-TS in FIG. 6B) and two near the opposite ends (labeled as TC1-TS and TC3-TS in FIG. 6B) of the thermosyphon. Temperature readings were also taken at the evaporative section near the furnace (labeled as TC1-Furnace in FIG. 6B) and the condensing section (labeled as TC4-TS in FIG. 6B) of the thermosyphon, respectively. As shown in FIG. 7, the substantial overlap between the temperature profiles in the middle region and near the opposite ends of the thermosyphon (i.e., temperature profiles TC1-TS, TC2-TS, TC3-TS in FIG. 7) demonstrates substantial isothermal behavior of the thermosyphon to transfer heat from the evaporative section of the thermosyphon to the heat transfer section of the thermosyphon embedded in the heat storage medium.

Figure 8:
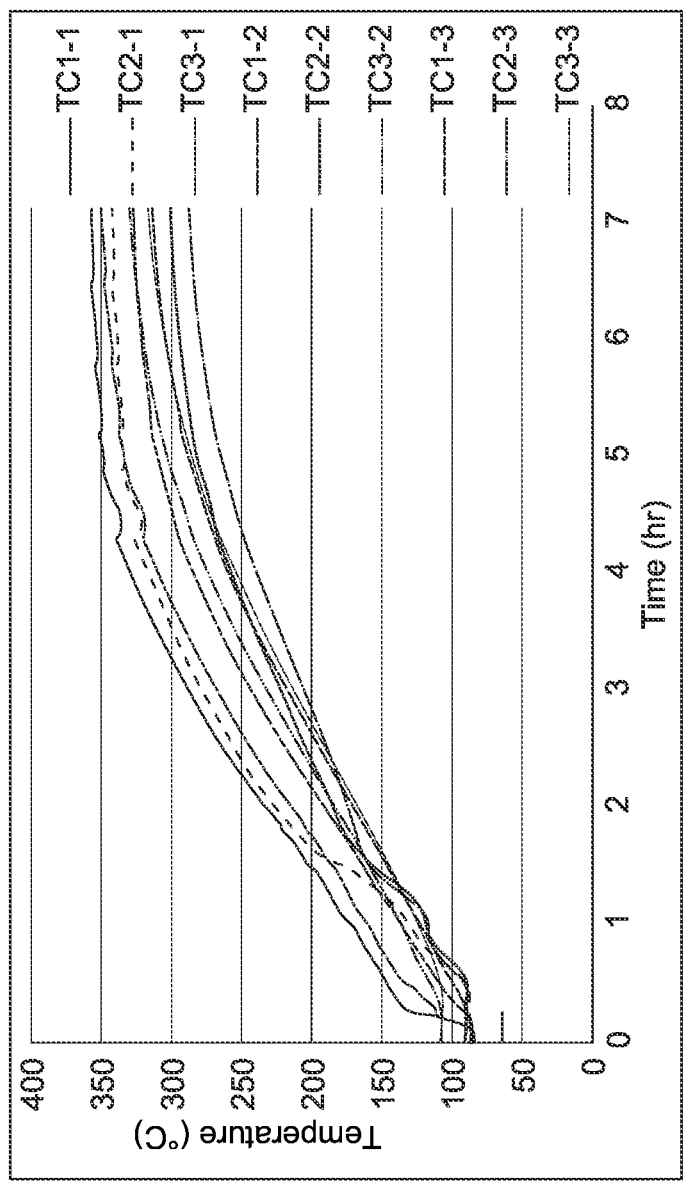
FIG. 8 shows thermal response of a heat storage medium during charging of a thermal energy storage device according to some embodiments.

FIG. 8 shows the thermal response of the heat storage medium to the charging process. The heat storage medium included a solid heat storage medium, more specifically, a concrete material formed of a formulation set forth below in Table 1.

TABLE 1

| Components | | Amount [kg/m³] |
|---|---|---|
| Coarse aggregate | Quartzite, #8 | 924 |
| Fine aggregate | C33 Silica sand | 947 |
| Cement | Type I Portland Cement | 393 |
| Water | | 137 |
| Water-cement ratio | | 0.35 |

Temperature readings were taken at various locations of the heat storage medium. Specifically, temperature readings were taken in the middle region (labeled as TC1/2/3-2 in FIG. 6B) and near opposite ends (labeled as TC1/2/3-1 and TC1/2/3-3 in FIG. 6B) along the central axis of the heat storage medium. Further at each location, three temperature readings were taken, including one taken adjacent to the thermosyphon (labeled as TC1-1/2/3 in FIG. 6B), one adjacent to the exterior surface of the heat storage medium (labeled as TC3-1/2/3 in FIG. 6B), and one in-between (labeled as TC2-1/2/3 in FIG. 6B) of the thermosyphon.

As shown in FIG. 8, temperatures of the heat storage medium increased over time as heat was transferred and stored into the heat storage medium, reaching a temperature ranging from about 300° C. to about 350° C. for about 4 hours of charging from room temperature and 3 hours of charge holding. During charge holding, was heat still supplied.

Example 2—Thermal Energy Storage Device

To evaluate the repeatability of charging and discharging of the thermal energy storage device described herein, a thermal energy storage device having a construction similar to that shown in FIG. 9 was tested. Specifically, the thermal energy storage device tested included a thermosyphon having a 1-inch diameter and a heat storage medium (e.g., concrete) having a 6-inch diameter. The insulation box included 2-inch thick inner and outer housing walls. An electrical heater source operating at a temperature of 400° C. was utilized to supply heat for charging the thermal energy storage device. The heat storage medium included a solid heat storage medium, more specifically, a concrete material formed of a formulation set forth in Table 1 above. Temperature profiles of FIG. 10 were obtained and will be discussed below.

During the repeatability test, temperature readings of the heat storage medium, the thermosyphon, and the insulation were taken in the middle region of the thermal energy storage device. Specifically, temperature readings of the thermosyphon were taken in the mid-height region of the thermal energy storage device (labeled as T-Middle of TS in FIG. 9). Temperature readings of the heat storage medium were taken adjacent to the thermosyphon (labeled as T-Middle of Conc-Next to TS in FIG. 9), adjacent to the inner housing or jacket of the insulation box (labeled as T-Middle of Conc-Next to Jacket in FIG. 9), and in-between (labeled as T-Middle of Conc-Middle in FIG. 9)—all in the mid-height region of the thermal energy storage device. Temperature readings of the outer surface of the inner housing or jacket of the insulation box (T-Middle of jacket-outer surface in FIG. 9) were also taken in the mid-height region of the thermal energy storage device.

Figure 10:
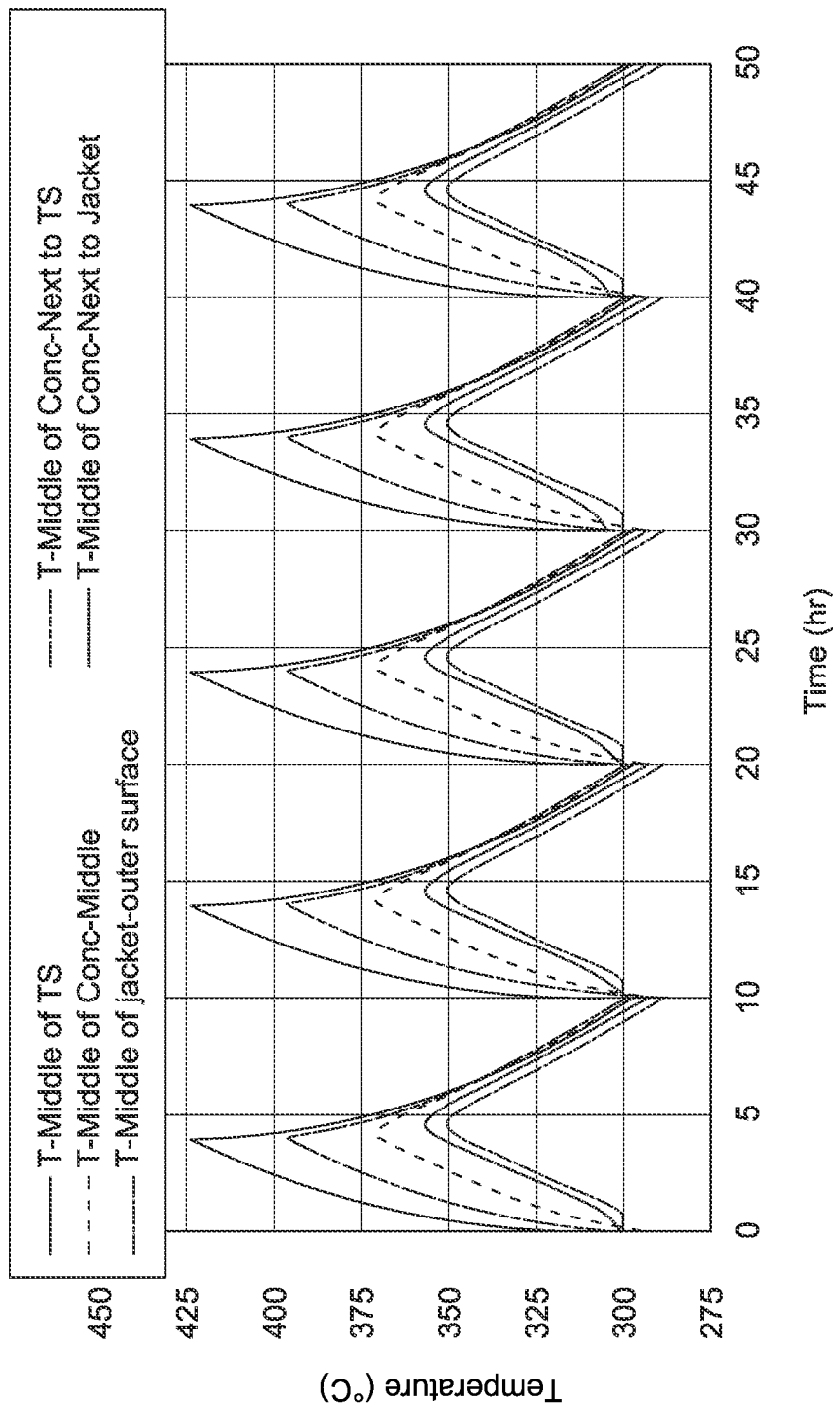
FIG. 10 shows temperature profiles of a heat storage medium, a thermosyphon, and insulation during multiple cycles of charging and discharging of a thermal energy storage device according to some embodiments.

As shown in FIG. 10, the temperature profiles of the heat storage medium, the thermosyphon, and the insulation remain consistent through the multiple cycles of charging and discharging, demonstrating the ability of the thermal energy storage device described herein to operate consistently under cycling conditions.

Example 3—Thermal Energy Storage Device

To evaluate the feasibility of charging the thermal energy storage device described herein with convective heat from a thermal energy source, a thermal energy storage device having a construction similar to that shown in FIGS. 11A and 11B was tested. Specifically, the thermal energy storage device included a thermosyphon having a diameter of 1.5 inches and a heat storage medium having a diameter of 14 inches and a height of 84 inches. The capacity of the thermal energy storage device is 10 kWh. A heat source, similar to heat source 1130 shown in FIG. 11B, was utilized to supply a heated air stream at about 450° C. to charge the thermal energy storage device.

Figure 12:
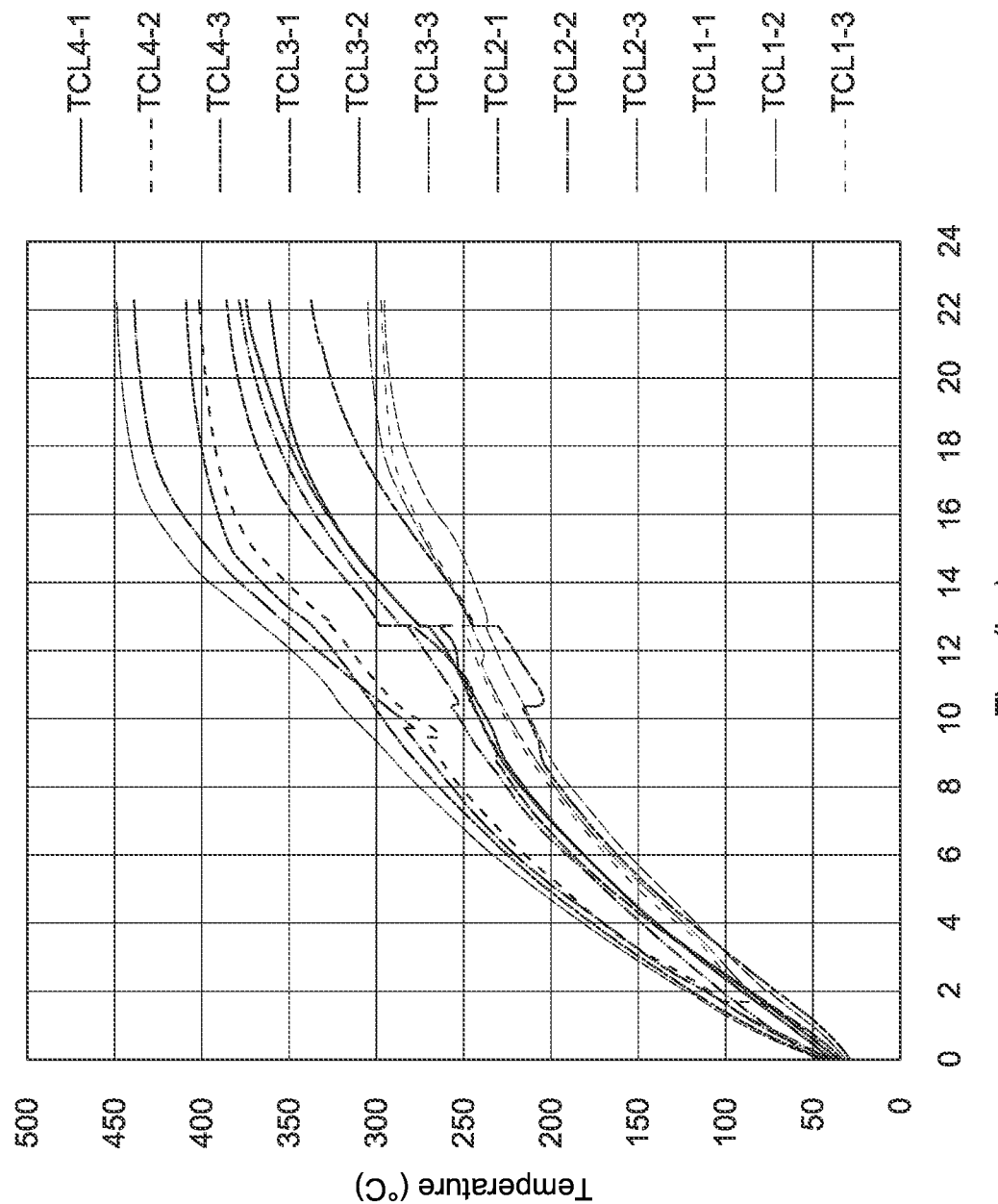
FIG. 12 shows the thermal response of a heat storage medium to a charging process of a thermal energy storage device according to some embodiments.

FIG. 12 shows the thermal response of the heat storage medium to the charging process. The heat storage medium included a solid heat storage medium, more specifically, a concrete material formed of a formulation set forth below in Table 2.

TABLE 2

| Components | | Amount [kg/m³] |
|---|---|---|
| Coarse aggregate | Quartzite, #8 | 924 |
| Fine aggregate | C33 Silica sand | 947 |
| Cement | Type I Portland Cement | 334 |
| Supplemental cementitious material | Silica fume | 59 |
| Water | specific material | 137 |
| Water-cement ratio | | 0.35 |

Temperature readings were taken at various locations of the heat storage medium. Specifically, temperature readings were taken at 2-inch height, at 20-inch height, at 40-inch height, at 60-inch height of the heat storage medium. Further at each height, three temperature readings were taken, including one taken adjacent to the thermosyphon (labeled as TCL1/2/3/4-3 in FIG. 11B), one adjacent to the exterior surface of the heat storage medium (labeled as TCL1/2/3/4-1 in FIG. 11B), and one in-between (labeled as TCL1/2/3/4-2 in FIG. 11B) of the thermosyphon.

As shown in FIG. 12, the temperatures gradually increased over time as heat was transferred and stored into the heat storage medium, reaching a range of about 300° C. to about 450° C. FIG. 12 only shows the thermal response of the heat storage medium during the charging process. A similar, but reversed, heat transfer process may take place during the discharging process of the energy storage cycle.

Example 4—Thermal Energy Storage Device

To evaluate the performance of the thermal energy storage device described herein with an array of thermosyphons, a thermal energy storage device with 150 kWh capacity and having a construction similar to that shown in FIG. 13 was tested. Specifically, the thermal energy storage device includes 22 thermosyphons and a heat storage medium. Hot air was used as the heat transfer media for charging and discharging the thermal energy storage device.

The 22 thermosyphons of the thermal energy storage device are arranged in the configuration shown in FIG. 14. Each of the thermosyphons has a length of 10.5 feet, an inner diameter of 1.5 inches, and an outer diameter of 1.9 inches. Each of the thermosyphons is constructed from low carbon steel pipe and filled with 25% in volume with DowTherm™ A. Low carbon steel serrated circular fins having a length of 1 inch are fitted at both the condensing section and the evaporative section of each thermosyphon to increase the heat transfer area.

The heat storage medium included a solid heat storage medium, more specifically, a concrete material formed of a formulation set forth below in Table 3. The heat storage medium was configured for operating at a temperature of up to 450° C. The heat storage medium is in a cylindrical form and was cast in a schedule 40 steel pipe having a diameter of 30 inches.

TABLE 3

| | Components | Amount [kg/m³] |
|---|---|---|
| Coarse aggregate | Quartzite, #8 | 924 |
| Fine aggregate | C33 Silica sand | 947 |
| Cement | Type I Portland Cement | 334 |
| Supplemental cementitious material | Silica fume | 59 |
| Water | | 137 |
| Fiber | Steel Fiber, Nycon SSF Type V | 156 |
| Water-cement ratio | | 0.35 |

The thermal energy storage device, including the charging and discharging plenums, were insulated with a mineral wool layer having a thickness of 6 inches, which was further covered with aluminum foil to reduce radiation heat losses.

To evaluate the performance consistency of the thermal energy storage device, the thermal energy storage device was charged and discharged multiple cycles. Specifically, the thermal energy storage device was charged from a temperature of 261° C. to 416° C. by employing an air mass flow rate of 0.14 kg/s having a temperature of 460° C. Then the thermal energy storage device was discharged back to a temperature of 261° C. from a temperature of 416° C. using an air mass flow rate of 0.26 kg/s having a temperature of 185° C.

Figure 16A:
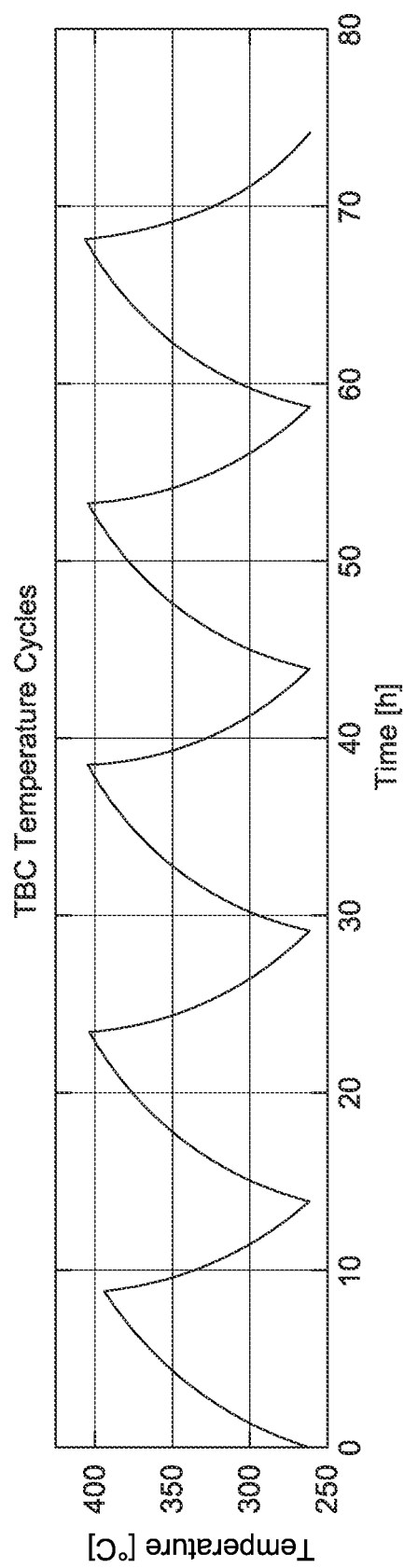
FIG. 16A shows temperature profile of a thermal energy storage device according to some embodiments during consecutive cycles of charging and discharging.
Figure 16B:
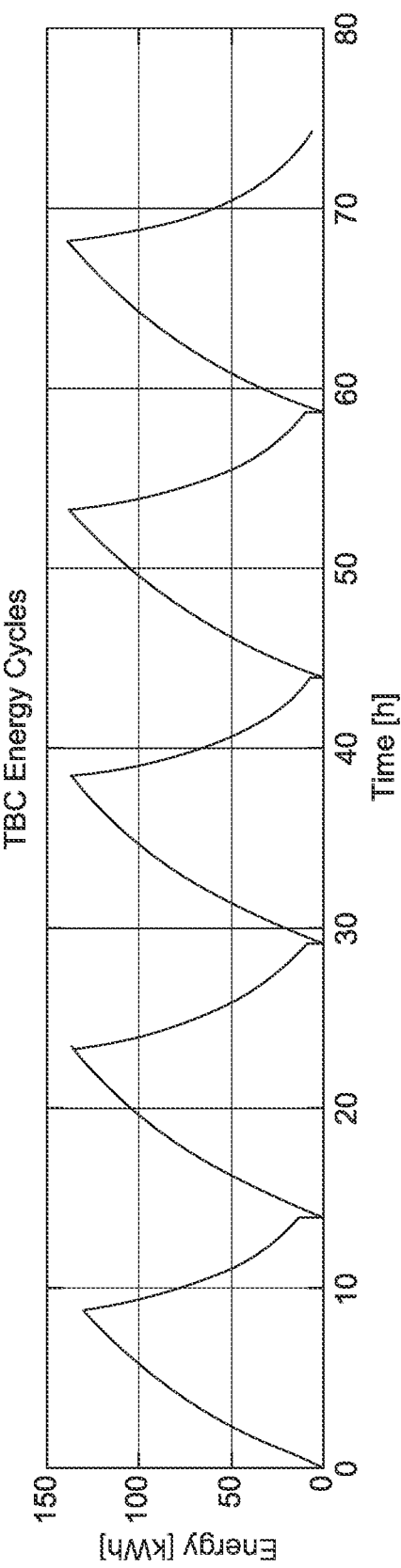
FIG. 16B shows energy transferred to/from the thermal energy storage device during the consecutive cycles of charging and discharging.

Data during the charging and discharging cycles were collected and shown in FIGS. 16A and 16B. Specifically, FIG. 16A shows the temperature profile of the thermal energy storage device during five consecutive cycles of charging and discharging, and FIG. 16B shows the energy transferred to/from the thermal energy storage device during the five consecutive cycles of charging and discharging.

As shown in FIGS. 16A and 16B, the thermal energy storage device performed consistently through the multiple charging and discharging cycles, demonstrating the repeatability in performance of the thermal energy storage device described herein.

Examples 5-10—Effects of Aggregate

Various concrete samples were prepared with variation in constituents. Mechanical and thermal performance at both room temperature and elevated temperatures were evaluated. The variation in constituents include the type of coarse aggregate, the volumetric percentage of coarse and fine aggregates, the type of cementitious materials, the replacement percentage of supplemental cementitious materials, water-cement ratio, the type of fibers (e.g., steel fibers), the volumetric content of steel fibers, the use of oxide (e.g., iron oxide), etc.

Table 4 below sets forth the formulations of heat storage medium Examples 5-10, which were all fabricated with a water-cement ratio of 0.35. The cement used was a Portland cement, more specifically, Type I Portland cement and has a specific gravity of 3.15.

In Examples 5-8, coarse siliceous aggregate was used. The siliceous aggregate included about 87.3% white to light grey quartzite and 12.7% pale red quartzite. The coarse siliceous aggregate (i.e., aggregate of siliceous stone) had a specific gravity of 2.591 and met ASTM C33 #8 gradation requirements (i.e., 85 wt. % to 100 wt. % of the aggregate passing a sieve with square openings having a nominal size ranging from No. 16 to ⅜ in.).

In Example 9, coarse carbonate aggregate was used. The carbonate aggregate was primarily composed of limestone and dolomite. The coarse carbonate aggregate (i.e., coarse aggregate of calcareous stone) had a specific gravity of 2.761 and also met ASTM C33 #8 gradation requirements (i.e., 85 wt. % to 100 wt. % of the aggregate passing a sieve with square openings having a nominal size ranging from No. 16 to ⅜ in.).

Two types of fine aggregate, i.e., silica sand and natural black iron oxide powder, were used in the examples. The fine aggregate of silica sand comprised of quartz sand. The fine aggregate of silica sand had a specific gravity of 2.608 and met ASTM C33 gradation requirements (95 wt. % to 100 wt. % of the aggregate passing a sieve with square openings having a nominal size ranging from No. 200 to No. 4). The fine aggregate replacement of black iron oxide powder had an average size of 30 micrometers.

No supplemental cementitious materials or fiber reinforcement were used in Examples 5-10.

TABLE 4

| | Ex. # | | | | | |
|---|---|---|---|---|---|---|
| ID | Ex. 5 A2C1 | Ex. 6 A3C1 | Ex. 7 A4C1 | Ex. 8 A2C1Fe-10 | Ex. 9 A1C1 | Ex. 10 A5C1 |
| Carbonate coarse aggregate [kg/m³] | 0 | 0 | 0 | 0 | 774 | 0 |
| Siliceous coarse aggregate [kg/m³] | 726 | 790 | 924 | 726 | 0 | 0 |
| Fine aggregate [kg/m³] | 665 | 811 | 947 | 599 | 665 | 1392 |
| Water [kg/m³] | 228 | 188 | 137 | 228 | 228 | 228 |
| Type I Cement [kg/m³] | 653 | 538 | 393 | 653 | 653 | 653 |

TABLE 4-continued

| | Ex. # | | | | | |
|---|---|---|---|---|---|---|
| ID | Ex. 5 A2C1 | Ex. 6 A3C1 | Ex. 7 A4C1 | Ex. 8 A2C1Fe-10 | Ex. 9 A1C1 | Ex. 10 A5C1 |
| Black Iron Oxide [kg/m³] | 0 | 0 | 0 | 66.51 | 0 | 0 |
| Water/Cement ratio | 0.35 | 0.35 | 0.35 | 0.35 | 0.35 | 0.35 |
| Superplasticizer [L/m³] | 0.50 | 2.47 | 7.42 | 1.41 | 0.50 | 0 |

Table 5 below further sets forth the aggregate content in Examples 5-10 by volume percentage, based on the total volume of the dry blend. For Examples 5 and 8-10, the types of aggregate varied but the total aggregate content was kept the same (i.e., 53% in volume). For Examples 5-7, the total aggregate content varied but the types of aggregate and the volumetric ratio of coarse and fine aggregate were kept the same (i.e., coarse siliceous aggregate:fine sand aggregate=1:1). Example 8 was based on the heat storage medium described in Example 5 with a substitution of 10% of fine aggregate by volume with natural black iron oxide powder.

TABLE 5

| | | Types of Aggregate in Vol. % | | Total Aggregate Content |
|---|---|---|---|---|
| Ex. # | ID | Coarse | Fine | in Vol. % |
| Ex. 5 | A2C1 | 26% siliceous aggregate | 27% sand | 53% |
| Ex. 6 | A3C1 | 31% siliceous aggregate | 31% sand | 62% |

TABLE 5-continued

| | | Types of Aggregate in Vol. % | | Total Aggregate Content |
|---|---|---|---|---|
| Ex. # | ID | Coarse | Fine | in Vol. % |
| Ex. 7 | A4C1 | 36% siliceous aggregate | 36% sand | 72% |
| Ex. 8 | A2C1Fe-10 | 26% siliceous aggregate | 24% sand + 3% iron oxide | 53% |
| Ex. 9 | A1C1 | 28% carbonate aggregate | 25% sand | 53% |
| Ex. 10 | A5C1 | 0% | 53% sand | 53% |

Table 6 below sets forth mechanical properties of Examples 5-10, as tested at a temperature of 20° C. The 28-day compressive strength, splitting tensile strength, modulus of elasticity, and Poisson's ratio were measured in accordance with ASTM C39, ASTM C496, and ASTM C469, respectively.

TABLE 6

| Ex. # | ID | Density [kg/m³] | Compressive strength-28 days [psi] | Splitting tensile strength-28 days [psi] | Elastic modulus [ksi] | Poisson's ratio |
|---|---|---|---|---|---|---|
| Ex. 5 | A2C1 | 2350 | 10670 | 770 | 4920 | 0.17 |
| Ex. 6 | A3C1 | 2374 | 9470 | 720 | 5120 | 0.20 |
| Ex. 7 | A4C1 | 2390 | 10450 | 750 | 5420 | 0.17 |
| Ex. 8 | A2C1Fe-10 | 2403 | 8190 | 640 | 4410 | 0.18 |
| Ex. 9 | A1C1 | 2320 | 8870 | 740 | 5760 | 0.25 |
| Ex. 10 | A5C1 | 2282 | 61.02 | 5.03 | 39.78 | 0.16 |

Table 7 below sets forth thermal properties of heat storage medium Examples 5-10, as tested at room and elevated temperatures. The thermal conductivity and heat capacity were measured in accordance with ISO 22007-2.

TABLE 7

| | | Density [kg/m³] | Thermal conductivity [W/m · K] | | | Heat capacity [MJ/m³ · K] | | |
|---|---|---|---|---|---|---|---|---|
| Ex. # | ID | @20° C. | @20° C. | @280° C. | @420° C. | @20° C. | @280° C. | @420° C. |
| Ex. 5 | A2C1 | 2350 | 2.116 (2.986) | 1.624 | 1.634 | 1.897 (2.1) | 2.832 | 3.767 |
| Ex. 6 | A3C1 | 2374 | 2.662 (3.42) | 1.877 | 1.852 | 1.853 (2.12) | 2.665 | 3.925 |
| Ex. 7 | A4C1 | 2390 | 2.485 (3.92) | 1.923 | 1.825 | 1.744 (2.03) | 2.355 | 2.802 |
| Ex. 8 | A2C1Fe-10 | 2403 | 1.880 (2.974) | 1.497 | 1.529 | 1.918 (2.313) | 2.654 | 3.259 |
| Ex. 9 | A1C1 | 2320 | 2.127 (2.434) | 1.425 | 1.344 | 2.267 (2.316) | 2.736 | 3.508 |
| Ex. 10 | A5C1 | 2282 | 1.727 | 1.366 | 1.363 | 1.796 | 2.389 | 2.945 |

As shown in Table 7, the increase in thermal conductivity as provided by fine silica sand aggregate in Example 10 over coarse carbonate aggregate in Example 9 was limited. Surprisingly, Examples containing coarse siliceous aggregate all demonstrated much greater improvement in thermal conductivity over Example 9, despite that Examples 5-8 may have greater porosity as compared to Example 10 which eliminated all coarse aggregate and reduced porosity. Further, the superior thermal conductivity as provided by the coarse siliceous aggregate in Examples 5-7 over the carbonate aggregate in Example 9 was maintained at elevated temperatures.

With respect to heat capacity, Examples 5-7 containing coarse siliceous aggregate exhibited lower heat capacity at room temperature as compared to Example 9 containing coarse carbonate aggregate. Unexpectedly, Examples 5-7 all demonstrated comparable or even greater heat capacity than Example 9 at elevated temperatures.

Examples 11-18—Effects of Supplemental Cementitious Materials

Table 8 below sets forth the formulations of heat storage medium Examples 11-18, which were all fabricated with a water-cement ratio of 0.35. Different cement types and supplementary cementitious materials were used in various examples. Table 9 below further sets forth the aggregate content in Examples 11-18 and cement substitute by mass. Examples 11-14 substituted a percentage of Type I cement by mass used in Example 5 while maintaining a consistent 53% volumetric total aggregate content. Examples 15-18 are based on Example 7 with a 72% volumetric aggregate content and a partial replacement by mass of Type I cement with silica fume and/or metakaolin. Example 11 included a 100% replacement of Type I Portland cement with Type III Portland cement, while Examples 12-16 included a 15% mass replacement of Type I cement with fly ash, slag, silica fume, and metakaolin, respectively. Example 17 included a 7.5% mass replacement with silica fume and another 7.5% with metakaolin. Example 18 included a 30% mass replacement with silica fume.

TABLE 8

| | | Ex. # | | | | | | |
|---|---|---|---|---|---|---|---|---|
| ID | Ex. 11 A2C2 | Ex. 12 A2C1FA | Ex. 13 A2C1SA | Ex. 14 A2C1SF | Ex. 15 A4C1SF | Ex. 16 A4C1MK | Ex. 17 A4C1SFMK | Ex. 18 A4C1SF30 |
| Siliceous coarse aggregate [kg/m$^3$] | 726 | 726 | 726 | 726 | 924 | 924 | 924 | 924 |
| Fine aggregate [kg/m$^3$] | 665 | 665 | 665 | 665 | 947 | 947 | 947 | 947 |
| Water [kg/m$^3$] | 228 | 228 | 228 | 228 | 137 | 137 | 137 | 137 |
| Cement - Type I [kg/m$^3$] | 0 | 555 | 555 | 555 | 334 | 334 | 334 | 275 |
| Cement - Type III [kg/m$^3$] | 653 | 0 | 0 | 0 | 0 | 0 | 0 | 0 |
| Fly ash [kg/m$^3$] | 0 | 98 | 0 | 0 | 0 | 0 | 0 | 0 |
| Silica fume [kg/m$^3$] | 0 | 0 | 0 | 98 | 59 | 0 | 29 | 118 |
| Slag [kg/m$^3$] | 0 | 0 | 98 | 0 | 0 | 0 | 0 | 0 |
| Metakaolin [kg/m$^3$] | 0 | 0 | 0 | 0 | 0 | 59 | 29 | 0 |
| Water/Cement ratio | 0.35 | 0.35 | 0.35 | 0.35 | 0.35 | 0.35 | 0.35 | 0.35 |
| Superplasticizer [L/m$^3$] | 0.00 | 0.17 | 0.17 | 0.34 | 2.83 | 4.24 | 4.24 | 9.63 |

TABLE 9

| Ex. # | ID | Total Aggregate Content in Vol. % | Cement Substitute by Mass in Wt. % |
|---|---|---|---|
| Ex. 11 | A2C2 | 53% | 100% Type III Cement |
| Ex. 12 | A2C1FA | 53% | 15% Fly ash |
| Ex. 13 | A2C1SA | 53% | 15% Slag |
| Ex. 14 | A2C1SF | 53% | 15% Silica Fume |
| Ex. 15 | A4C1SF | 72% | 15% Silica Fume |
| Ex. 16 | A4C1MK | 72% | 15% Metakaolin |
| Ex. 17 | A4C1SFMK | 72% | 7.5% Silica fume & 7.5% Metakaolin |
| Ex. 18 | A4C1SF30 | 72% | 30% Silica Fume |

Table 10 below sets forth mechanical properties of Examples 11-18, as tested at room temperature. Table 11 below sets forth thermal properties of Examples 11-18, as tested at room and elevated temperatures. Results of Example 5, which were modified to obtain Examples 11-14, and Example 7, which were modified to obtain Examples 15-18, were also incorporated for ease of comparison.

TABLE 10

| Ex. # | ID | Density [kg/m$^3$] | Compressive strength-28 days [psi] | Splitting tensile strength-28 days [psi] | Elastic modulus [ksi] | Poisson's ratio |
|---|---|---|---|---|---|---|
| Ex. 5 | A2C1 | 2350 | 10670 | 770 | 4920 | 0.17 |
| Ex. 11 | A2C2 | 2359 | 9850 | 780 | 4440 | 0.22 |
| Ex. 12 | A2C1FA | 2343 | 8820 | 820 | 4700 | 0.19 |

TABLE 10-continued

| Ex. # | ID | Density [kg/m³] | Compressive strength-28 days [psi] | Splitting tensile strength-28 days [psi] | Elastic modulus [ksi] | Poisson's ratio |
|---|---|---|---|---|---|---|
| Ex. 13 | A2C1SA | 2363 | 9081 | 800 | 4810 | 0.19 |
| Ex. 14 | A2C1SF | 2335 | 11420 | 870 | 4870 | 0.19 |
| Ex. 7 | A4C1 | 2390 | 10450 | 750 | 5420 | 0.17 |
| Ex. 15 | A4C1SF | 2364 | 11430 | 790 | 5750 | 0.16 |
| Ex. 16 | A4C1MK | 2365 | 12240 | 790 | 5350 | 0.16 |
| Ex. 17 | A4C1SFMK | 2361 | 12230 | 720 | 5640 | 0.17 |
| Ex. 18 | A4C1SF30 | 2408 | 10210 | 1010 | 5850 | 0.13 |

TABLE 11

| Ex. # | ID | Density [kg/m³] @20° C. | Thermal conductivity [W/m · K] @20° C. | @280° C. | @420° C. | Heat capacity [MJ/m³ · K] @20° C. | @280° C. | @420° C. |
|---|---|---|---|---|---|---|---|---|
| Ex. 5 | A2C1 | 2350 | 2.116 (2.986) | 1.624 | 1.634 | 1.897 (2.1) | 2.832 | 3.767 |
| Ex. 11 | A2C2 | 2359 | 1.553 (2.607) | 1.334 | 1.362 | 1.796 (1.885) | 2.389 | 2.945 |
| Ex. 12 | A2C1FA | 2343 | 1.731 (2.854) | 1.431 | 1.501 | 1.898 (2.210) | 2.572 | 3.145 |
| Ex. 13 | A2C1SA | 2363 | 1.881 (2.727) | 1.519 | 1.542 | 2.060 (2.028) | 2.746 | 3.229 |
| Ex. 14 | A2C1SF | 2335 | 1.599 (2.514) | 1.343 | 1.339 | 1.937 (2.114) | 2.634 | 3.164 |
| Ex. 7 | A4C1 | 2390 | 2.485 (3.92) | 1.923 | 1.825 | 1.744 (2.03) | 2.355 | 2.802 |
| Ex. 15 | A4C1SF | 2364 | 2.559 (3.87) | 1.924 | 1.760 | 2.377 (2.097) | 2.979 | 3.353 |
| Ex. 16 | A4C1MK | 2365 | 2.611 (3.759) | 1.953 | 1.869 | 1.868 (2.11) | 2.543 | 2.780 |
| Ex. 17 | A4C1SFMK | 2361 | 2.379 (3.803) | 1.831 | 1.704 | 1.824 (1.865) | 2.466 | 2.981 |
| Ex. 18 | A4C1SF30 | 2408 | 2.398 | 1.838 | 1.828 | 1.925 | 2.696 | 3.183 |

Comparing Example 11 with Example 5 (53% aggregate level by volume), use of Type III cement in place of Type I cement resulted in a decrease in thermal conductivity. Comparing Examples 12-14 with Example 5, a 15% mass replacement with fly ash, slag, or silica fume also resulted in a reduction in thermal conductivity. The largest reduction in thermal conductivity occurred with the silica fume replacement (Example 14).

At elevated aggregate level (72% by volume), use of silica fume and metakaolin (Examples also reduced thermal conductivity. Such reduction effect, however, was less significant on concrete with the higher aggregate content.

Additionally, at aggregate content of 53% by volume, replacement of Type I cement (Example 5) with Type III cement (Example 11) lowered heat capacity. Silica fume replacement (Example 14) had less influence on heat capacity. Fly ash (Example 12) increased heat capacity while slag (Example 13) decreased heat capacity.

At elevated aggregate level (72% by volume), a combination of 7.5% silica fume and 7.5% metakaolin replacement (Example 17) resulted in a decrease in heat capacity. Surprisingly, 15% silica fume replacement (Example 15), 15% metakaolin replacement (Example 16) and 30% silica fume replacement (Example 18) resulted in an increase in heat capacity at both room temperature. At elevated temperatures, 15% and 30% silica fume replacement (Example 15 and Example 18) resulted in a more significant increase in heat capacity, while the effect of 15% metakaolin replacement (Example 16) was less prominent.

Examples 19-26—Effects of Water-Cement Ratio

Table 12 below sets forth the formulations of Examples 19-26. All examples were formulated with carbonate coarse aggregate, silica sand, and Type I Portland cement. The coarse aggregate content and water content were kept the same while the cement content and fine aggregate content were adjusted to achieve different water-cement ratios, which were varied from to 0.65 in 0.05 increments. Superplasticizer was added to the mixes with low water-cement ratios (Examples 19-22).

TABLE 12

| | Ex. # | | | | | | | |
|---|---|---|---|---|---|---|---|---|
| ID | Ex. 19 A1C1WC30 | Ex. 20 A1C1WC35 | Ex. 21 A1C1WC40 | Ex. 22 A1C1WC45 | Ex. 23 A1C1WC50 | Ex. 24 A1C1WC55 | Ex. 25 A1C1WC60 | Ex. 26 A1C1WC65 |
| Carbonate coarse aggregate [kg/m³] | 752 | 752 | 752 | 752 | 752 | 752 | 752 | 752 |
| Fine aggregate [kg/m³] | 602 | 694 | 762 | 815 | 858 | 893 | 921 | 947 |
| Water [kg/m³] | 225 | 225 | 224 | 223 | 223 | 223 | 222 | 222 |

TABLE 12-continued

| | Ex. 19<br>A1C1WC30 | Ex. 20<br>A1C1WC35 | Ex. 21<br>A1C1WC40 | Ex. 22<br>A1C1WC45 | Ex. 23<br>A1C1WC50 | Ex. 24<br>A1C1WC55 | Ex. 25<br>A1C1WC60 | Ex. 26<br>A1C1WC65 |
|---|---|---|---|---|---|---|---|---|
| ID | | | | | | | | |
| Cement - Type I [kg/m$^3$] | 761 | 653 | 571 | 508 | 457 | 415 | 381 | 351 |
| Water/Cement ratio | 0.30 | 0.35 | 0.40 | 0.45 | 0.50 | 0.55 | 0.60 | 0.65 |
| Superplasticizer [L/m$^3$] | 1.55 | 0.72 | 0.67 | 0.34 | 0.00 | 0.00 | 0.00 | 0.00 |

Table 13 sets forth below the mechanical properties of Examples 19-26.

TABLE 13

| Ex. # | ID | Density [kg/m$^3$] | Compressive strength-28 days [psi] | Splitting tensile strength-28 days [psi] | Elastic modulus [ksi] | Poisson's ratio |
|---|---|---|---|---|---|---|
| Ex. 19 | A1C1WC30 | 2313 | 8900 | 703 | 5770 | 0.26 |
| Ex. 20 | A1C1WC35 | 2427 | 8360 | 716 | 5760 | 0.22 |
| Ex. 21 | A1C1WC40 | 2367 | 7820 | 729 | 5650 | 0.22 |
| Ex. 22 | A1C1WC45 | 2351 | 7020 | 767 | 5580 | 0.22 |
| Ex. 23 | A1C1WC50 | 2378 | 6470 | 722 | 5590 | 0.21 |
| Ex. 24 | A1C1WC55 | 2332 | 6390 | 676 | 5630 | 0.22 |
| Ex. 25 | A1C1WC60 | 2367 | 5440 | 577 | 5100 | 0.22 |
| Ex. 26 | A1C1WC65 | 2308 | 5170 | 569 | 5380 | 0.21 |

Figure 17A:
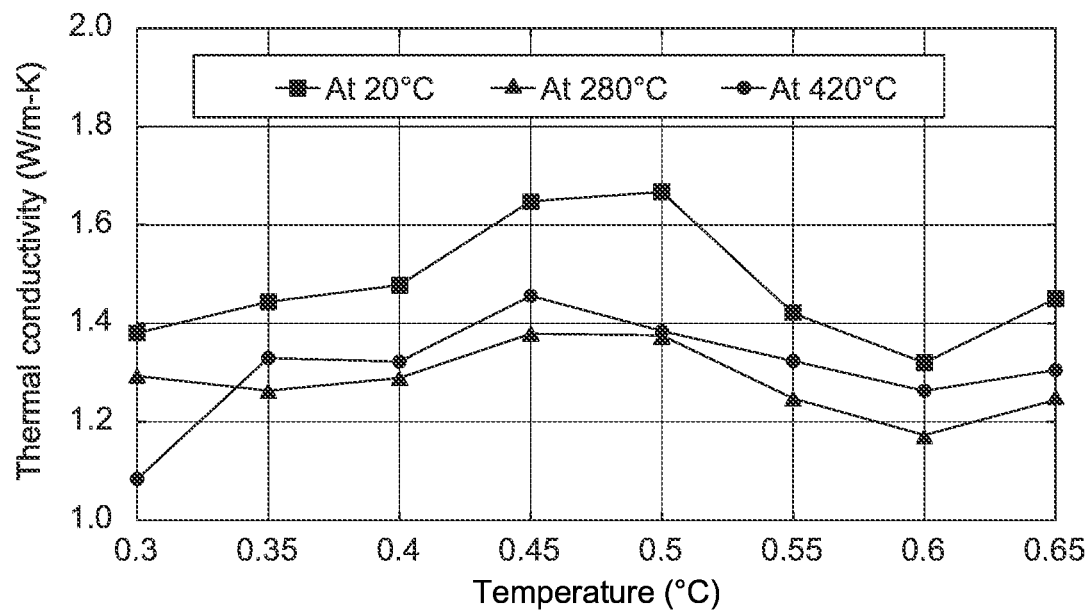
FIGS. 17A and 17B show thermal conductivity and specific heat of exemplary heat storage media, respectively.
Figure 17B:
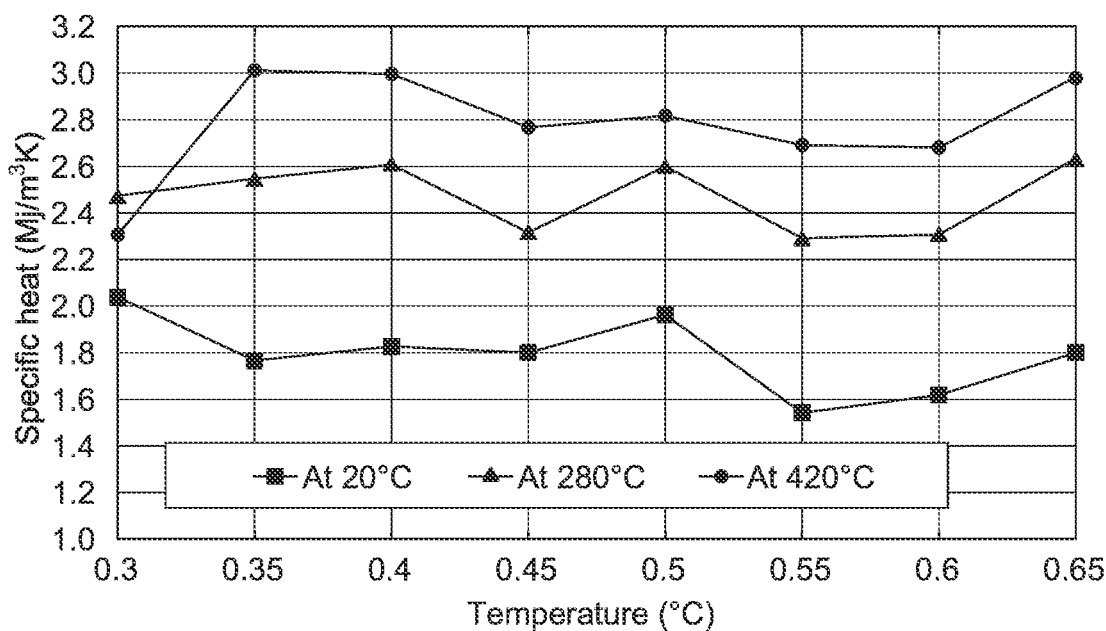

FIGS. 17A and 17B show the measured thermal conductivity and specific heat of samples 19-26, respectively. As shown, the thermal conductivity decreased as water-cement ratios varied from 0.45 to 0.60. Examples with low water-cement ratios (0.30 to 0.40) also exhibited a relatively low conductivity (likely due to poor workability during fabrication leading to higher porosities). The variation in water-cement ratio did not have a significant influence on heat capacity at both room temperature and elevated temperatures.

Examples 27-31—Effects of Fibers

Two types of steel fibers (Type I & Type II) were added to the various examples. Type I fibers are stainless steel fibers having a continuously deformed corrugated shape. Type I fibers used in the examples had a length of 3.81 cm with an aspect ratio of 32.2, while the filaments had a diameter of 1.17 mm. The tensile strength of Type I fibers was 1034 MPa (150 ksi) with an elastic modulus of 200 GPa, meeting the requirement as per ASTM A820.

Type II fibers are stainless steel fibers having a straight needle shape. Type II fibers used in the examples had monofilament with 0.2 mm diameter and 13 mm length and were coated with copper to resist corrosion. The tensile strength of Type II fibers was 1900 MPa (285 ksi) with an elastic modulus of 200 GPa, also meeting the ASTM A820 requirement.

Table 15 below sets forth the formulations of Examples 27-31 including Type I or Type II fibers at various content levels. Example 27 was prepared by adding 0.5% Type II fibers into Example 5. Examples 28 and 29 contained a greater content, i.e., 2% by volume, of Type I and Type II fibers, respectively. Examples 30 and 31 were prepared by adding 0.5% by volume of Type I and Type II fibers, respectively, into Example 9.

TABLE 15

| Ex. # | Ex. 27 | Ex. 28 | Ex. 29 | Ex. 30 | Ex. 31 |
|---|---|---|---|---|---|
| ID | A2C1F2-0.5 | A2C1F1-2 | A2C1F2-2 | A1C1F1-0.5 | A1C1F2-0.5 |
| Carbonate coarse aggregate [kg/m$^3$] | 0 | 0 | 0 | 774 | 774 |
| Siliceous coarse aggregate [kg/m$^3$] | 726 | 726 | 726 | 0 | 0 |
| Fine aggregate [kg/m$^3$] | 665 | 665 | 665 | 665 | 665 |
| Water [kg/m$^3$] | 228 | 228 | 228 | 228 | 228 |
| Cement - Type I [kg/m$^3$] | 653 | 653 | 653 | 653 | 653 |
| Steel fiber I [kg/m$^3$] | 0 | 156 | 0 | 39 | 0 |
| Steel fiber II [kg/m$^3$] | 39 | 0 | 156 | 0 | 39 |
| Black Iron Oxide [kg/m$^3$] | 0 | 0 | 0 | 0 | 0 |
| Water/Cement ratio | 0.35 | 0.35 | 0.35 | 0.35 | 0.35 |
| Superplasticizer [L/m$^3$] | 0.7 | 1.41 | 1.41 | 0.7 | 0.7 |

Table 16 below sets forth the mechanical properties of Examples 28 and 29, as tested at room temperature.

TABLE 16

| Ex. # | ID | Density [kg/m³] | Compressive strength-28 days [psi] | Splitting tensile strength-28 days [psi] | Elastic modulus [ksi] | Poisson's ratio |
|---|---|---|---|---|---|---|
| Ex. 28 | A2C1F1-2 | 2465 | 8660 | 1200 | 4950 | 0.2 |
| Ex. 29 | A2C1F2-2 | 2468 | 9110 | 1260 | 5170 | 0.2 |

Table 17 below sets forth the thermal properties of Examples 27 and 31 at room and elevated temperatures.

TABLE 17

| Ex. # | ID | Density [kg/m³] @20° C. | Thermal conductivity [W/m · K] @20° C. | @280° C. | @420° C. | Heat capacity [MJ/m³ · K] @20° C. | @280° C. | @420° C. |
|---|---|---|---|---|---|---|---|---|
| Ex. 27 | A2C1F2-0.5 | 2311 | 1.789 (3.138) | 1.494 | 1.467 | 1.850 (2.307) | 2.695 | 3.636 |
| Ex. 28 | A2C1F1-2 | 2465 | 2.588 (3.712) | 2.029 | 1.652 | 2.092 (1.776) | 2.668 | 2.594 |
| Ex. 29 | A2C1F2-2 | 2468 | 1.814 (3.244) | 1.603 | 1.677 | 1.919 (2.131) | 2.615 | 3.202 |
| Ex. 30 | A1C1F1-0.5 | 2357 | 1.836 (2.905) | 1.660 | 1.715 | 1.930 (2.238) | 2.464 | 2.835 |
| Ex. 31 | A1C1F2-0.5 | 2357 | 1.520 (2.655) | 1.327 | 1.410 | 2.056 (2.439) | 2.807 | 3.353 |

Figure 18A:
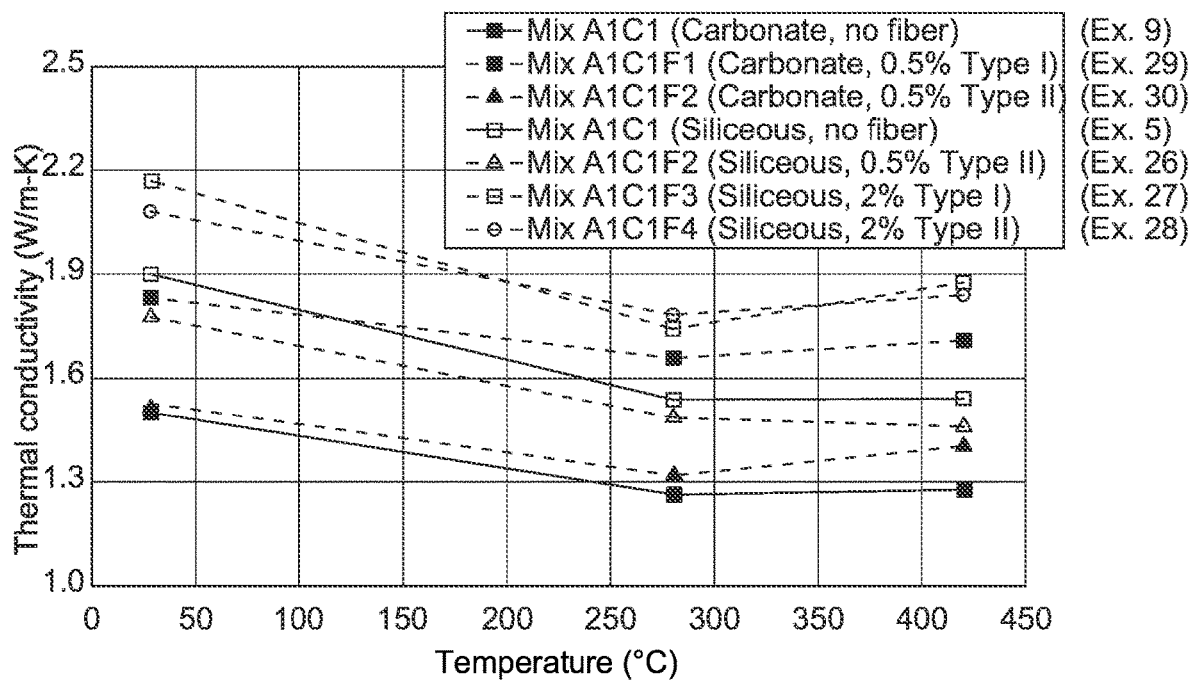
FIGS. 18A and 18B show thermal conductivity and specific heat of exemplary heat storage media, respectively.

FIG. 18A shows the measured thermal conductivity of the various examples with and without fiber addition at room and elevated temperatures.

In carbonate aggregate concrete examples, a 0.5% volumetric addition of Type I fibers (Example 30) increased thermal conductivity more significantly than a 0.5% volumetric addition of Type II fibers (Example 31). Type I fiber addition had a 23% to 34% increase on thermal conductivity from 20° C. to 420° C., respectively, while Type II fiber addition only had a 1% to 8% increase on thermal conductivity from 20° C. and 420° C., respectively.

In siliceous aggregate concrete examples, a 2% volumetric addition of type I or II fibers (Examples 28 and 29) improved thermal conductivity. A 0.5% volumetric addition of Type II fibers (Example 27) decreased thermal conductivity by 6% at room temperature to 4% at high temperature, but a 2% volumetric addition of Type II fibers increased thermal conductivity by 9% at temperature to 18% at high temperature. By comparing measurements of Example 5 and Example 28, a 2% volumetric addition of Type I fibers resulted in a 14% to 22% increase in thermal conductivity from room to high temperatures. More importantly, a high fiber content was found to keep the thermal conductivity of concrete at substantially the same level from 280° C. to 420° C.

Figure 18B:
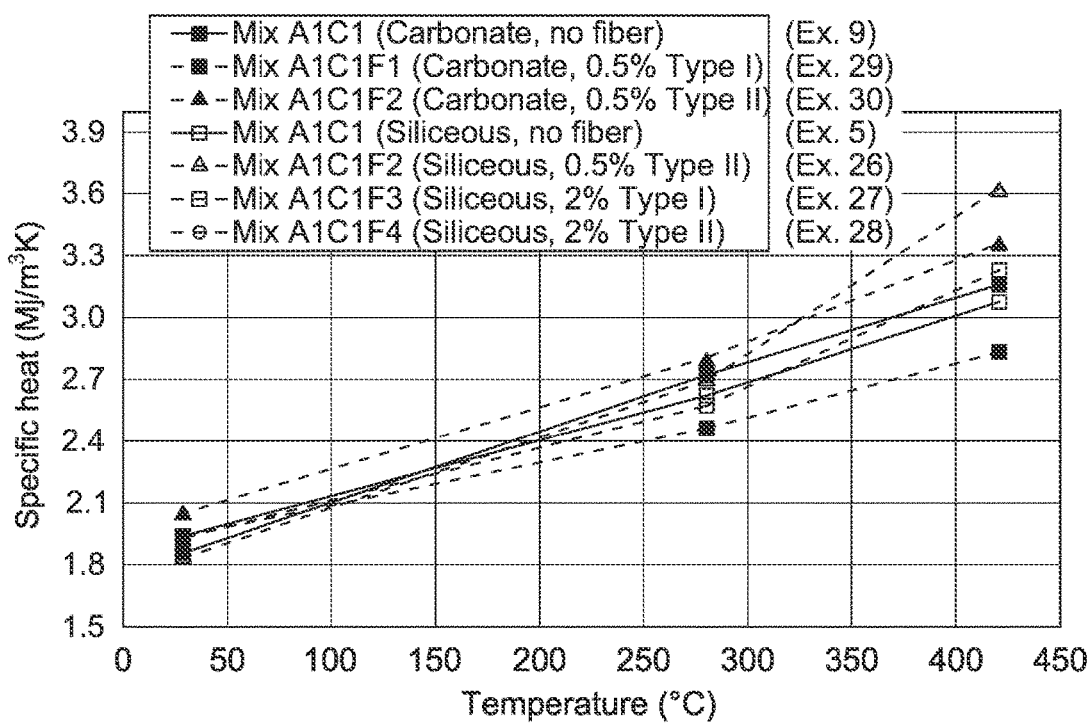

FIG. 18B shows the measured specific heat of the various examples with and without fiber addition at room and elevated temperatures. As shown, the addition of steel fibers showed a limited influence on specific heat at room temperature. The addition of steel fibers had a greater impact on specific heat at elevated temperatures.

In carbonate aggregate concrete examples, a 0.5% volumetric addition of Type I fibers (Example 30) decreased specific heat. In contrast, a 0.5% volumetric addition of Type II fibers (Example 31), increased specific heat.

In siliceous aggregate concrete examples, both 0.5% and 2% volumetric additions of Type II fibers (Examples 27 and 29) generally improved specific heat at elevated temperatures, with significant improvement by 0.5% addition at 420° C. and 2% addition at 280° C. A 0.5% volumetric addition of Type I fibers (Example 28) had less impact on specific heat at elevated temperatures.

Figure 19A:
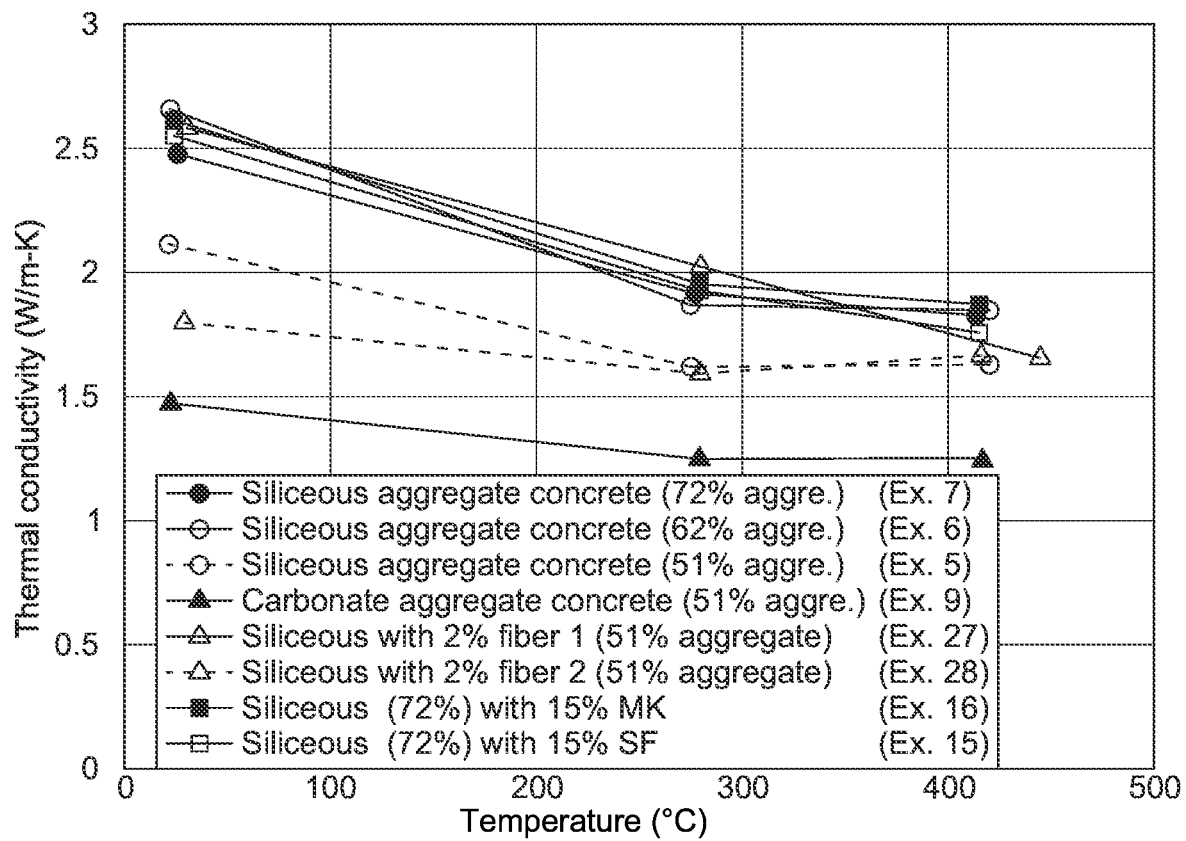
FIGS. 19A and 19B show thermal conductivity and heat capacity of exemplary heat storage media, respectively.
Figure 19B:
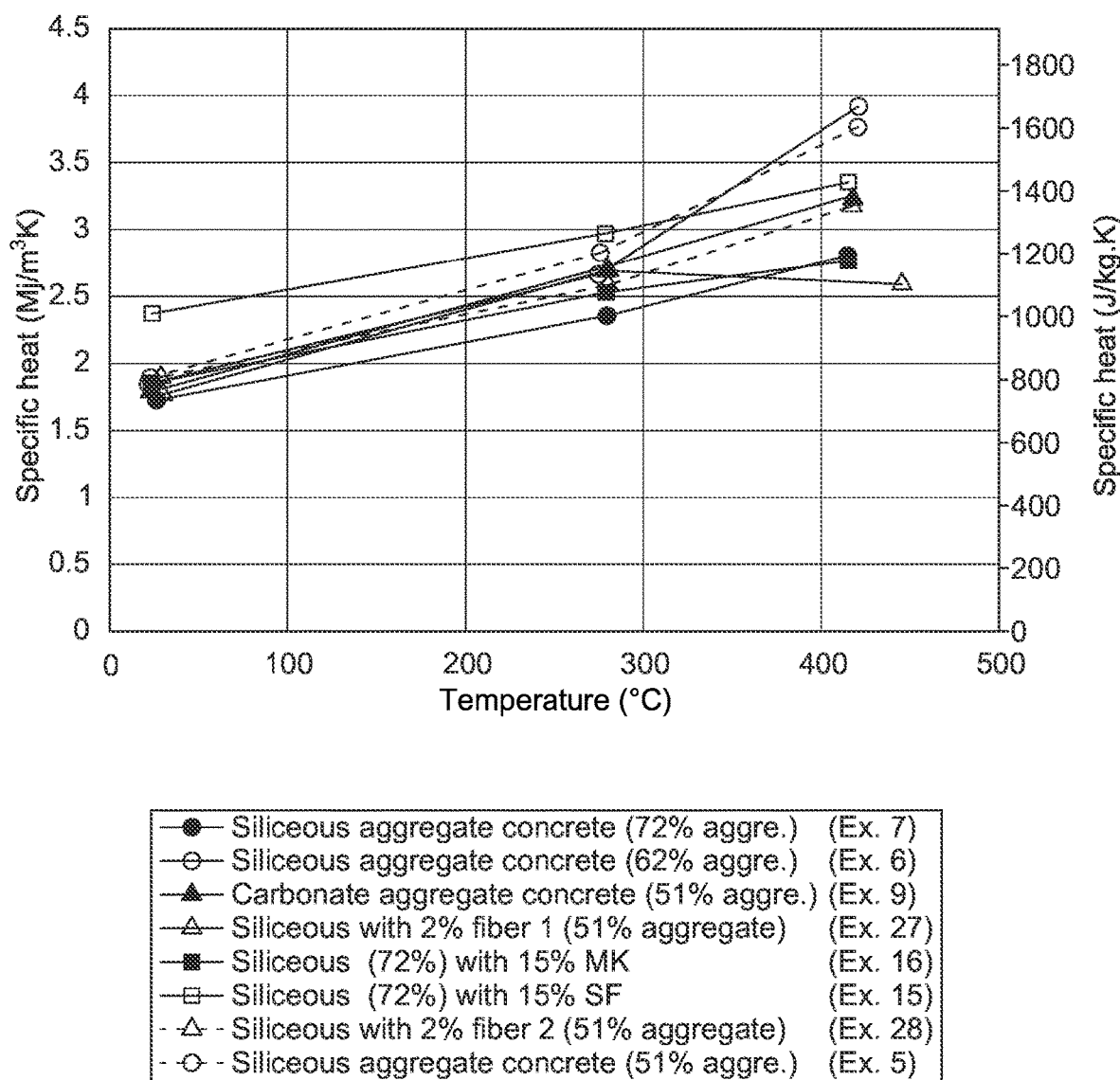

FIGS. 19A and 19B show the thermal conductivity and heat capacity of select heat storage medium examples discussed above, specifically, Examples 5-7, 9, 15, 16, 27, and 28.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

Another two mixes (Mix A4C1SF15F1-2 and Mix A4C1SF30F1-2) should be included, which demonstrate the final enhanced mix based on the results of all the experimental studies conducted above. Mix A4C1SF15F1-2 is used as the storage media in the 150 kWh TES module.

Table 18 below sets forth the formulations of Examples 32 and 33 as the enhanced mixes. Example 32 and Example 33 were prepared by adding 2% Type I fibers into Example 16 and Example 18.

TABLE 18

| Ex. # | Ex. 32 | Ex. 33 |
|---|---|---|
| ID | A4C1SF15F1-2 | A4C1SF30F1-2 |
| Siliceous coarse aggregate [kg/m$^3$] | 924 | 924 |
| Fine aggregate [kg/m$^3$] | 947 | 947 |
| Water [kg/m$^3$] | 137 | 137 |
| Cement - Type I [kg/m$^3$] | 334 | 275 |
| Silica fume [kg/m$^3$] | 59 | 118 |
| Steel fiber I [kg/m$^3$] | 156 | 156 |
| Water/Cement ratio | 0.35 | 0.35 |
| Superplasticizer [L/m$^3$] | 9.54 | 9.63 |

Table 19 below sets forth the mechanical properties of Examples 32 and 33, as tested at room temperature.

TABLE 19

| Ex. # | ID | Density [kg/m$^3$] | Compressive strength-28 days [psi] | Splitting tensile strength-28 days [psi] | Elastic modulus [ksi] | Poisson's ratio |
|---|---|---|---|---|---|---|
| Ex. 32 | A4C1SF15F1-2 | 2562 | 14270 | 2040 | 6276 | 0.14 |
| Ex. 33 | A4C1SF30F1-2 | 2538 | 15447 | 2059 | 6856 | 0.17 |

Table 20 below sets forth the thermal properties of Examples 32 and 33 at room and elevated temperatures.

TABLE 20

| Ex. # | ID | Density [kg/m$^3$] | Thermal conductivity [W/m·K] | | | Heat capacity [MJ/m$^3$·K] | | |
|---|---|---|---|---|---|---|---|---|
| | | @20° C. | @20° C. | @280° C. | @420° C. | @20° C. | @280° C. | @420° C. |
| Ex. 32 | A4C1SF15F1-2 | 2562 | 3.205 | 2.567 | 2.422 | 2.030 | 2.874 | 3.575 |
| Ex. 33 | A4C1SF30F1-2 | 2538 | 2.702 | 2.264 | 2.255 | 2.163 | 2.723 | 3.366 |

What is claimed is:

1. A concrete material comprising:
   fibers in an amount ranging from about 1 to about 2 vol. %;
   an aggregate in an amount ranging from about 50 to about 80 vol. %, wherein the aggregates comprises siliceous aggregate; and
   a cementitious material in an amount from about 12 to 20 vol. %, wherein the cementitious material comprises a combination of Portland cement and silica fume,
   wherein the concrete medium is adapted to have a heat capacity of about 2.0 MJ/m$^3$ K or more at a temperature of 20° C. and about 3.0 MJ/m$^3$ K or more at a temperature of 300° C., and the concrete material is adapted to have a thermal conductivity of about 2 W/m-K to about 6 W/m-K; and
   wherein the concrete material has an elastic modulus ranging from about 150 GPa to about 250 GPa and a tensile strength ranging from about 300 MPa to about 1000 MPa; and
   wherein all volume percentages are based on the total volume of the concrete material; and
   wherein the concrete material is adapted for storing thermal energy for a thermal energy device.

2. The concrete material according to claim 1 further comprising:
   water, wherein the water and the dry cementitious material are present in a weight ratio of about 0.25 to about 0.7.

* * * * *